(12) United States Patent
Hasegawa et al.

(10) Patent No.: US 9,282,312 B2
(45) Date of Patent: Mar. 8, 2016

(54) SINGLE-EYE STEREOSCOPIC IMAGING DEVICE, CORRECTION METHOD THEREOF, AND RECORDING MEDIUM THEREOF

(71) Applicant: FUJIFILM Corporation, Tokyo (JP)

(72) Inventors: Ryo Hasegawa, Saitama (JP); Kenkichi Hayashi, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 303 days.

(21) Appl. No.: 13/781,144

(22) Filed: Feb. 28, 2013

(65) Prior Publication Data

US 2013/0278730 A1 Oct. 24, 2013

Related U.S. Application Data

(63) Continuation of application No. PCT/JP2011/070226, filed on Sep. 6, 2011.

(30) Foreign Application Priority Data

Sep. 13, 2010 (JP) ................................ 2010-204566
Feb. 9, 2011 (JP) ................................ 2011-026428

(51) Int. Cl.
*H04N 13/00* (2006.01)
*G03B 35/08* (2006.01)
(Continued)

(52) U.S. Cl.
CPC ............ *H04N 13/0025* (2013.01); *G03B 35/08* (2013.01); *H04N 5/16* (2013.01); *H04N 5/3572* (2013.01); *H04N 13/0217* (2013.01); *H04N 13/0235* (2013.01); *H04N 13/0271* (2013.01)

(58) Field of Classification Search
CPC ............... G03B 35/08; H04N 13/0025; H04N 13/0217; H04N 13/0235; H04N 13/0271; H04N 5/16; H04N 5/3572; H04N 13/021; H04N 13/0239; H04N 13/0438; H04N 13/0296; H04N 5/23212; G06T 2200/21; G06T 2207/10016; G06T 2207/10024; G06T 2207/10148; G06T 2207/20016; G06T 5/50
USPC ............................................................. 348/49
See application file for complete search history.

(56) References Cited

U.S. PATENT DOCUMENTS 5,756,981 A * 5/1998 Roustaei et al. .......... 235/462.42
7,027,081 B2 * 4/2006 Kremen ........................ 348/51
(Continued)

FOREIGN PATENT DOCUMENTS

EP 1087336 A2 3/2001
EP 1635138 A1 3/2006
(Continued)

OTHER PUBLICATIONS

Adelson et al, Single Lens Stereo with a Plenoptic Camera, Feb. 1992.*
(Continued)

*Primary Examiner* — Shan Elahi
(74) *Attorney, Agent, or Firm* — Birch, Stewart, Kolasch & Birch, LLP

(57) ABSTRACT

Provided is a technique capable of correcting unique shading characteristics of a single-eye stereoscopic imaging device. A focal length is acquired. A one-dimensional correction table corresponding to the focal length is acquired from a plurality of stored one-dimensional correction tables. Shading correction is performed using the acquired one-dimensional correction table. An arbitrary pixel is selected from main pixels, a correction value corresponding to the position of the selected pixel is read from the acquired one-dimensional correction table for the main pixel, and shading correction is performed for the basis of the correction value and the value of the arbitrary pixel. This process is performed for all of the main pixels and the sub-pixels. A two-dimensional SD correction unit performs normal shading correction for the data subjected to the shading correction using a two-dimensional correction table.

20 Claims, 39 Drawing Sheets

(51) Int. Cl.
*H04N 13/02* (2006.01)
*H04N 5/16* (2006.01)
*H04N 5/357* (2011.01)

(56) References Cited

U.S. PATENT DOCUMENTS

| | | | |
|---|---|---|---|
| 2002/0094131 | A1 | 7/2002 | Shirakawa |
| 2002/0196472 | A1* | 12/2002 | Enomoto ................. 358/3.26 |
| 2003/0031375 | A1* | 2/2003 | Enomoto ................. 382/255 |
| 2003/0222998 | A1* | 12/2003 | Yamauchi et al. ........... 348/262 |
| 2004/0179128 | A1 | 9/2004 | Oikawa |
| 2004/0217287 | A1* | 11/2004 | Watanabe et al. ............ 250/310 |
| 2007/0263087 | A1* | 11/2007 | Hong et al. ................ 348/14.13 |
| 2008/0211931 | A1* | 9/2008 | Fujisawa et al. ......... 348/231.99 |
| 2008/0211941 | A1* | 9/2008 | Deever et al. ................ 348/262 |
| 2008/0273812 | A1 | 11/2008 | Fujita et al. |
| 2009/0034086 | A1* | 2/2009 | Montgomery et al. ....... 359/629 |
| 2009/0268053 | A1 | 10/2009 | Wang et al. |
| 2010/0091161 | A1 | 4/2010 | Suzuki |
| 2010/0097444 | A1* | 4/2010 | Lablans .......................... 348/46 |
| 2010/0157094 | A1* | 6/2010 | Takamiya ................. 348/229.1 |
| 2011/0018974 | A1* | 1/2011 | Wang .............................. 348/49 |
| 2011/0037888 | A1* | 2/2011 | Onuki ........................... 348/340 |
| 2012/0092545 | A1* | 4/2012 | Sugawara ..................... 348/345 |
| 2013/0314564 | A1 | 11/2013 | Kimijima et al. |

FOREIGN PATENT DOCUMENTS

| | | |
|---|---|---|
| JP | 2003-007994 A | 1/2003 |
| JP | 2004-191629 A | 7/2004 |
| JP | 2006-157344 A | 6/2006 |
| JP | 2007-279512 A | 10/2007 |
| JP | 2008-270937 A | 11/2008 |
| JP | 2008-312073 A | 12/2008 |
| JP | 2009-244858 A | 10/2009 |

OTHER PUBLICATIONS

International Search Report for PCT/JP2011/070226 mailed on Dec. 13, 2011.
Written Opinion of the International Searching Authority for PCT/JP2011/070226 mailed on Dec. 13, 2011 (Japanese).
Japanese Office Action, issued Jan. 5, 2015, for Japanese Application No. 2013-207814, along with an English translation.
European Office Action, dated Sep. 9, 2014, for European Application No. 11825025.7.
Summons to attend oral proceedings pursuant to Rule 115(1) EPC issued in corresponding EP Application No. 11825025.7 on Jul. 17, 2015.
Tomazevic et al., "Comparative evaluation of retrospective shading correction methods", Journal of Microscopy, vol. 208, No. 3, Dec. 1, 2002, pp. 212-223, XP055039617, ISSN: 0022-2720.

* cited by examiner

ODD-NUMBERED LINE — EVEN-NUMBERED LINE (MAIN PIXEL)

(SUB-PIXEL)

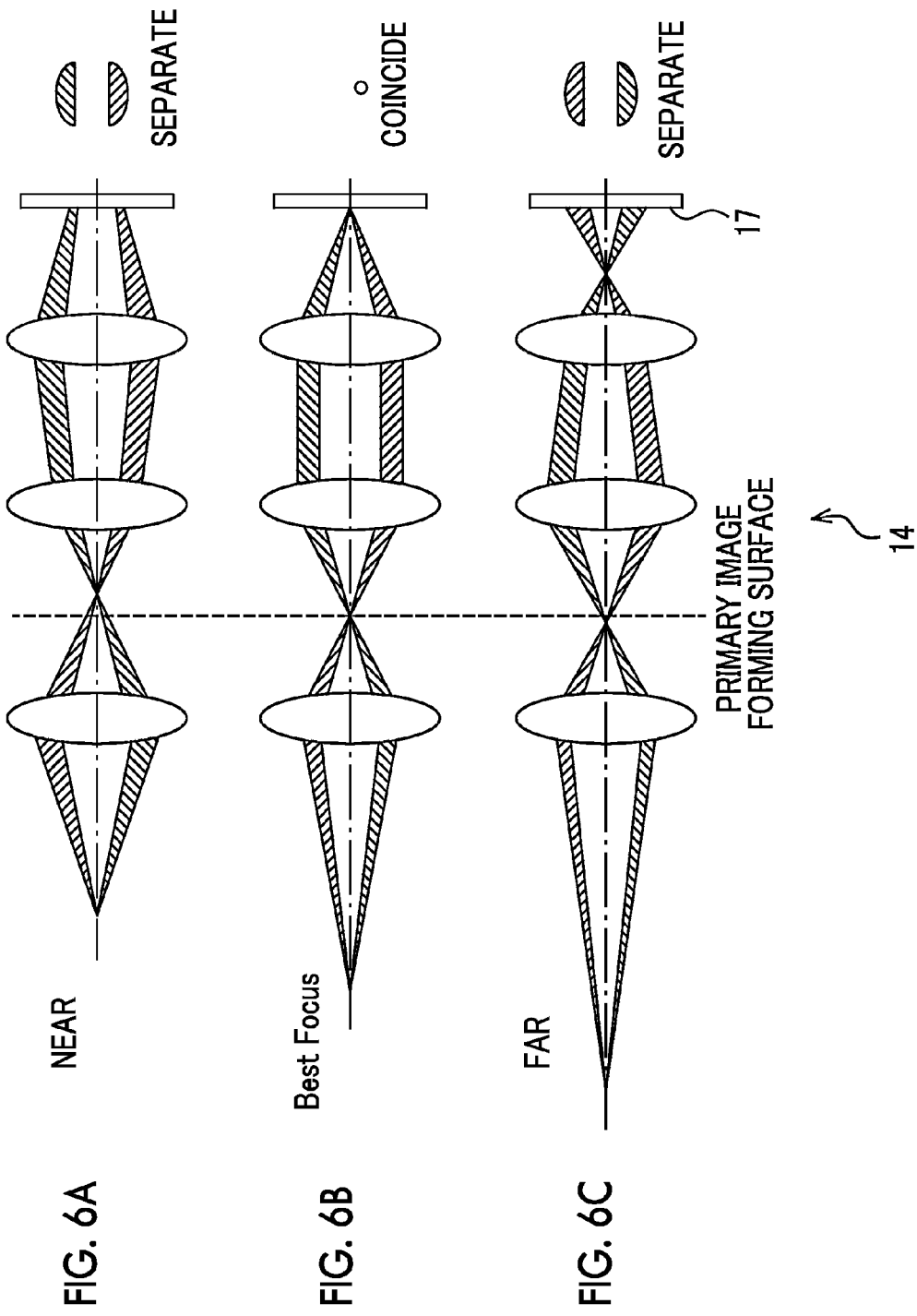

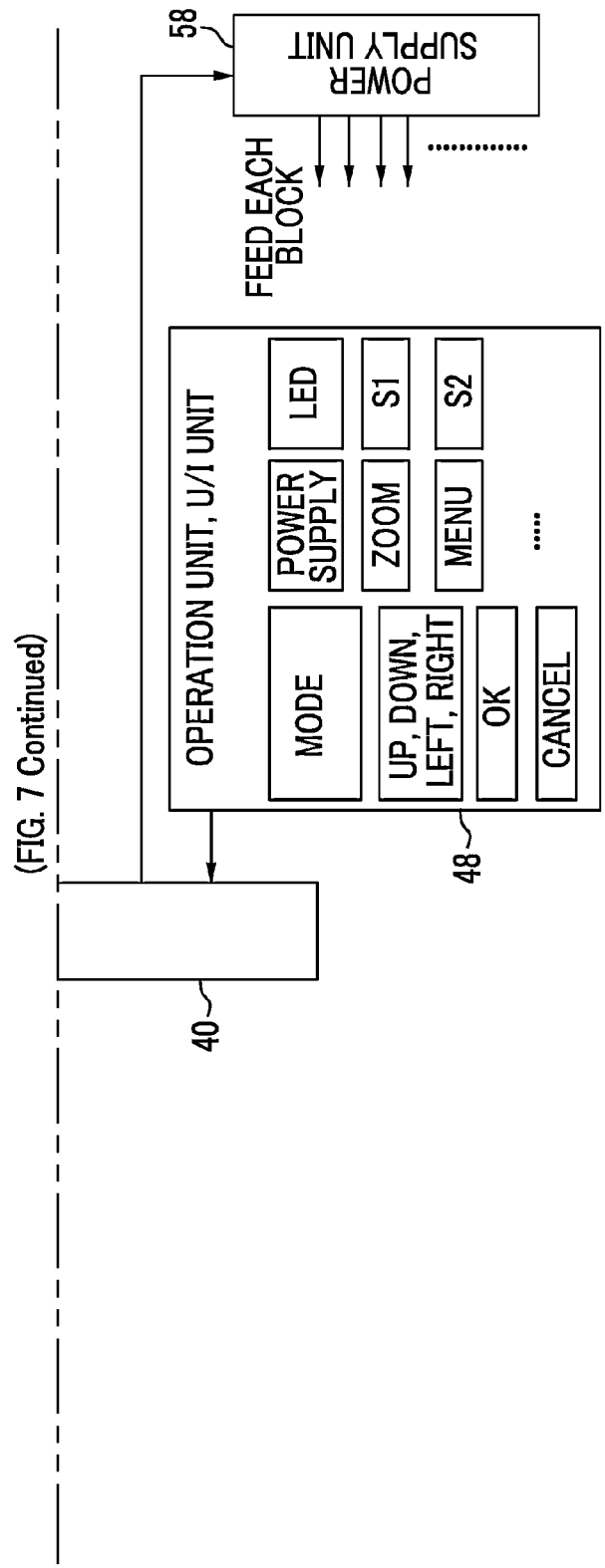

GENERAL TWO-DIMENSIONAL
SD CORRECTION TABLE

ONE-DIMENSIONAL SD CORRECTION
TABLE FOR SINGLE-EYE 3D

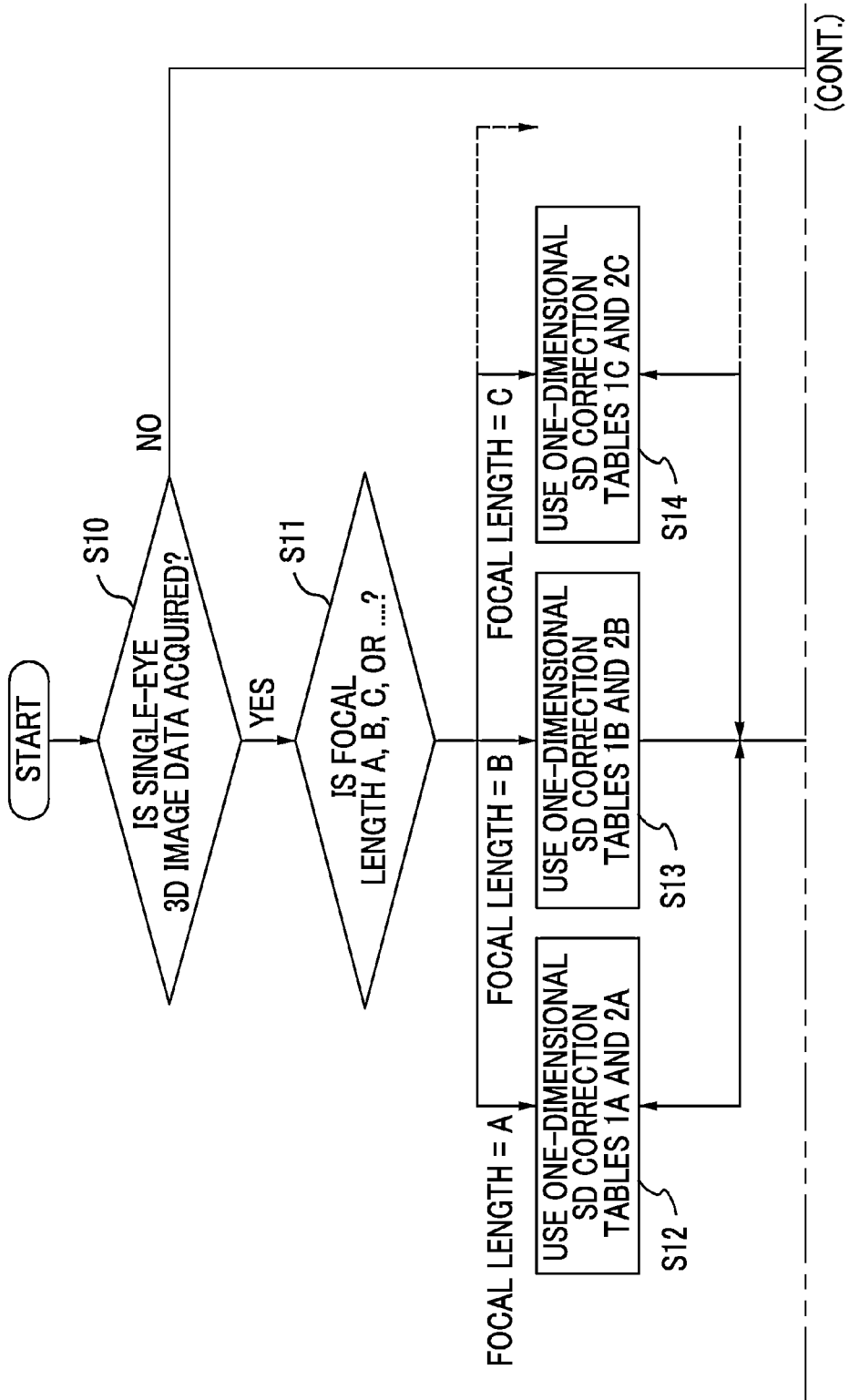

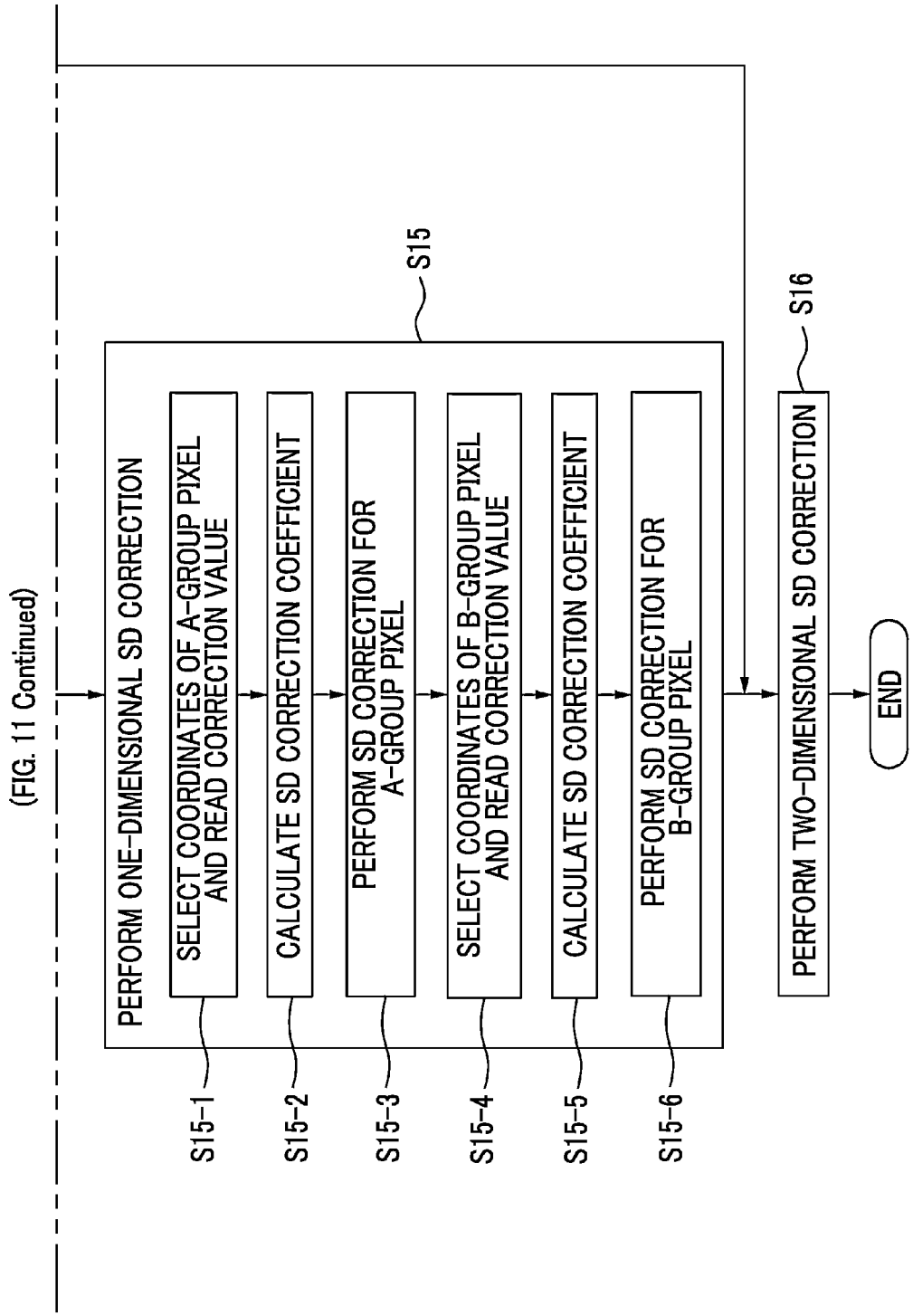

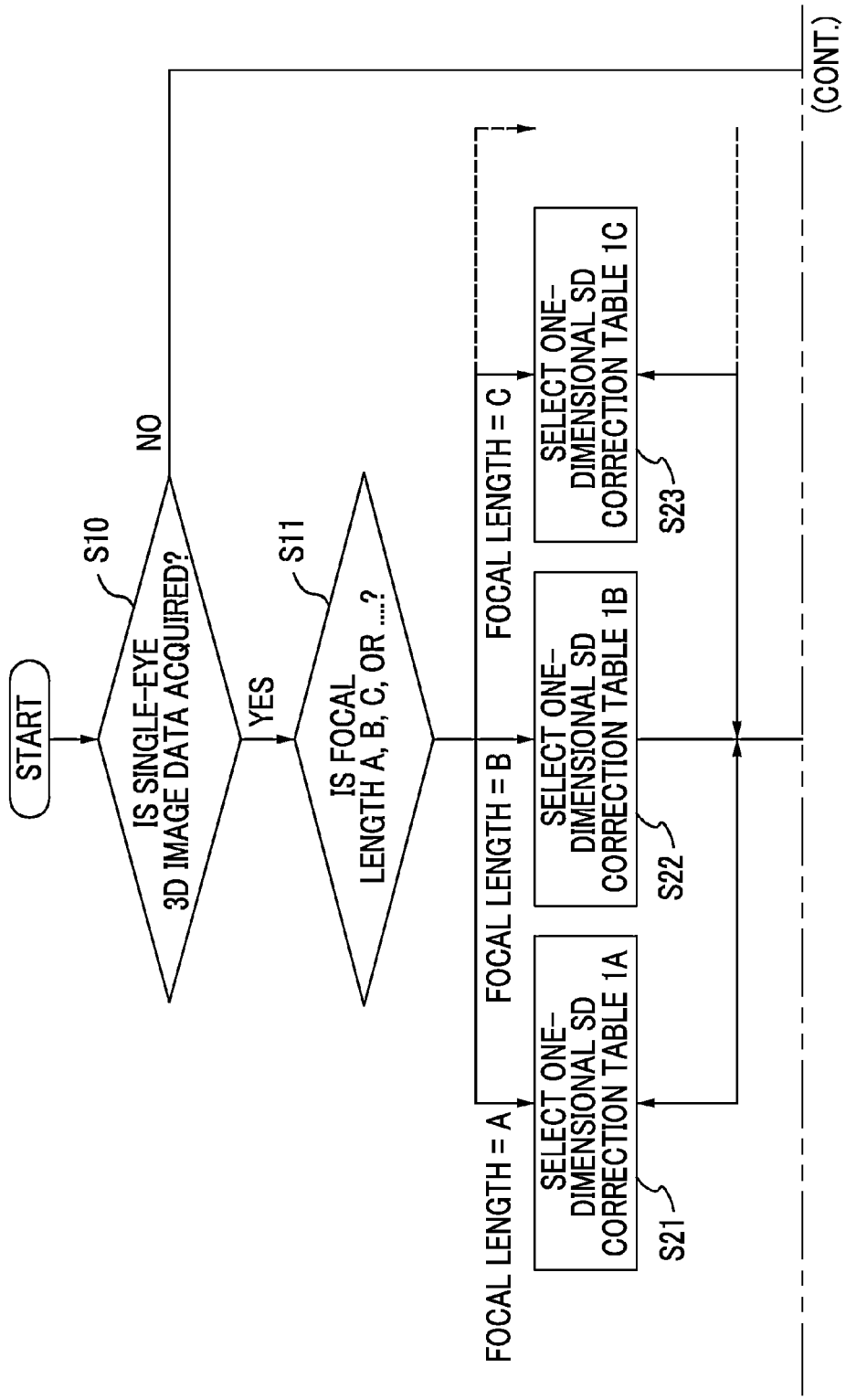

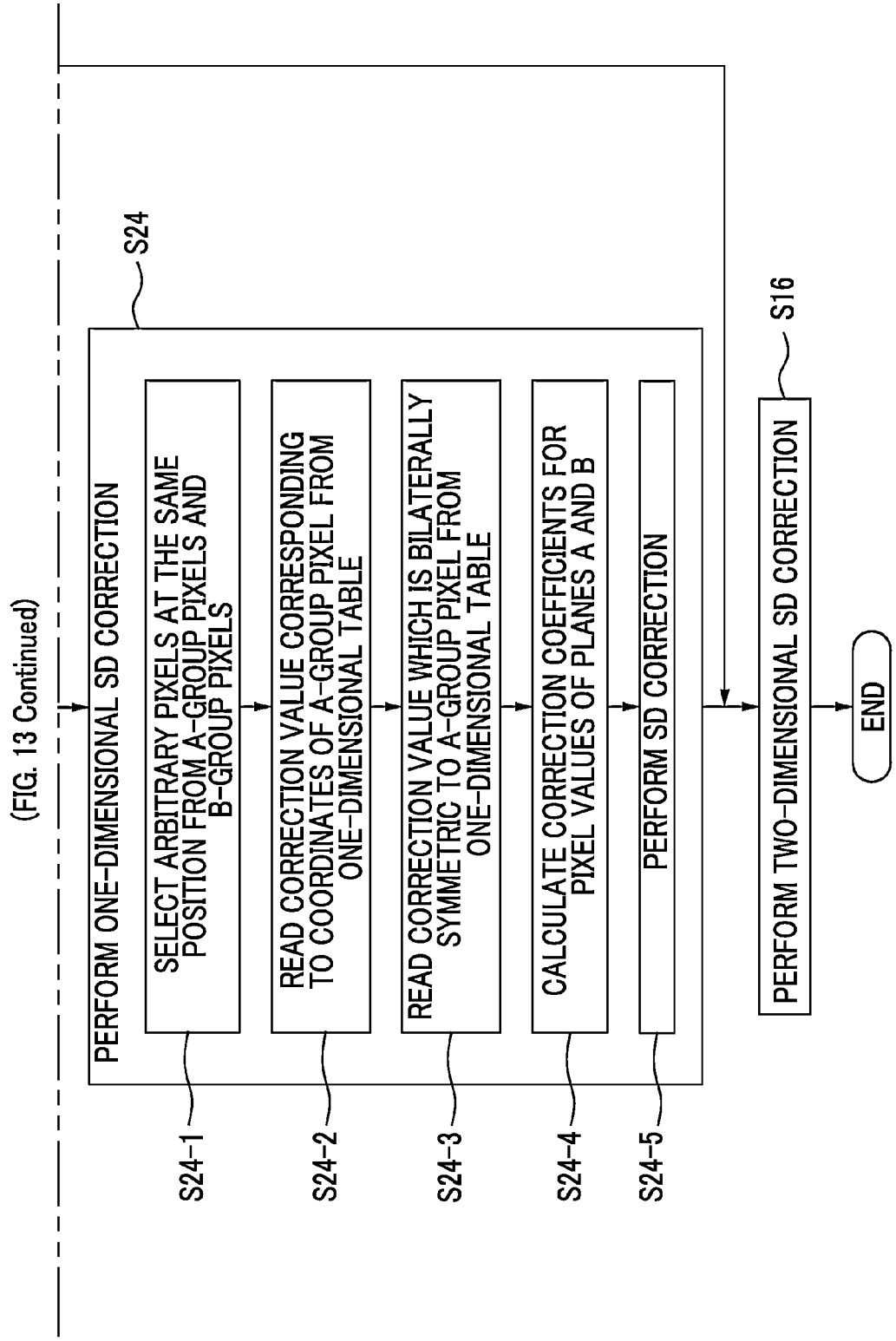

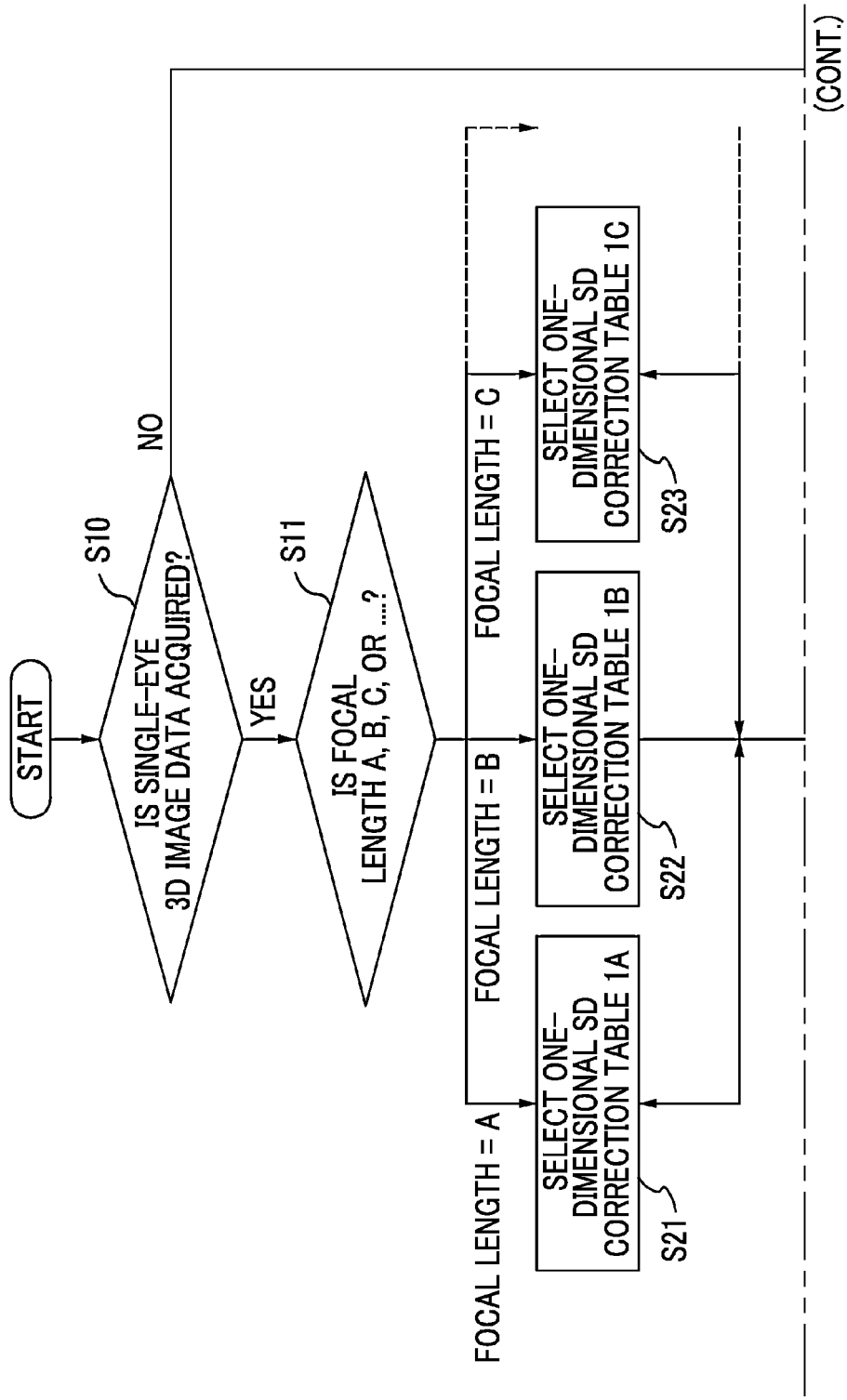

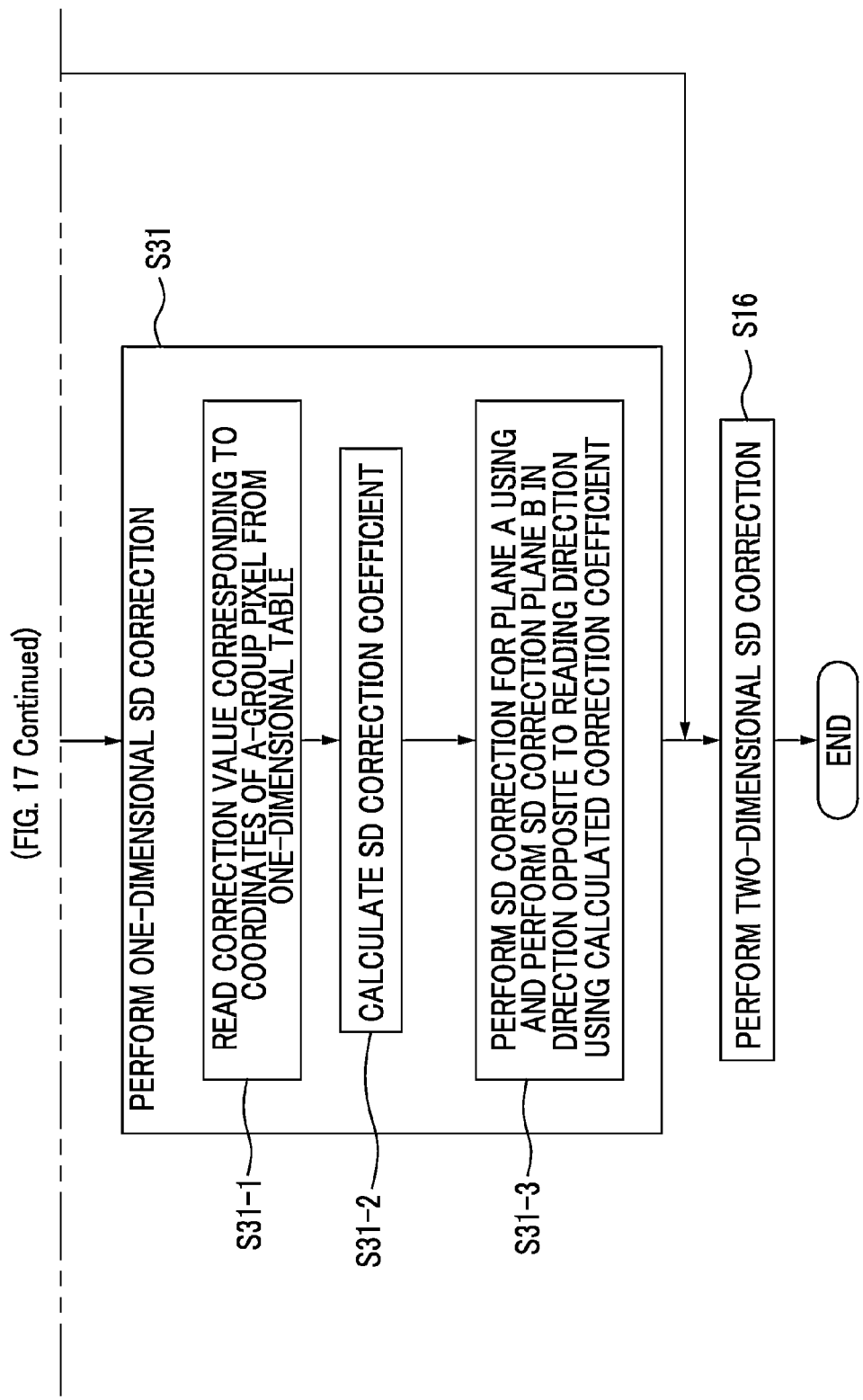

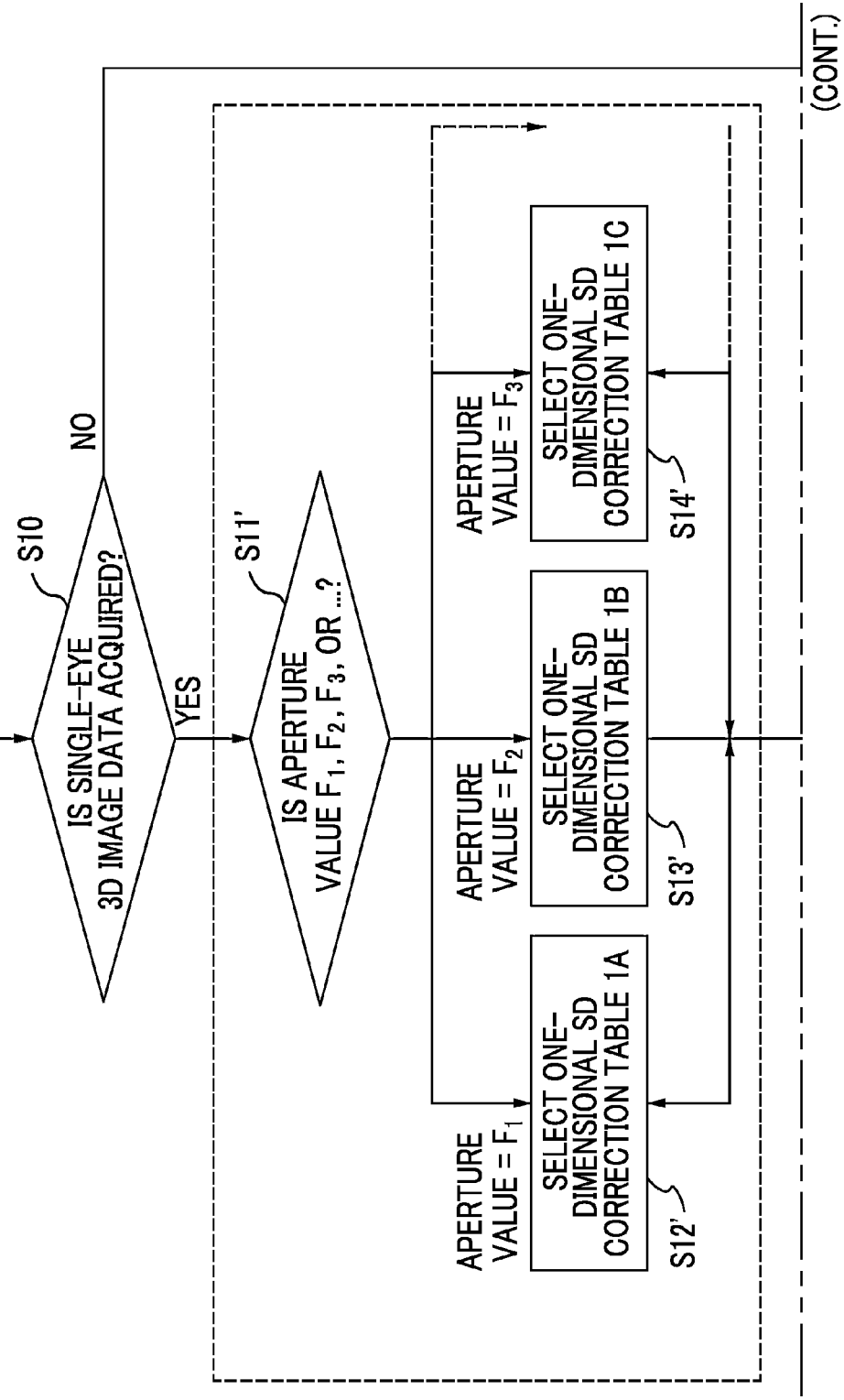

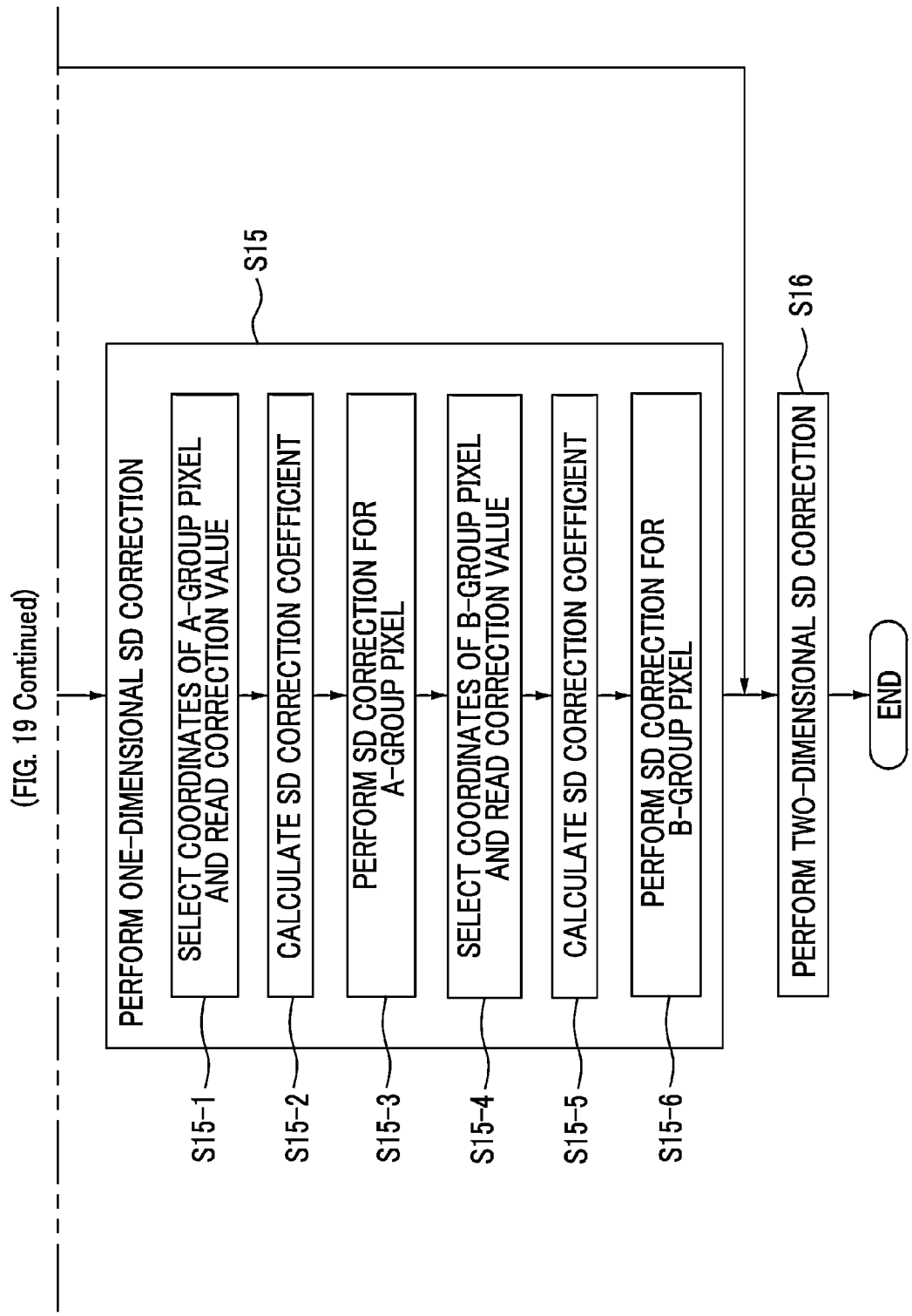

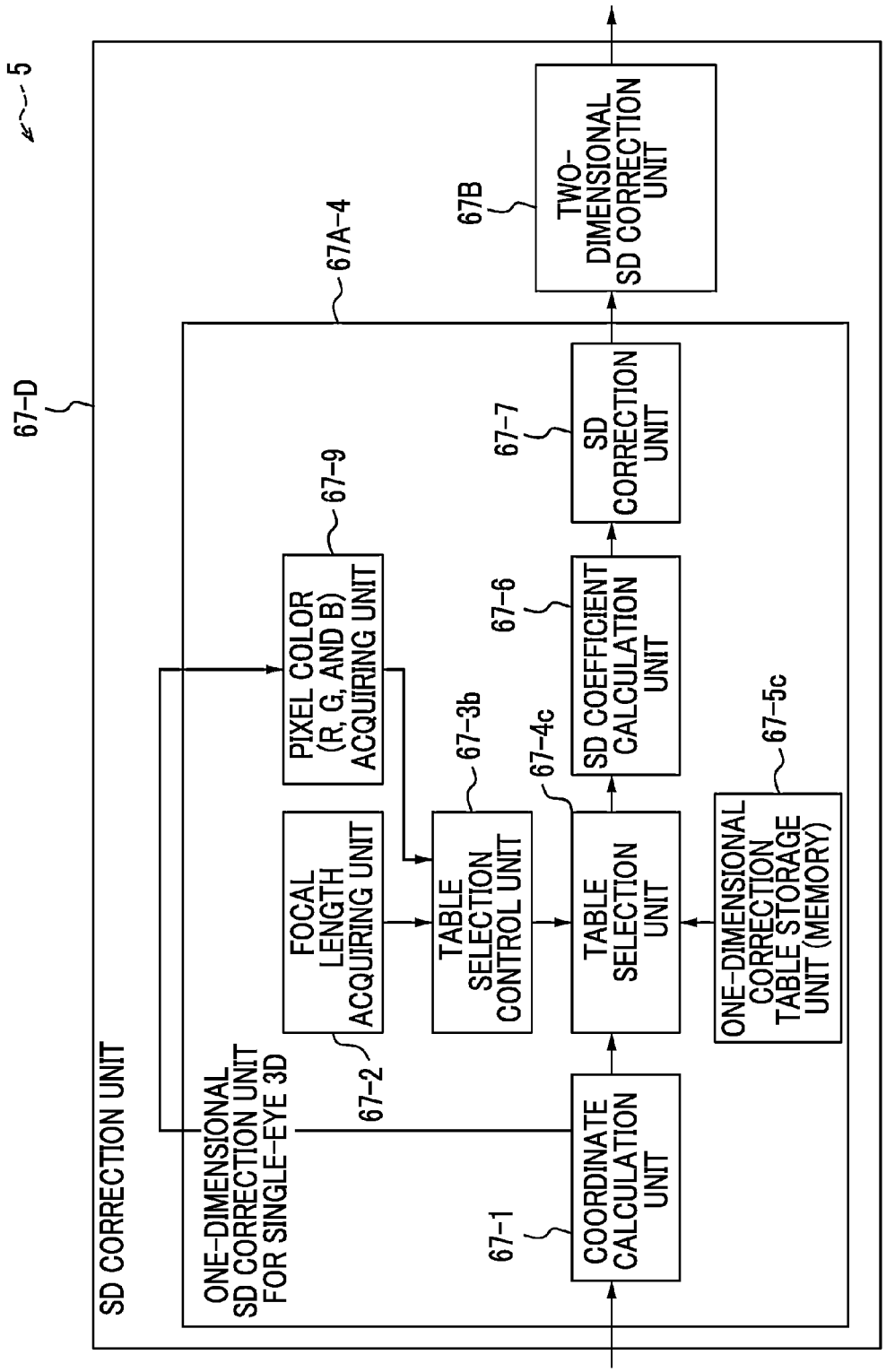

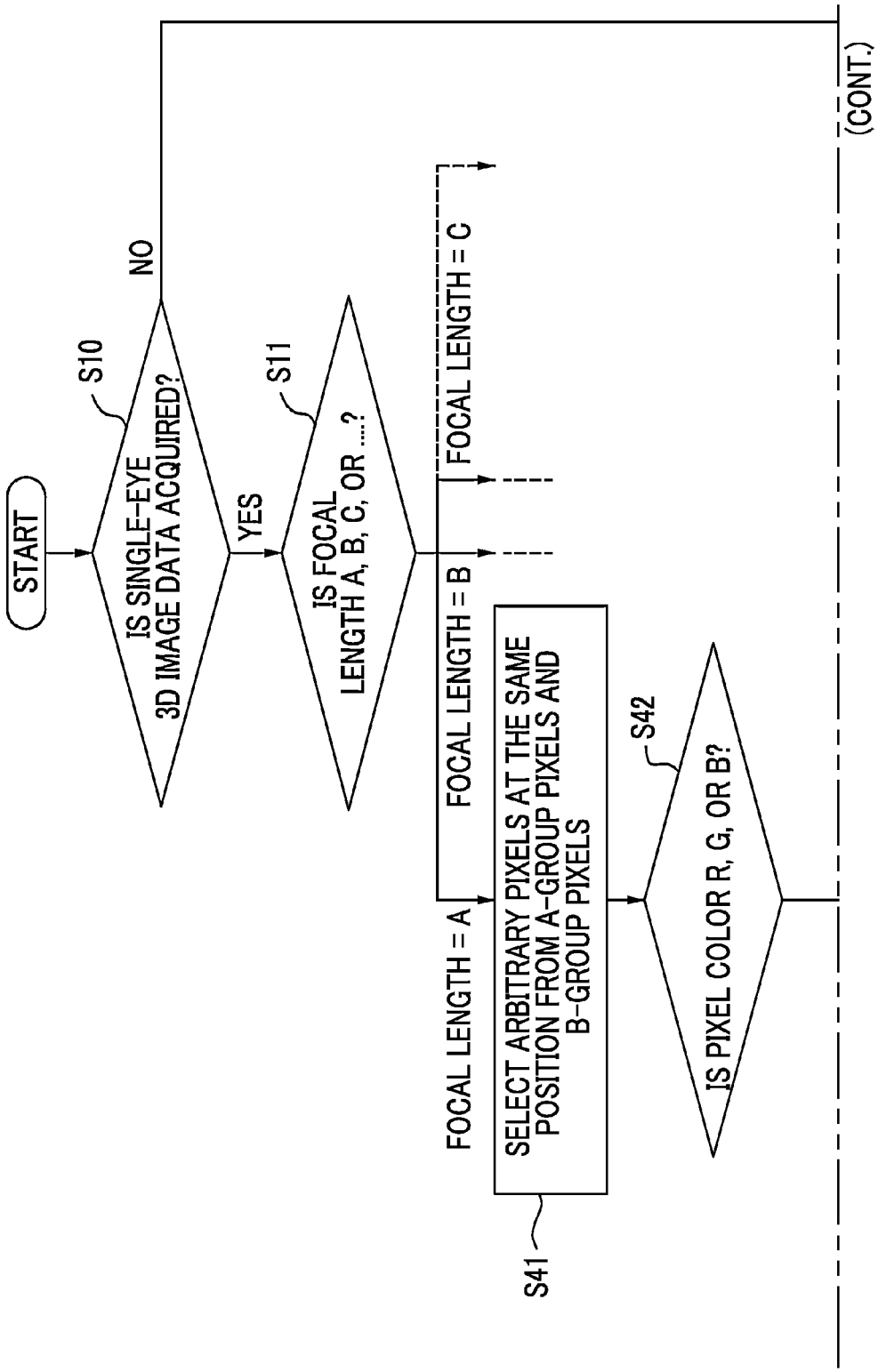

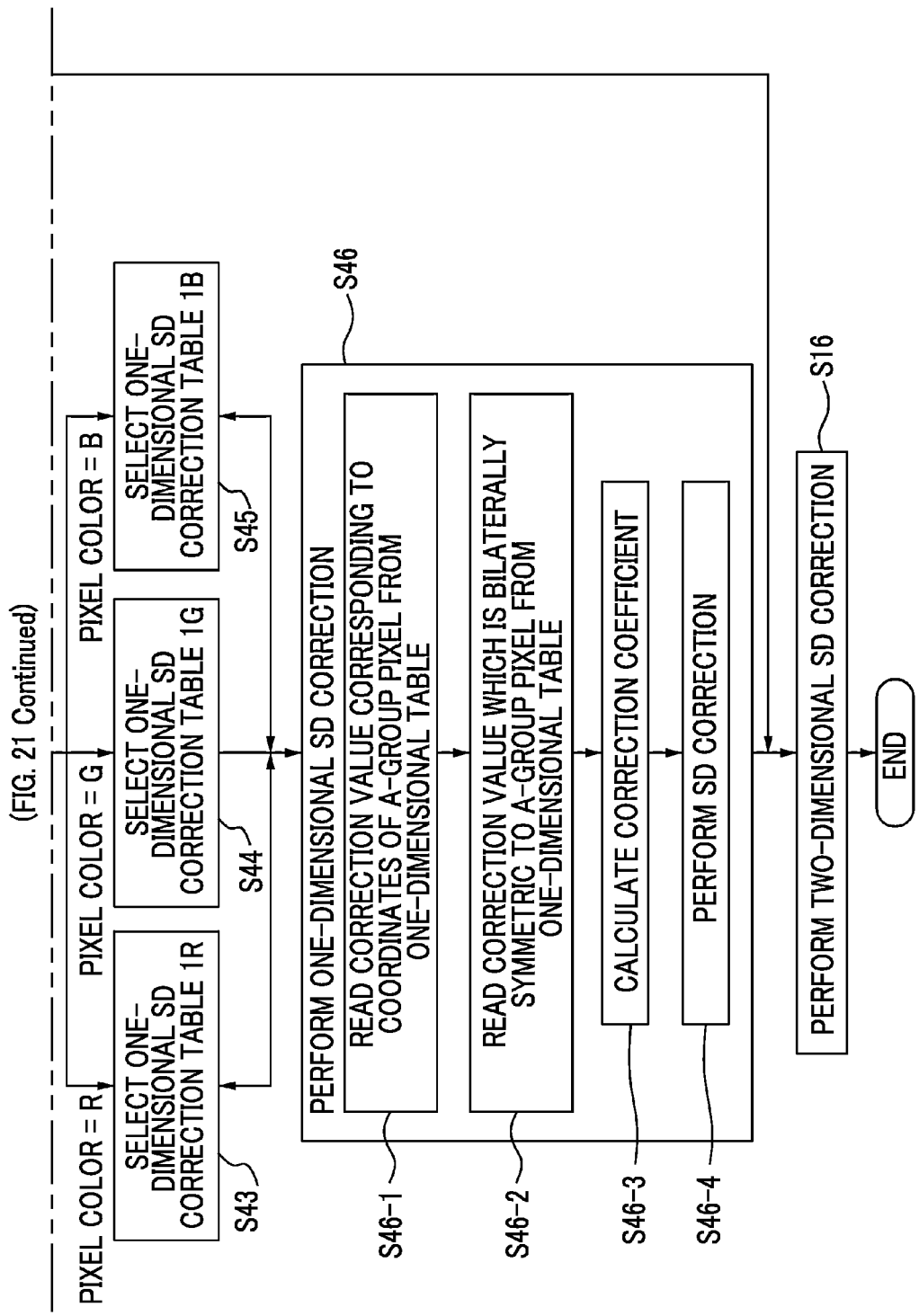

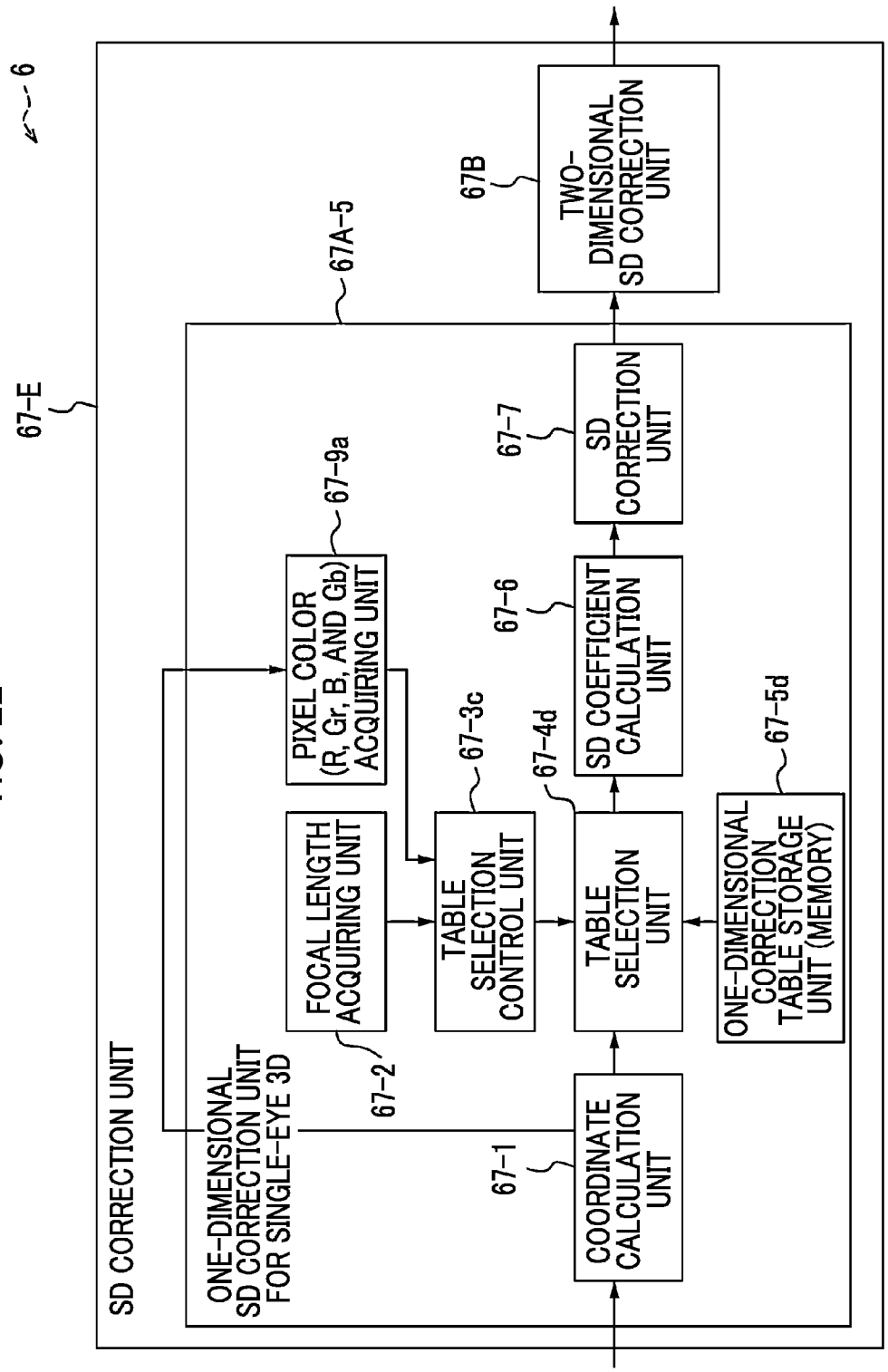

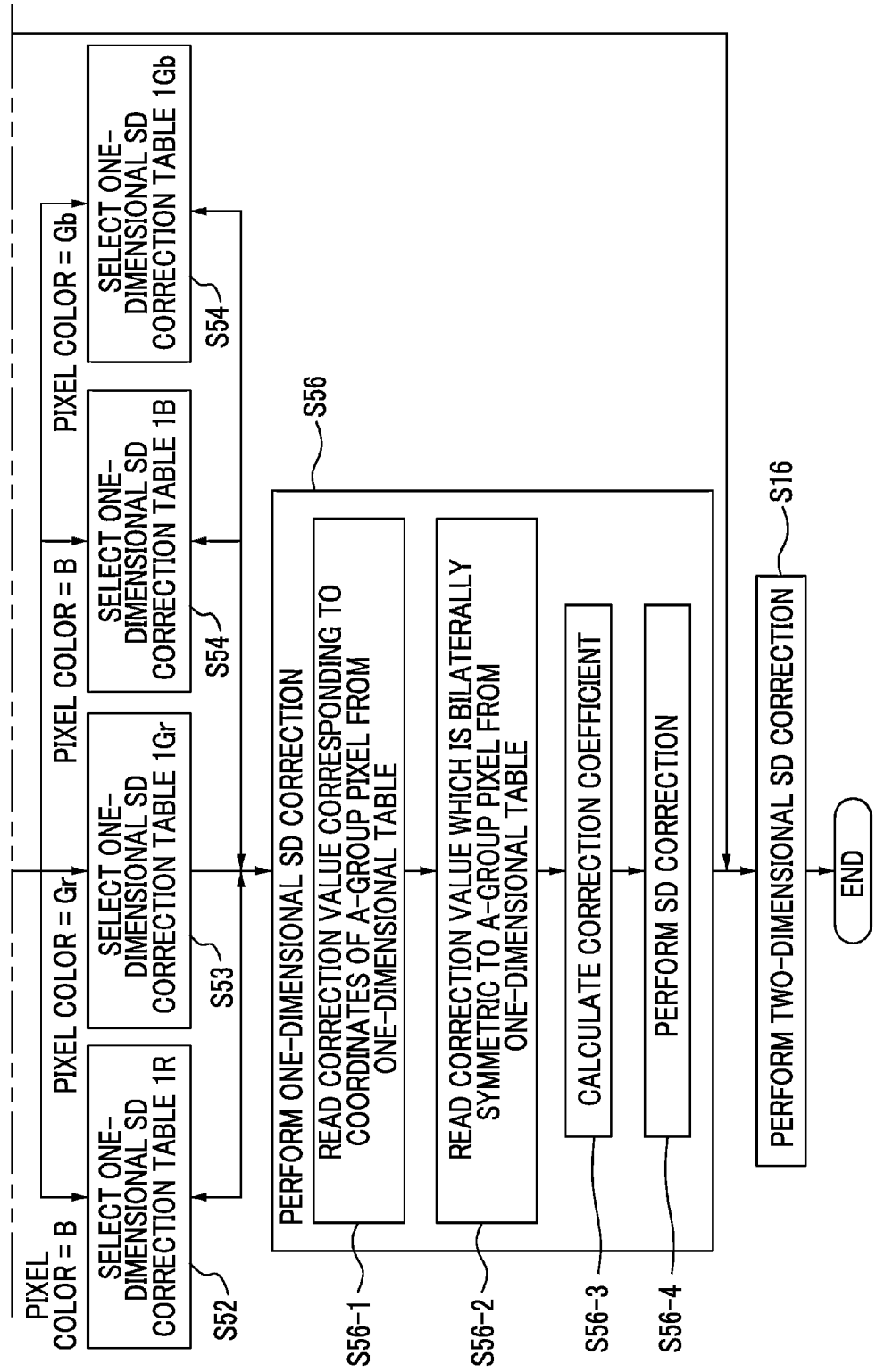

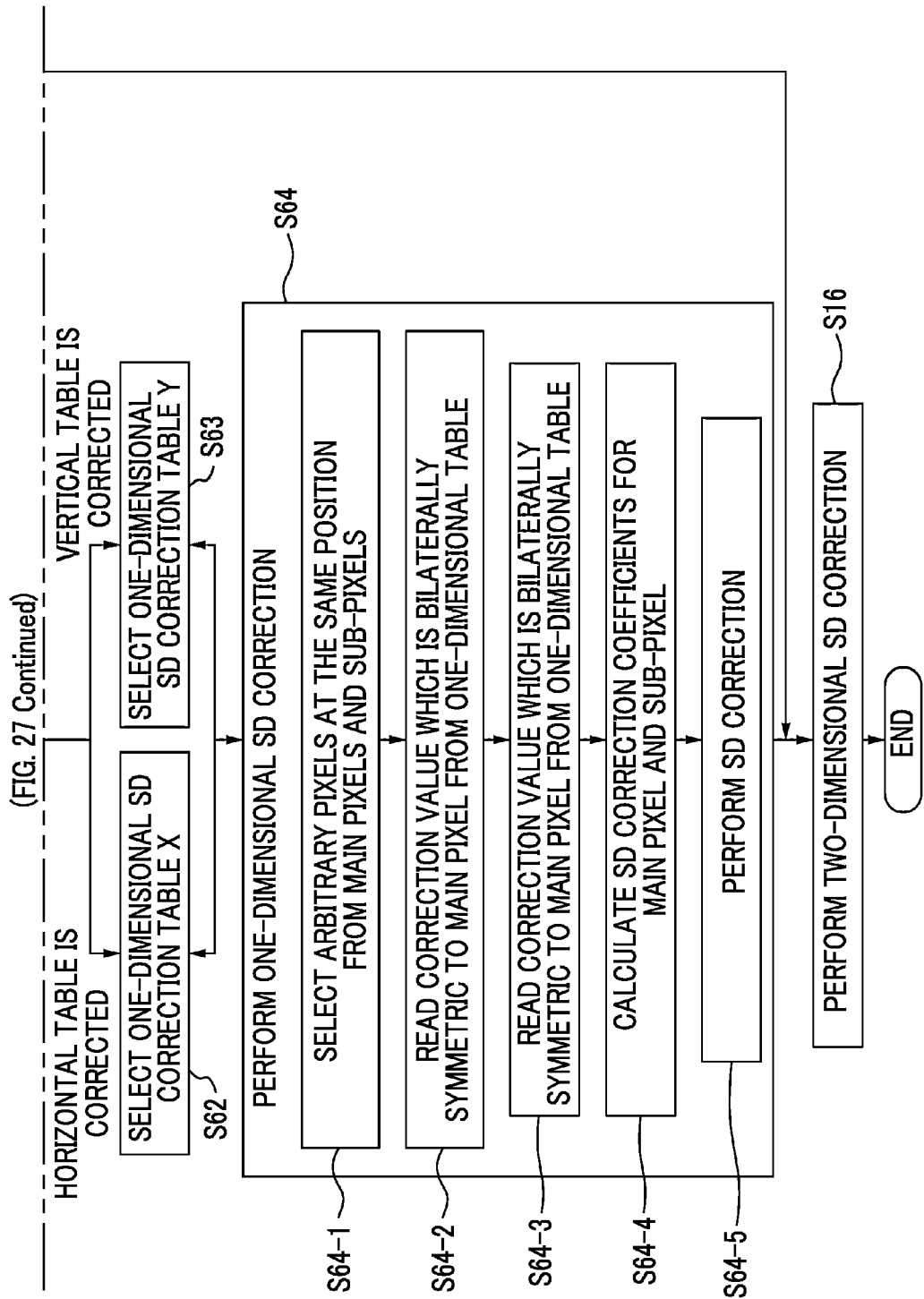

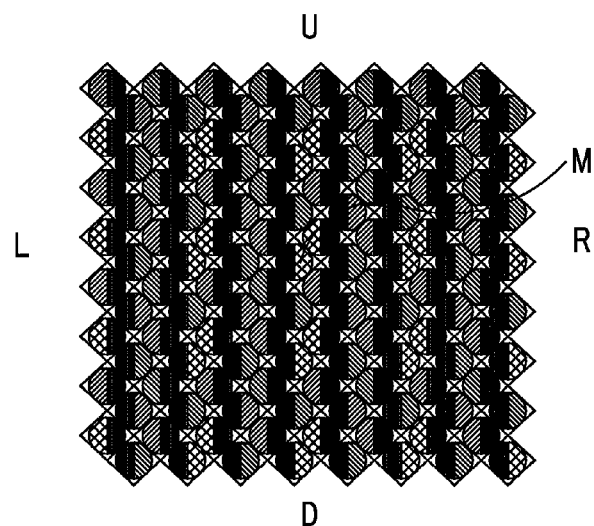
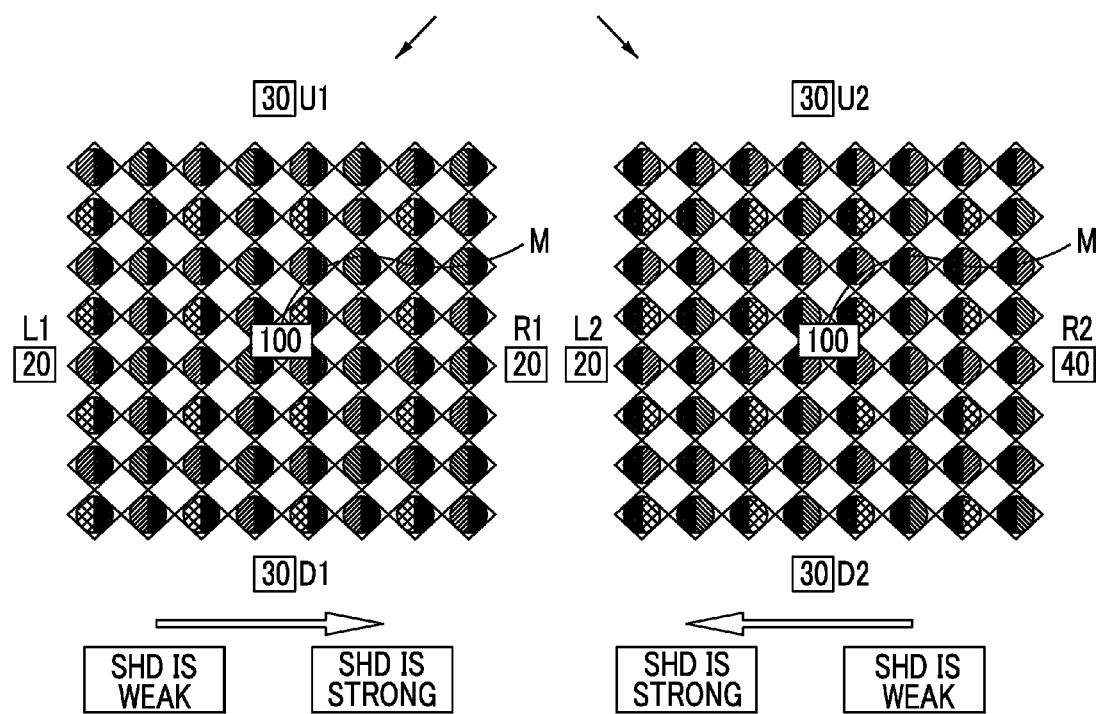

SINGLE-EYE STEREOSCOPIC IMAGING DEVICE, CORRECTION METHOD THEREOF, AND RECORDING MEDIUM THEREOF

CROSS REFERENCE TO RELATED APPLICATIONS

This non-provisional application is a Continuation of International Application No. PCT/JP2011/070226 filed on Sep. 6, 2011, which claims the benefit of Japanese Patent Application Nos. 2010-204566 filed in Japan on Sep. 13, 2010 and 2011-026428 filed in Japan on Feb. 9, 2011. The entire contents of all of the above applications are hereby incorporated by reference.

BACKGROUND OF THE INVENTION

1. Field of the Invention

The present invention relates to a single-eye stereoscopic imaging device, a correction method thereof, and a recording medium thereof, and more particularly, to a technique which forms object images passing through different regions of an imaging lens in the lateral direction on an imaging element to acquire an image for the left eye and an image for the right eye.

2. Description of the Related Art

JP2008-270937A discloses a technique which performs shading correction for at least one of an image for the right eye and an image for the left eye when the image for the right eye and the image for the left eye are acquired from individual imaging elements to generate a stereoscopic image.

JP2007-279512A discloses a stereoscopic imaging element in which a microlens is provided on each photodiode forming one imaging element and the position of the microlens deviates from the position of the corresponding photodiode to divide the pixels into an A-group pixel and a B-group pixel.

SUMMARY OF THE INVENTION

However, the technique disclosed in JP2008-270937A is based on application to a multi-eye camera including a plurality of imaging optical systems, but it is difficult to apply the technique to a single-eye 3D camera (single-eye stereoscopic imaging device) which uses a single imaging lens (imaging optical system), divides beams passing through the single imaging lens into a plurality of beams, and focuses the beams on a single imaging element (pupil division) to capture a stereoscopic image (hereinafter, referred to as a pupil division type). In addition, JP2008-270937A does not disclose the details of shading correction. JP2007-279512A discloses that the image captured by the A-group pixels and the image captured by the B-group pixels have different shading characteristics.

FIGS. 31A to 31C are schematic diagrams illustrating an imaging element including the A-group pixels and the B-group pixels. FIG. 31A is a diagram illustrating the entire imaging element, FIG. 31B is a diagram illustrating the A-group pixels, and FIG. 31C is a diagram illustrating the B-group pixels. The single-eye 3D camera is designed such that a microlens is provided on the front surface of a photodiode and the A-group pixels and the B-group pixels (that is, parallax) are obtained by, for example, the position or shape of the microlens.

In the single-eye 3D camera, similarly to a general 2D camera, the center of the imaging element is aligned with the center of the optical lens. Therefore, first, it is necessary to correct shading characteristics (hereinafter, referred to as normal shading correction) in which, as the distance from a central portion of the imaging lens (that is, a central portion M of the imaging element) increases, the signal level of peripheral portions (U, D, R, and L) of the imaging element is reduced for the level of an imaging signal in the vicinity of the central portion of the imaging lens. The normal shading correction also includes, for example, the correction of a variation in each pixel of the imaging element.

In addition, for both the main pixel group shown in FIG. 31B and the sub-pixel group shown in FIG. 31C, the amount of light received in each pixel in the edge portions (U1, D1, R1, L1, U2, D2, R2, and L2) is less than that in the central portions M1 and M2. In particular, in the main pixel group shown in FIG. 31B, the amount of light received at the right end of FIG. 31B in the pupil division direction (lateral direction) is less than that at the left end. In the sub-pixel group shown in FIG. 31C, the amount of light received at the left end of FIG. 31C in the pupil division direction (lateral direction) is less than that at the right end. For example, when the amount of light received in the central portions M1 and M2 is 100, the amount of light received in the portions U1, D1, U2, and D2 in the longitudinal direction is about 30, the amount of light received in the portion L1 in the main pixel group is about 40, and the amount of light received in the portion R1 in the main pixel group is about 20. On the other hand, in the sub-pixel group, the amount of light received in the portion R2 is about 40 and the amount of light received in the portion L2 is about 20. That is, shading characteristics caused by the pupil division direction occurs.

The reason will be described with reference to FIG. 32. As shown in FIG. 32, in the single-eye 3D camera, beams which have passed through an imaging lens L are emitted to photodiodes (for example, PDma and PDmb, and PDca and PDcb) which are separately arranged each microlens (for example, Lm and Lc) and a plurality of viewpoint images are obtained. In this structure, in a central portion R1 of the light receiving surface of the imaging element having the optical axis 10 of the imaging lens L as the center, since beams are uniformly incident in the X direction (lateral direction) on the basis of the center of the optical axis of the microlens, signals with uniform brightness are output from the photodiodes (PDca and PDcb). However, in the edge portions R2 and R3 of the light receiving surface of the imaging element, since beams are non-uniformly incident in the X direction (lateral direction), signals with non-uniform brightness are output from the photodiodes (PDma and PDmb). That is, a plurality of viewpoint images do not have uniform brightness in the edge portions of the light receiving surface of the imaging element in the pupil division direction X.

It is difficult to correct the unique shading characteristics of the single-eye 3D camera in which the amount of light received is changed in the pupil division direction, using the normal shading correction.

The technique disclosed in JP2007-279512A is for shifting the position of the microlens to prevent shading and JP2007-279512A does not disclose image processing for removing shading.

The present invention has been made in view of the above-mentioned problems and an object of the present invention is to provide a single-eye stereoscopic imaging device capable of correcting the unique shading characteristics of a single-eye stereoscopic imaging device with a simple method, a correction method thereof, and a recording medium thereof.

In order to achieve the object, according to an aspect of the present invention, there is provided a single-eye stereoscopic imaging device including: a single imaging optical system; pupil division unit for dividing beams passing through the imaging optical system into a plurality of beams; a single imaging element including a plurality of pixel groups which receive the plurality of beams; first shading correction unit for performing shading correction for all imaging signals output from the single imaging element using a two-dimensional correction table in which correction values for correcting shading in horizontal and vertical directions caused by at least the imaging optical system are arranged; and second shading correction unit for performing shading correction for each imaging signal output from the plurality of pixel groups using a one-dimensional correction table in which correction values for correcting shading in a gradient direction of density unevenness caused by pupil division of the pupil division unit are arranged.

According to the single-eye stereoscopic imaging device, shading correction is performed for all imaging signals output from the single imaging element using the two-dimensional correction table in which the correction values for correcting shading in the horizontal and vertical directions caused by at least the imaging optical system are arranged. In addition, shading correction is performed for each imaging signal output from the plurality of pixel groups using the one-dimensional correction table in which the correction values for correcting shading in the gradient direction of density unevenness caused by the pupil division of the pupil division unit are arranged. In this way, it is possible to correct the shading characteristics in which, as the distance from a central portion of the imaging lens increases, the level of the imaging signal is reduced, for the level of the imaging signal in the vicinity of the central portion of the imaging lens. In addition, it is possible to correct the unique shading characteristics of the single-eye stereoscopic imaging device in which the amount of light received is changed in the pupil division direction.

In the single-eye stereoscopic imaging device according to the above-mentioned aspect, the second shading correction unit may perform the shading correction for the plurality of pixel groups using the same one-dimensional correction table.

According to the single-eye stereoscopic imaging device, shading correction is performed for the plurality of pixel groups using the same one-dimensional correction table. Therefore, it is to prevent an increase in memory capacity, the amount of calculation, or a circuit size and reduce a circuit size or the amount of memory used.

In the single-eye stereoscopic imaging device according to the above-mentioned aspect, the imaging element may include a first pixel group and a second pixel group that receive the plurality of beams. The second shading correction unit may include: unit for selecting, as a first pixel, a pixel at an arbitrary position of a predetermined column of the first pixel group and selecting, as a second pixel, a pixel at a position corresponding to the first pixel in a predetermined column of the second pixel group; unit for reading a correction value at a position corresponding to the position of the first pixel as a correction value for the first pixel from the one-dimensional correction table; unit for reading a correction value which is bilaterally symmetric to the correction value for the first pixel in the one-dimensional correction table as a correction value for the second pixel; and unit for correcting the shading of the first pixel on the basis of a value of the first pixel and the correction value for the first pixel and correcting the shading of the second pixel on the basis of a value of the second pixel and the correction value for the second pixel.

According to the single-eye stereoscopic imaging device, a pixel at an arbitrary position of a predetermined column of the first pixel group is selected as the first pixel. The correction value at the position corresponding to the position of the first pixel is read as the correction value for the first pixel from the one-dimensional correction table. The shading of the first pixel is corrected on the basis of the value of the first pixel and the correction value for the first pixel. In addition, the pixel at a position corresponding to the first pixel in a predetermined column of the second pixel group is selected as the second pixel. The correction value which is bilaterally symmetric to the correction value for the first pixel in the one-dimensional correction table is read as the correction value for the second pixel. The shading of the second pixel is corrected on the basis of the value of the second pixel and the correction value for the second pixel. In this way, it is possible to perform shading correction for the main pixel and the sub-pixel having bilaterally symmetric shading characteristics using one one-dimensional correction table.

In the single-eye stereoscopic imaging device according to the above-mentioned aspect, the imaging element may include a first pixel group and a second pixel group that receive the plurality of beams. The second shading correction unit may include: unit for selecting, as a first pixel, a pixel at an arbitrary position of a predetermined column of the first pixel group and selecting, as a second pixel, a pixel at a position which is bilaterally symmetric to the position of the first pixel in a predetermined column of the second pixel group; unit for reading a correction value at a position corresponding to the position of the first pixel from the one-dimensional correction table; and unit for correcting the shading of the first pixel on the basis of a value of the first pixel and the correction value at the position corresponding to the position of the first pixel and correcting the shading of the second pixel on the basis of a value of the second pixel and the correction value at the position corresponding to the position of the first pixel.

According to the single-eye stereoscopic imaging device, the pixel at an arbitrary position of a predetermined column of the first pixel group is selected as the first pixel. The correction value at the position corresponding to the position of the first pixel is read from the one-dimensional correction table. The shading of the first pixel is corrected on the basis of the value of the first pixel and the correction value at the position corresponding to the position of the first pixel. In addition, the pixel at a position which is bilaterally symmetric to the position of the first pixel in a predetermined column of the second pixel group is selected as the second pixel. The correction value at a position corresponding to the position of the first pixel is read from the one-dimensional correction table. The shading of the second pixel is corrected on the basis of the value of the second pixel and the correction value at the position corresponding to the position of the first pixel. In this way, it is possible to perform shading correction for the main pixel and the sub-pixel having bilaterally symmetric shading characteristics using one one-dimensional correction table.

The single-eye stereoscopic imaging device according to the above-mentioned aspect may further include focal length acquiring unit. The imaging optical system may include a zoom lens. The focal length acquiring unit may acquire a focal length from the position of the zoom lens. The second shading correction unit may store a plurality of one-dimensional correction tables according to the focal length and perform the shading correction using the one-dimensional correction table corresponding to the focal length acquired by the focal length acquiring unit.

According to the single-eye stereoscopic imaging device, shading correction is performed using an appropriate one-dimensional correction table which is selected from a plurality of one-dimensional correction tables on the basis of the focal length. Therefore, it is possible perform appropriate shading correction corresponding to the focal length.

In the single-eye stereoscopic imaging device according to the above-mentioned aspect, the imaging optical system may include an aperture with a variable aperture value. The second shading correction unit may store a plurality of one-dimensional correction tables according to the aperture value of the aperture and perform the shading correction using the one-dimensional correction table corresponding to the current aperture value of the aperture.

According to the single-eye stereoscopic imaging device, shading correction is performed using an appropriate one-dimensional correction table which is selected from a plurality of one-dimensional correction tables on the basis of the aperture value of the aperture. Therefore, it is possible perform appropriate shading correction corresponding to the aperture value.

In the single-eye stereoscopic imaging device according to the above-mentioned aspect, the second shading correction unit may store one-dimensional correction tables for R, G, and B colors, perform the shading correction using the one-dimensional correction table for the R color when the color of a pixel (hereinafter, referred to as a selected pixel) selected from the plurality of pixel groups is R, perform the shading correction using the one-dimensional correction table for the G color when the color of the selected pixel is G, and perform the shading correction using the one-dimensional correction table for the B color when the color of the selected pixel is B.

According to the single-eye stereoscopic imaging device, the shading correction is performed using the one-dimensional correction table for the R color when the color of the pixel selected from the plurality of pixel groups is R. The shading correction is performed using the one-dimensional correction table for the G color when the color of the selected pixel is G. The shading correction is performed using the one-dimensional correction table for the B color when the color of the selected pixel is B. Therefore, it is possible to perform appropriate shading correction for, particularly, the G pixel even when the R, G, and B colors have different shading characteristics.

In the single-eye stereoscopic imaging device according to the above-mentioned aspect, the second shading correction unit may store, as the one-dimensional correction table for the G color, a one-dimensional correction table for a Gr color, which is the color of a G pixel in a horizontal line (hereinafter, referred to as a GR line) of R, G, R, G, . . . pixels, and a one-dimensional correction table for a Gb color, which is the color of a G pixel in a horizontal line (hereinafter, referred to as a GB line) of G, B, G, B, . . . pixels, perform the shading correction using the one-dimensional correction table for the Gr color when the color of the selected pixel is the color of the G pixel read from the GR line, and perform the shading correction using the one-dimensional correction table for the Gb color when the color of the selected pixel is the color of the G pixel read from the GB line.

According to the single-eye stereoscopic imaging device, when the pixel selected from the plurality of pixel groups is the G pixel read from the GR line, the shading correction is performed using the one-dimensional correction table for the Gr color. When the selected pixel is the G pixel read from the GB line, the shading correction is performed using the one-dimensional correction table for the Gb color. Therefore, it is possible to perform appropriate shading correction for, particularly, the G pixel even when the R, G, and B colors have different shading characteristics.

The single-eye stereoscopic imaging device according to the above-mentioned aspect may further include direction detecting unit for detecting a direction of the imaging element. The second shading correction unit may store a one-dimensional correction table when the imaging element is arranged in the horizontal direction and a one-dimensional correction table when the imaging element is arranged in the vertical direction and perform the shading correction using the one-dimensional correction table based on the direction of the imaging element detected by the direction detecting unit.

According to the single-eye stereoscopic imaging device, the direction of the imaging element is detected and shading correction is performed using the one-dimensional correction table based on the direction of the imaging element. Therefore, it is possible to perform appropriate shading correction when a stereoscopic image has parallax in the vertical direction as well as when the stereoscopic image has parallax in the horizontal direction.

In order to achieve the object, according to another aspect of the present invention, there is provided a shading correction method for a single-eye stereoscopic imaging device. The shading correction method includes: acquiring output signals from a plurality of pixel groups that receive a plurality of beams which are obtained from beams passing through a single imaging optical system by pupil division of pupil division unit; and performing shading correction for the output signals from the plurality of pixel groups. In the shading correction for the output signals, the shading correction is performed for the output signals from the plurality of pixel groups using a one-dimensional correction table in which correction values for correcting shading in a gradient direction of density unevenness caused by pupil division of the pupil division unit are arranged, and the shading correction is performed for all of the output signals from the plurality of pixel groups using a two-dimensional correction table in which correction values for correcting shading in horizontal and vertical directions caused by at least the imaging optical system are arranged.

In order to achieve the object, according to another aspect of the present invention, there is provided a non-transitory computer-readable recording medium using a single-eye stereoscopic imaging device that causes an arithmetic device to perform: acquiring output signals from a plurality of pixel groups that receive a plurality of beams which are obtained from beams passing through a single imaging optical system by pupil division of pupil division unit; and performing shading correction for the output signals from the plurality of pixel groups. In the shading correction for the output signals, the shading correction is performed for the output signals from the plurality of pixel groups using a one-dimensional correction table in which correction values for correcting shading in a gradient direction of density unevenness caused by pupil division of the pupil division unit are arranged, and the shading correction is performed for all of the output signals from the plurality of pixel groups using a two-dimensional correction table in which correction values for correcting shading in horizontal and vertical directions caused by at least the imaging optical system are arranged.

According to the aspects of the present invention, it is possible to correct the unique shading characteristics of a single-eye stereoscopic imaging device with a simple method.

BRIEF DESCRIPTION OF THE DRAWINGS

FIG. 5A is a partially enlarged view of FIG. 4 when there is no pupil division; and FIGS. 5B and 5C are partially enlarged views of FIG. 4 when there is pupil division.

FIGS. 6A to 6C are diagrams illustrating the separated state of an image formed on an imaging element due to the difference among the front focus, the best focus, and the rear focus.

FIG. 11 is a flowchart illustrating a shading correction process of the single-eye stereoscopic imaging device 1.

FIG. 13 is a flowchart illustrating a shading correction process of the single-eye stereoscopic imaging device 2.

FIG. 14A shows an arbitrary pixel selected from main pixels; FIG. 14B shows a correction value read from a one-dimensional correction table for a main pixel; and FIG. 14C shows a correction value read from a one-dimensional correction table for a sub-pixel.

FIG. 16A is a diagram illustrating a method of selecting an arbitrary pixel from main pixels; and FIG. 16B is a diagram illustrating a method of selecting an arbitrary pixel from sub-pixels.

FIG. 17 is a flowchart illustrating a shading correction process of the single-eye stereoscopic imaging device 3.

FIG. 19 is a flowchart illustrating a shading correction process of the single-eye stereoscopic imaging device 4.

FIG. 20 is a block diagram illustrating an SD correction unit of a single-eye stereoscopic imaging device 5.

FIG. 21 is a flowchart illustrating a shading correction process of the single-eye stereoscopic imaging device 5.

FIG. 22 is a block diagram illustrating an SD correction unit of a single-eye stereoscopic imaging device 6.

FIGS. 31A to 31C are diagrams illustrating the unique shading characteristics of the single-eye stereoscopic imaging device.

DESCRIPTION OF THE PREFERRED EMBODIMENTS

Hereinafter, single-eye stereoscopic imaging devices according to embodiments of the present invention will be described with reference to the accompanying drawings.

First Embodiment

[Overall Structure of Imaging Device]

Figure 1:
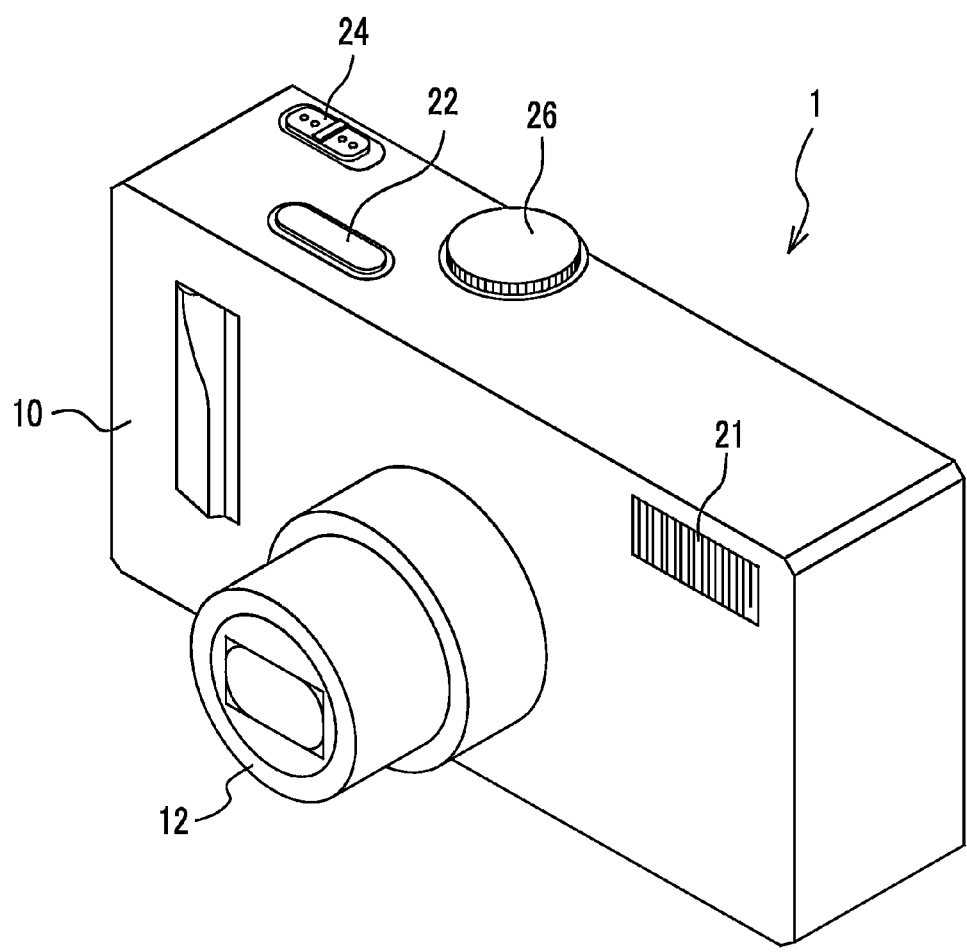
FIG. 1 is a front perspective view illustrating a single-eye stereoscopic imaging device 1 according to a first embodiment of the present invention.
Figure 2:
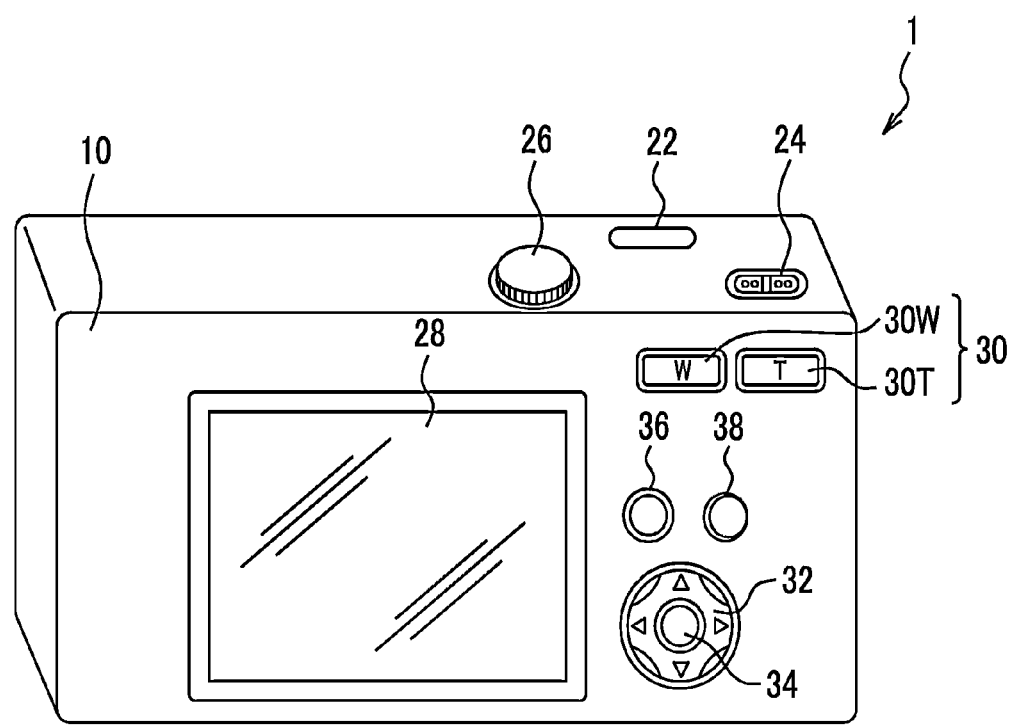
FIG. 2 is a rear view illustrating the single-eye stereoscopic imaging device 1.

FIG. 1 is a perspective view illustrating an example of a single-eye stereoscopic imaging device 1, which is an imaging device according to a first embodiment of the present invention. FIG. 2 is a rear view illustrating an example of the single-eye stereoscopic imaging device 1. The single-eye stereoscopic imaging device 1 is a digital camera that receives light which has passed through a lens using an imaging element, converts the light into a digital signal, and records the digital signal on a recording medium.

A camera body 10 of the single-eye stereoscopic imaging device 1 has a horizontally-long square box shape. For example, a lens unit 12 and a flash lamp 21 are provided on the front surface of the camera body 10, as shown in FIG. 1. For example, a shutter button 22, a power/mode switch 24, and a mode dial 26 are provided on the upper surface of the camera body 10. As shown in FIG. 2, for example, a liquid crystal monitor 28, a zoom button 30, an arrow button 32, a MENU/OK button 34, a reproduction button 36, and a BACK button 38 are provided on the rear surface of the camera body 10.

A tripod screw hole is provided in the lower surface (not shown) of the camera body 10 and a battery insertion portion and a memory card slot are also provided in the lower surface through an openable cover. A battery and a memory card are inserted into the battery insertion portion and the memory card slot.

The lens unit 12 includes a retractable zoom lens and protrudes from the camera body 10 when the mode of the camera is set to the imaging mode by the power/mode switch 24. Since the zoom mechanism or the retraction mechanism of the lens unit 12 have been known in the related art, the description of the detailed structure thereof will be omitted.

The flash lamp 21 emits flash light to a main object.

The shutter button 22 is a so-called two-stage stroke switch which is pressed "halfway" or "fully". When the single-eye stereoscopic imaging device 1 operates is in the imaging mode, the shutter button 22 is pressed "halfway" to perform an AE/AF operation and is "fully" pressed to perform an imaging operation. When the single-eye stereoscopic imaging device 1 operates is in the projection mode, the shutter button 22 is "fully" pressed to perform projection.

The power/mode switch 24 functions as a power switch which turns on or off the single-eye stereoscopic imaging device 1 and a mode switch which sets the mode of the single-eye stereoscopic imaging device 1 and can slide among an "OFF position", a "reproduction position", and an "imaging position". In the single-eye stereoscopic imaging device 1, the power/mode switch 24 slides to the "reproduction position" or the "imaging position" to turn on power. The power/mode switch 24 slides to the "OFF position" to turn off power. The power/mode switch 24 slides to the "reproduction position" to set the "reproduction mode". The power/mode switch 24 slides to the "imaging position" to set the "imaging mode".

The mode dial 26 functions as an imaging mode setting unit which sets the imaging mode of the single-eye stereoscopic imaging device 1 and the imaging mode of the single-eye stereoscopic imaging device 1 is set to various modes according to the set position of the mode dial. Examples of the imaging mode include a "planar image capture mode" which captures a planar image, a "stereoscopic image capture mode" which captures a stereoscopic image (3D image), a "moving image capture mode" which captures a moving image, and a "stereoscopic panorama image capture mode" which captures a stereoscopic panorama image.

The liquid crystal monitor 28 is a stereoscopic display unit which displays an image for the left eye and an image for the right eye as a stereoscopic image with predetermined directivity using a parallax barrier. When the stereoscopic image is input to the liquid crystal monitor 28, the parallax barrier with a pattern in which light transmitting portions and light shielding portions are alternately arranged at predetermined pitches is generated on a parallax barrier display layer of the liquid crystal monitor 28 and strip-shaped image fragments indicating the left and right images are arranged and displayed on an image display surface below the parallax barrier display layer. When a planar image is displayed or the liquid crystal monitor 28 is used as a user interface display panel, no image is displayed on the parallax barrier display layer and one image is displayed on the image display surface below the parallax barrier display layer. The liquid crystal monitor 28 is not limited to the above, but any display unit may be used as long as it can display a stereoscopically-viewed image to be recognized as a stereoscopic image. For example, the following display units may be used: a display unit using a lenticular lens; and a display unit using dedicated glasses, such as polarized glasses or liquid crystal shutter glasses, such that the user can separately view the image for the left eye and the image for the right eye. In addition, for example, an organic EL display may be used instead of the liquid crystal monitor.

The zoom button 30 functions as zoom instruction means for instructing zooming includes a zoom tele button 30T which instructs zooming to the telephoto side and a zoom wide button 30W which instructs zooming to the wide-angle side. In the imaging mode, in the single-eye stereoscopic imaging device 1, the zoom tele button 30T and the zoom wide button 30W are operated to change the focal length of the lens unit 12. In addition, in the reproduction mode, the zoom tele button 30T and the zoom wide button 30W are operated to enlarge and reduce the image which is being reproduced.

The arrow button 32 is an operation unit which inputs instructions in four directions, that is, the up, down, left, and right directions and functions as a button for selecting an item from a menu screen or instructs the selection of various kinds of set items from each menu (cursor moving means). The left/right key functions as a frame advance (forward advance/backward advance) button in the reproduction mode.

The MENU/OK button 34 is an operation key which functions as menu button for instructing the display of a menu on the screen of the liquid crystal monitor 28 and an OK button for deciding and executing selected content.

The reproduction button 36 is used to switch the operation mode to the reproduction mode which displays still images or moving images of the captured and recorded stereoscopic images (3D images) or planar images (2D images) on the liquid crystal monitor 28.

The BACK button 38 functions as a button which instructs the cancellation of an input operation or the return of the input operation to the previous operation state.

[Example of Structure of Imaging Optical System and Imaging Element]

The lens unit 12 mainly includes an imaging lens 14, an aperture 16, and a solid-state imaging element (hereinafter, referred to as a "phase difference CCD") 17 which is a phase difference image sensor.

The imaging lens 14 is an imaging optical system having a plurality of lenses including a focus lens and a zoom lens. The aperture 16 includes, for example, five aperture blades and is controlled in five stages at an interval of 1 AV in an aperture value (F number) range of F2.8 to F11. In the imaging mode, image light indicating an object is formed on a light receiving surface of the phase difference CCD 17 through the imaging lens 14 and the aperture 16.

Figure 3A:
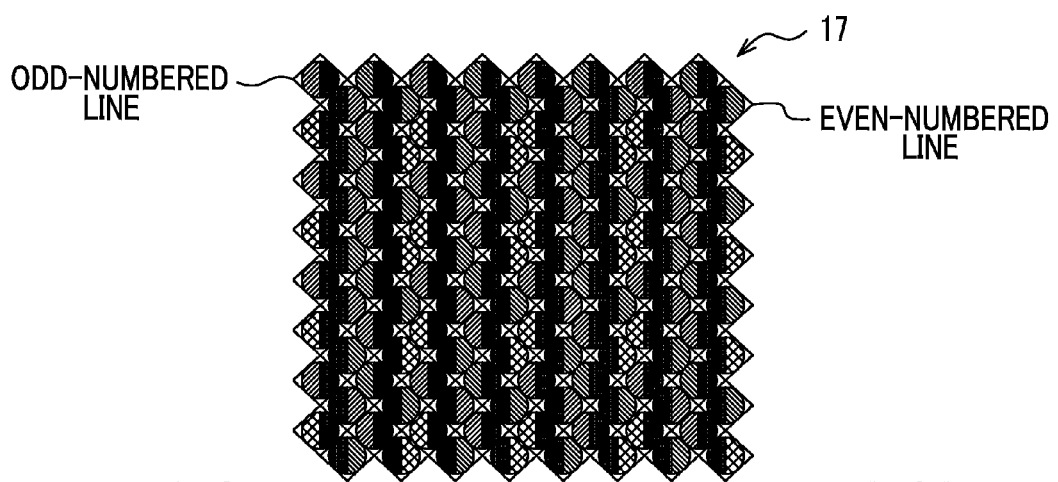
FIGS. 3A to 3C are diagrams illustrating an example of the structure of a phase difference CCD of the single-eye stereoscopic imaging device 1.
Figure 3B:
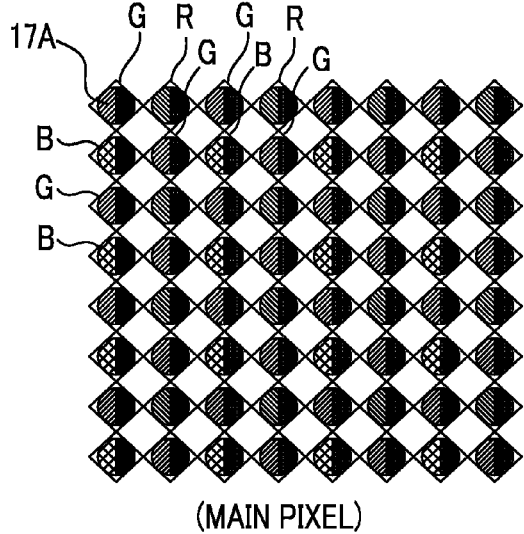
Figure 3C:
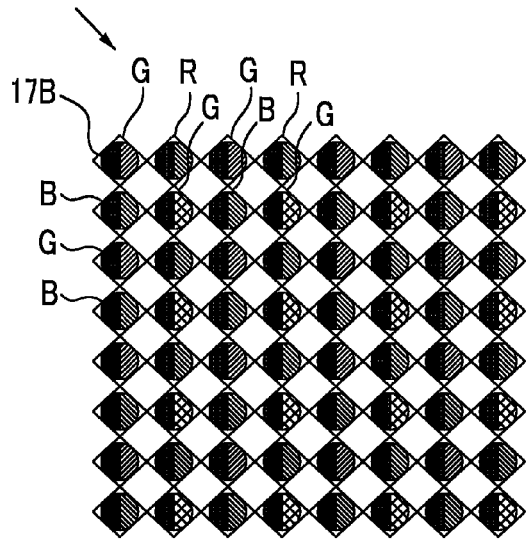

FIGS. 3A to 3C are diagrams illustrating an example of the structure of the phase difference CCD 17.

The phase difference CCD 17 includes odd-numbered lines of pixels (referred to as main pixels or A-plane pixels) and even-numbered lines of pixels (referred to as sub-pixels or B-plane pixels) which are arranged in a matrix. Image signals corresponding to two planes which are photoelectrically converted by the main pixels and the sub-pixels can be independently read.

As shown in FIGS. 3A to 3C, in the odd-numbered lines (1, 3, 5, . . . ) of the phase difference CCD 17, among the pixels including R (red), G (green), and B (blue) color filters, lines of G, R, G, R, . . . pixels and lines of B, G, B, G, . . . pixels are alternately provided. In the even-numbered lines (2, 4, 6, . . . ) of pixels, similarly to the odd-numbered lines, lines of G, R, G, R, . . . pixels and lines of B, G, B, G, . . . pixels are alternately provided. For the even-numbered lines of pixels, the pixels are shifted by a half pitch in the line direction.

Figure 4:
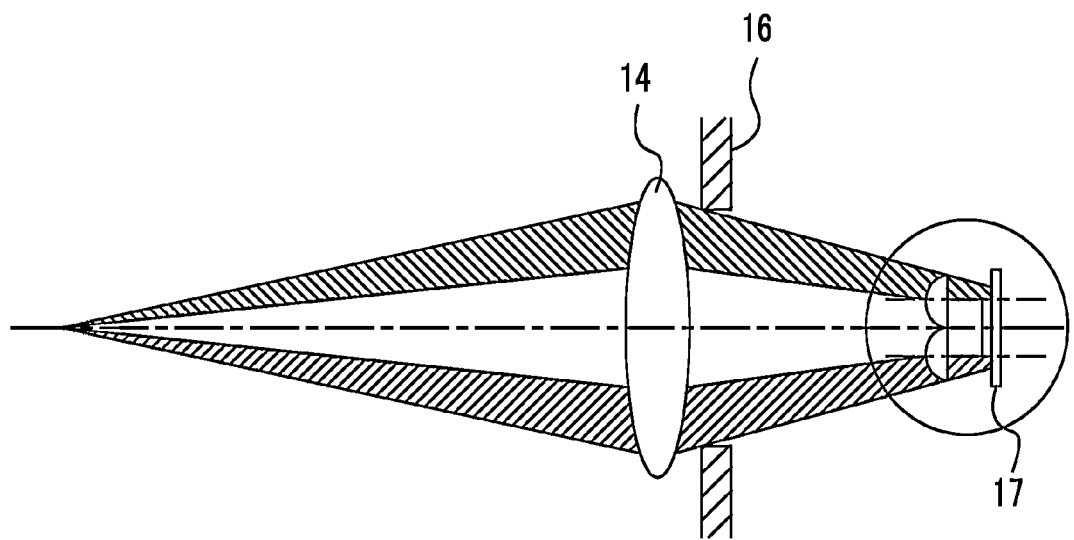
FIG. 4 is a diagram illustrating an imaging lens, an aperture, and one main and one sub-pixel of the phase difference CCD.
Figure 5A:
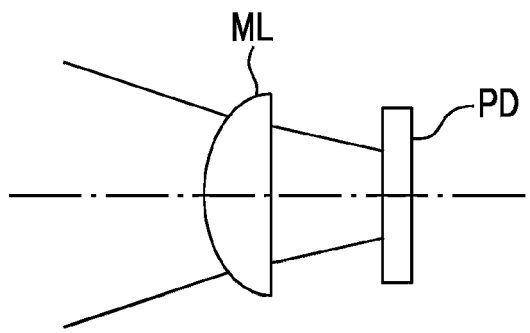
FIGS. 5A and 5B are partially enlarged views of FIG. 4.
Figure 5B:
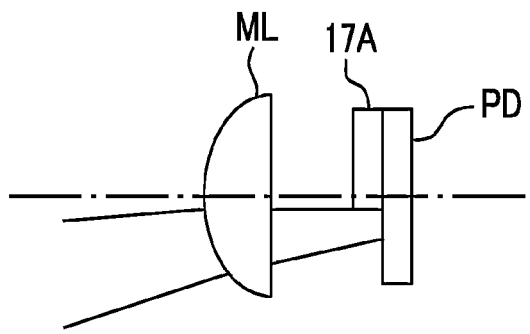
Figure 5C:
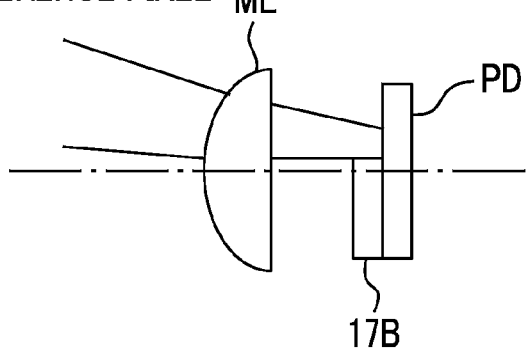

FIG. 4 is a diagram illustrating the imaging lens 14, and one main and one sub-pixel of the phase difference CCD 17. FIGS. 5A to 5C are enlarged views illustrating a main portion of FIG. 4.

A light shielding member 17A is provided on the front surface side of the main pixel of the phase difference CCD 17 (on the side of the microlens ML) and a light shielding member 17B is provided on the front surface side of the sub-pixel. The light shielding members 17A and 17B function as pupil division members. As shown in FIG. 5A, a beam which has passed through the exit pupil is incident on the pixel (photodiode PD) of the general CCD through microlens ML without any limitations. As shown in FIG. 5B, the light shielding member 17A shields the right half of the light receiving surface of the main pixel (photodiode PD). Therefore, only beams on the left side of the optical axis among the beams which have passed through the exit pupil are incident on the main pixels. In addition, as shown in FIG. 5C, the light shielding member 17B shields the left half of the light receiving surface of the sub-pixel (photodiode PD). Therefore, only beams on the right side of the optical axis among the beams which have passed through the exit pupil are incident on the sub-pixels. As such, the light shielding members 17A and 17B, which are pupil division unit, laterally divide the beams which have passed through the exit pupil.

Next, a method will be described in which only beams on the left side of the optical axis among the beams which have passed through the exit pupil are incident on the main pixels of the phase difference CCD 17 and only beams on the right side of the optical axis among the beams which have passed through the exit pupil are incident on the sub-pixels, thereby capturing a stereoscopic image using the phase difference CCD 17.

FIGS. 6A to 6C are diagrams illustrating the separated state of an image formed on the imaging element when the focus lens is a front focus state, a best focus state, and a rear focus state. However, in FIGS. 6A to 6C, the aperture 16 is not shown in order to compare the difference in separation due to focus.

As shown in FIG. 6B, the best focus images among the pupil-divided images are formed (superimposed) at the same position on the imaging element at the same position on the imaging element. However, as shown in FIGS. 6A and 6C, the front focus image and the rear focus images are formed (separated) at different positions on the imaging element.

Therefore, when the object image which is pupil-divided in the lateral direction is acquired by the phase difference CCD 17, it is possible to acquire an image for the left eye and an image for the right eye (stereoscopic image) with parallax which varies depending on the focal position. That is, parallax at the focal position is 0 and the position of a 3D reproduced image (the position of a virtual image) is aligned with the display surface. As the focal position shifts to the rear side, the position where parallax is 0 shifts to the rear side and the object on the display surface seems to protrude from the display surface. On the contrary, as the focal position shifts to the front side, the position where parallax is 0 shifts to the front side, and the object on the display surface seems to be recessed from the display surface.

The phase difference CCD 17 having the above-mentioned structure is configured such that regions (the right half and the left half) in which beams are limited by the light shielding members 17A and 17B are different in the main pixel and the sub-pixel. However, the present invention is not limited. The light shielding members 17A and 17B may not be provided, the microlens ML and the photodiode PD may be relatively shifted in the lateral direction, and the beams which are incident on the photodiode PD may be limited by the shift direction. In addition, one microlens may be provided for two pixels (the main pixel and the sub-pixel) to limit beams incident on each pixel.

[Internal Structure of Imaging Device]

Figure 7:
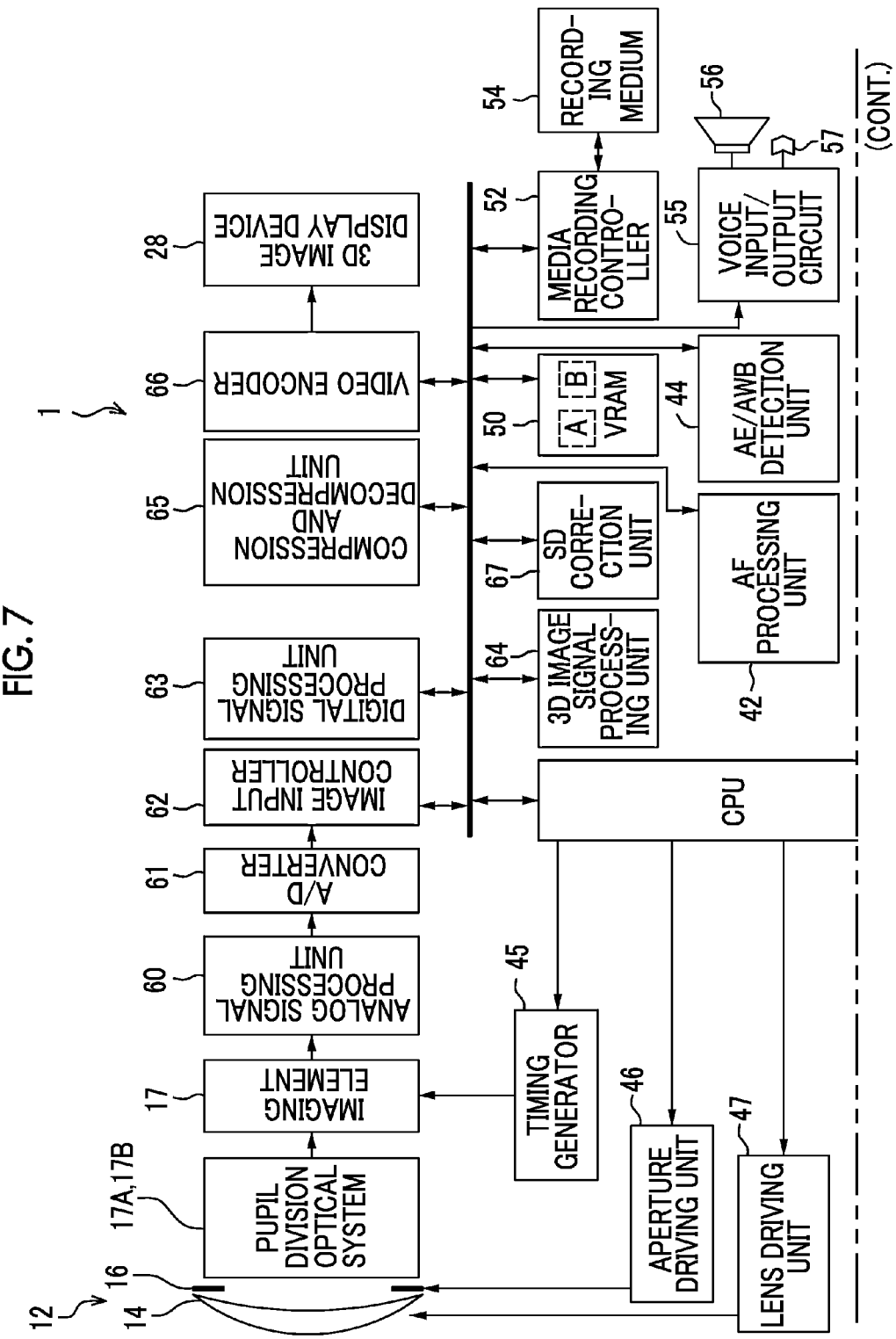
FIG. 7 is a block diagram illustrating the internal structure of the single-eye stereoscopic imaging device 1.

FIG. 7 is a block diagram illustrating the single-eye stereoscopic imaging device 1 according to the first embodiment of the present invention. The single-eye stereoscopic imaging device 1 records a captured image on a recording medium 54 and the overall operation of the single-eye stereoscopic imaging device 1 is controlled by a central processing unit (CPU) 40.

The single-eye stereoscopic imaging device 1 is provided with an operation unit 48 including the shutter button, the mode dial, the reproduction button, the MENU/OK key, the arrow key, and the BACK key. Signals are input from the operation unit 48 to the CPU 40 and the CPU 40 controls each circuit of the single-eye stereoscopic imaging device 1 on the basis of the input signals to perform, for example, lens driving control, aperture driving control, imaging operation control, image processing control, image data recording/reproduction control, and display control of the liquid crystal monitor 28 for stereoscopic display.

When the single-eye stereoscopic imaging device 1 is turned on by the power/mode switch 24, power is supplied from a power supply unit 58 to each block and the driving of the single-eye stereoscopic imaging device 1 starts.

A beam which has passed through, for example, the imaging lens 14 and the aperture 16 is focused on the phase difference CCD 17 and signal charge is stored in the phase difference CCD 17. The signal charge stored in the phase difference CCD 17 is read as a voltage signal corresponding to the signal charge on the basis of a read signal from the timing generator 45. The voltage signal read from the phase difference CCD 17 is transmitted to an analog signal processing unit 60.

The analog signal processing unit 60 performs a correlated double sampling process (a process which calculates the difference between a pixel signal component level and a feed-through component level included in an output signal from each pixel of the imaging element to obtain accurate pixel data, in order to reduce noise (in particular, thermal noise) included in the output signal from the imaging element) on the voltage signal output from the phase difference CCD 17. Then, R, G, and B signals of each pixel are sampled and held, the sampled and held signals are amplified, and the amplified signals are transmitted to an A/D converter 61. The A/D converter 61 converts the R, G, and B signals which are sequentially input into digital R, G, and B signals and outputs the digital R, G, and B signals to an image input controller 62.

A digital signal processing unit 63 performs predetermined signal processing, such as an offset process, a gain control process including white balance correction and sensitivity correction, a gamma correction process, and a YC process, for the digital image signals which are input through the image input controller 62. Main image data which is read from the main pixels in the odd-numbered lines of the phase difference CCD 17 is processed as image data for the left eye and sub-image data which is read from the sub-pixels in the even-numbered lines is processed as image data for the right eye.

The image data for the left eye and the image data for the right eye (3D image data) processed by the digital signal processing unit 63 are input to a VRAM 50. The VRAM 50 includes regions A and B on which 3D image data indicating a 3D image corresponding to one frame is recorded. In the VRAM 50, the 3D image data indicating the 3D image corresponding to one frame is alternately rewritten to the region A and the region B. The written 3D image data is read from the region other than the region to which the 3D image data is rewritten, of the regions A and B of the VRAM 50.

The 3D image data read from the VRAM 50 is processed into strip-shaped image fragments by a 3D image signal processing unit 64 and the image fragments are encoded by a video encoder 66 and then output to the liquid crystal monitor 28 for stereoscopic display which is provided on the rear surface of the camera. In this way, a 3D object image is continuously displayed on the display screen of the liquid crystal monitor 28.

When the shutter button 22 of the operation unit 48 is pressed in the first stage (halfway), the CPU 40 starts an AF operation and an AE operation, directs the lens driving unit 47 to move the focus lens in the optical axis direction such that the focus lens is at the focal position.

The AF processing unit 42 performs a contrast AF process or a phase difference AF process. When the contrast AF process is performed, the AF processing unit 42 extracts a high-frequency component of image data in a predetermined focus region of at least one of the image data for the left eye and the image data for the right eye and integrates the high-frequency component to calculate an AF evaluation value indicating a focus state. The AF processing unit 42 controls the focus lens in the imaging lens 14 such that the AF evaluation value is the maximum, thereby performing AF control. When the phase difference AF process is performed, the AF processing unit 42 detects the phase difference between the image data items corresponding to the main pixel and the sub-pixel in a predetermined focus region of the image data for the left eye and the image data for the right eye and calculates the amount of defocus on the basis of information indicating the phase difference. The AF processing unit 42 controls the focus lens in the imaging lens 14 such that the amount of defocus is zero, thereby performing AF control.

The CPU 40 directs the lens driving unit 47 to move the zoom lens forward and backward in the optical axis direction, thereby changing the focal length, if necessary.

When the shutter button 22 is pressed halfway, the image data output from the A/D converter 61 is input to an AE/AWB detecting unit 44.

The AE/AWB detecting unit 44 integrates G signals for the entire screen or integrates the G signals with different weights in a central portion and a peripheral portion of the screen, and outputs the integrated value to the CPU 40. The CPU 40 calculates the brightness (photography exposure value (Ev)) of the object from the integrated value input from the AE/AWB detection unit 44, determines the aperture value of the aperture 16 and the electronic shutter (shutter speed) of the phase difference CCD 17 on the basis of the photography Ev according to a predetermined program diagram, controls the aperture 16 through the aperture driving unit 46 on the basis of the determined aperture value, and controls the charge storage time of the phase difference CCD 17 through a timing generator 45 on the basis of the determined shutter speed.

When the AE operation and the AF operation ends and the shutter button 22 is pressed in the second stage (fully), image data corresponding to two images, that is, the image (main image) for the left eye and the image (sub-image) for the right eye corresponding to the main pixel and the sub-pixel which are output from the A/D converter 61 in response to the pressure is input from the image input controller 62 to the VRAM 50 and is temporarily stored therein.

The digital signal processing unit 63 appropriately reads the image data corresponding to two images which is temporarily stored in the VRAM 50 and performs predetermined signal processing including a process (YC process) of generating brightness data and color difference data of the image data. The image data (YC data) subjected to the YC process is stored in the VRAM 50 again. Then, the YC data corresponding to two images is output to a compression and decompression unit 65 and the compression and decompression unit 65 performs a predetermined compression process, such as JPEG (joint photographic experts group) compression, for the YC data and the compressed YC data is stored in the VRAM 50 again.

A multi-picture file (MP file: a file in which a plurality of images are connected) is generated from the YC data (compressed data) corresponding to two images which is stored in the VRAM 50 by the 3D image signal processing unit 64. The MP file is read by a media controller 52 and is recorded on the recording medium 54.

The AF operation is performed when the image data for the right eye and the image data for the left eye are continuously captured, as well as when the shutter button 22 is pressed in the first stage (halfway). Examples of the continuous capture of the image data for the right eye and the image data for the left eye include a case in which a live view image (through image) is captured and a case in which a moving image is captured. In this case, the AF processing unit 42 performs a continuous AF operation which constantly calculates an AF evaluation value in a repeated manner to continuously control the position of the focus lens while the image data for the right eye and the image data for the left eye are continuously captured. In this case, the parallax between the image for the right eye and the image for the left eye which are continuously displayed on the display screen of the liquid crystal monitor 28 is changed depending on the movement of the position of the focus lens.

However, in this embodiment, a shading (SD) correction unit 67 is provided as shading correction unit for performing shading correction for the signals which are output from the main pixel and the sub-pixel when the shutter button 22 is fully pressed.

The SD correction unit 67 performs two kinds of shading correction, that is, normal shading correction and shading correction unique to the single-eye stereoscopic imaging device 1.

Figure 9:
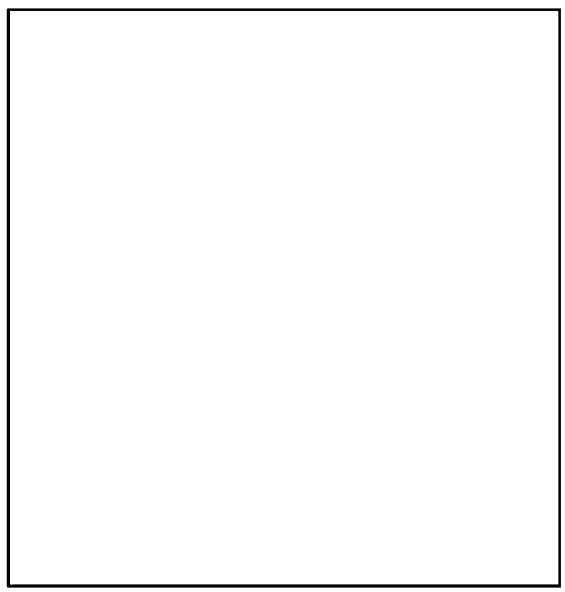
FIG. 9 is a diagram illustrating an example of a two-dimensional correction table used for normal shading correction.

A two-dimensional shading (SD) correction unit 67B (first shading correction unit) corrects, for example, shading caused by an imaging optical system in which the amount of light is different at the center and the end of the imaging lens and shading caused by a variation in the pixels of the phase difference CCD 17. That is, the two-dimensional shading (SD) correction unit 67B performs normal shading correction and stores one two-dimensional correction table (see FIG. 9) in which correction values are two-dimensionally arranged in the lateral and longitudinal directions. In the two-dimensional correction table, for example, a gain which is calculated on the basis of an inverted curve of a shading curve in which a large amount of light is received in a central portion and a small amount of light is received in a peripheral portion (that is, the gain increases from the center to the outside), that is, a correction value is two-dimensionally arranged. The two-dimensional SD correction unit 67B performs shading correction for the entire phase difference CCD 17 using the two-dimensional correction table. Since the process of the two-dimensional SD correction unit 67B has been known, the description thereof will not be repeated.

Figure 8:
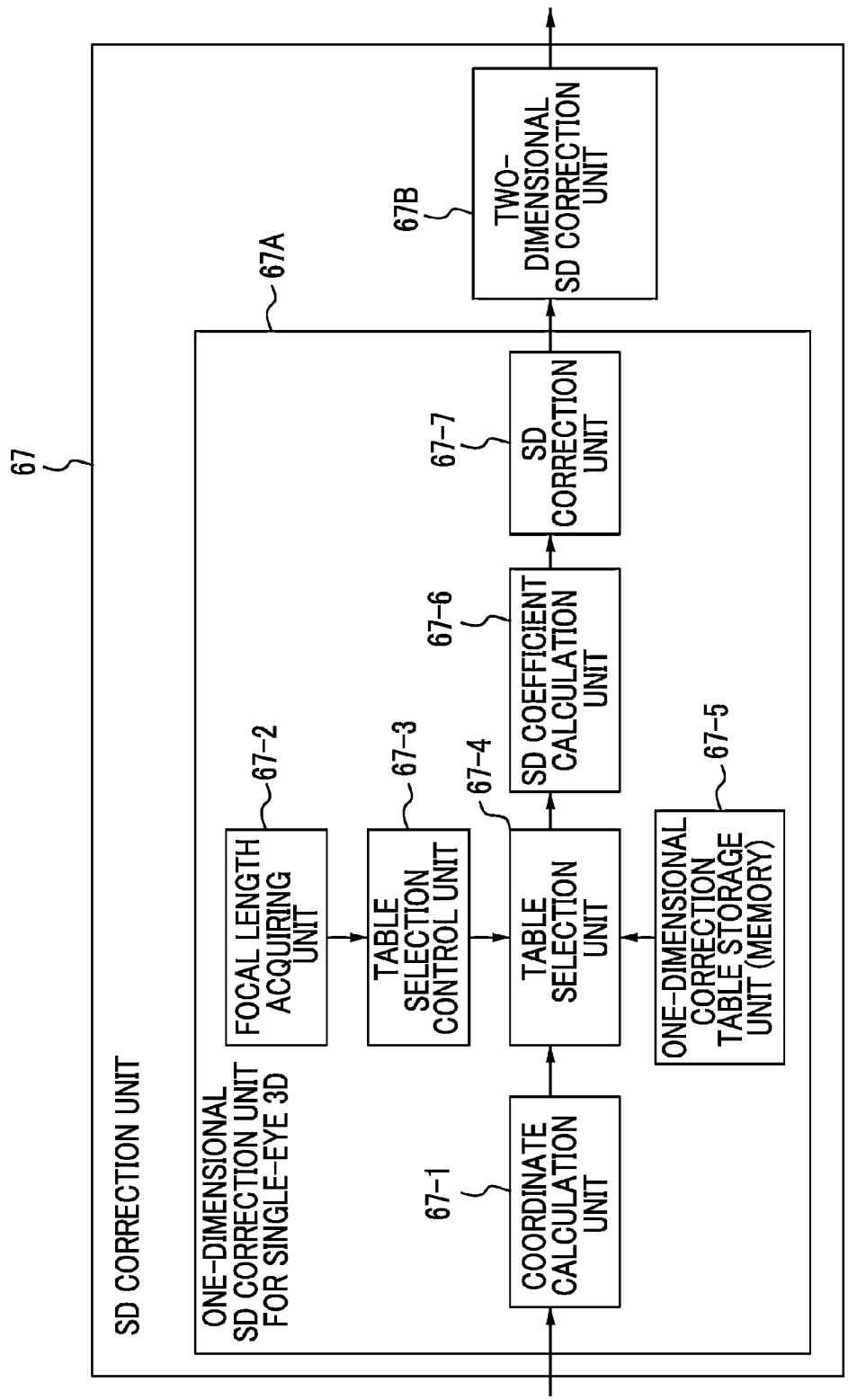
FIG. 8 is a block diagram illustrating an SD correction unit of the single-eye stereoscopic imaging device 1.

A one-dimensional shading (SD) correction unit 67A (second shading correction unit) corrects shading characteristics which are reversed in the main pixel and the sub-pixel due to the pupil division direction (in this embodiment, the lateral direction) and mainly includes a coordinate calculation unit 67-1, a focal length acquiring unit 67-2 (focal length acquiring unit), a table selection control unit 67-3, a table selection unit 67-4, a one-dimensional correction table storage unit 67-5, a shading (SD) coefficient calculation unit 67-6, and a shading (SD) correction unit 67-7, as shown in FIG. 8.

Figure 10:
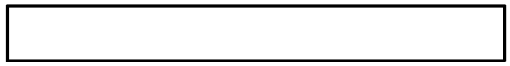
FIG. 10 is a diagram illustrating an example of a one-dimensional correction table used for shading correction unique to the single-eye stereoscopic imaging device 1.

The one-dimensional correction table storage unit 67-5 stores a one-dimensional correction table for the main pixel and a one-dimensional correction table for the sub-pixel. The single-eye stereoscopic imaging device 1 can perform correction using only the one-dimensional correction table (see FIG. 10) since shading unique to the single-eye stereoscopic imaging device occurs in the lateral direction according to the shape or position of the microlens ML.

In addition, the one-dimensional correction table storage unit 67-5 stores a plurality of one-dimensional correction tables for the main pixel and a plurality of one-dimensional correction tables for the sub-pixel according to the focal length. In the single-eye stereoscopic imaging device 1, when the focal length is changed, a shading shape in the lateral direction is changed greatly since beams are incident on each photodiode of the phase difference CCD 17 at different incident angles. Therefore, it is possible to respond to shading characteristics which vary depending on the focal length by selecting an appropriate correction table from the one-dimensional correction tables which are stored in the one-dimensional correction table storage unit 67-5 according to the focal length.

The focal length acquiring unit 67-2 calculates the focal length from the position of the zoom lens and the table selection control unit 67-3 instructs the table selection unit 67-4 to select a one-dimensional correction table corresponding to the focal length from the one-dimensional correction tables which are stored in the one-dimensional correction table storage unit 67-5. The table selection unit 67-4 acquires an appropriate one-dimensional correction table from the one-dimensional correction table storage unit 67-5 in response to the instruction from the table selection control unit 67-3.

The coordinate calculation unit 67-1 selects an arbitrary pixel from the main pixels or the sub-pixels and outputs information about the pixel to the table selection unit 67-4. The table selection unit 67-4 reads a correction value at the position corresponding to the position of the pixel selected by the coordinate calculation unit 67-1 from the selected one-dimensional correction table corresponding to the focal length. All of the correction values stored in the one-dimensional correction table storage unit 67-5 are not the correction value corresponding to the position of the pixel, but the one-dimensional correction table storage unit 67-5 discretely has the correction values. Therefore, in this embodiment, the table selection unit 67-4 reads two correction values.

The SD coefficient calculation unit 67-6 performs, for example, linear interpolation for the correction value acquired by the table selection unit 67-4 to calculate a shading correction coefficient of the arbitrary pixel selected by the coordinate calculation unit 67-1.

The SD correction unit 67-7 multiplies the value of the arbitrary pixel selected by the coordinate calculation unit 67-1 by the shading correction coefficient calculated by the SD coefficient calculation unit 67-6, thereby performing shading correction.

The single-eye stereoscopic imaging device 1 can acquire a two-dimensional image as well as a stereoscopic image. In addition, the single-eye stereoscopic imaging device 1 can record or reproduce a voice, as well as a moving image and still image. A microphone 57 input a spoken voice, a speaker 56 outputs a received voice, and a voice input/output circuit 55 encodes the voice input from the microphone and decodes the received voice.

[Description of Operation of Imaging Device]

Next, the operation of the single-eye stereoscopic imaging device 1 will be described. This imaging process is controlled by the CPU 40. A program which causes the CPU 40 to perform the imaging process is stored in a program storage unit of the CPU 40.

When imaging starts, the CPU 40 drives the imaging lens 14 and the aperture 16 to initial positions. Object light which has passed through the imaging lens 14 is formed on the light receiving surface of the phase difference CCD 17 through the aperture 16. The signal charge which is stored in the main pixels and the sub-pixels of the phase difference CCD 17 by the timing generator 45 is sequentially read as a voltage signal (image signal) corresponding to the signal charge at a predetermined frame rate and are then sequentially input to the digital signal processing unit 63 through the analog signal processing unit 60, the A/D converter 61, and the image input controller 62. Therefore, image data for the left eye and image data for the right eye are sequentially generated. The generated image data for the left eye and image data for the right eye are sequentially input to the VRAM 50.

The CPU 40 changes the aperture value (F number) of the aperture 16 through the aperture driving unit 46 on the basis of the image data for the left eye and the image data for the right eye. In addition, the CPU 40 performs zooming through the lens driving unit 47 in response to the input from the operation unit 48.

The photographer views the image (through image) which is displayed on the liquid crystal monitor 28 in real time to check the angle of view.

When the shutter button is pressed halfway, a signal S1ON is input to the CPU 40 and the CPU 40 performs the AE/AF operation through the AF processing unit 42 and the AE/AWB detecting unit 44. In a process of capturing a stereoscopic image, the AF processing unit 42 performs an AF operation using a phase difference AF process.

When the shutter button is fully pressed, a signal S2ON is input to the CPU 40 and the CPU 40 starts an imaging process and a recording process. That is, the phase difference CCD 17 is exposed at the shutter speed and the aperture value which are determined on the basis of the photometry result.

FIG. 11 is a flowchart illustrating the flow of a process of performing shading correction for the image data corresponding to two images which has been output from the main pixels and the sub-pixels of the phase difference CCD 17 and then processed by the analog signal processing unit 60. The following process is mainly controlled by the CPU 40.

First, the CPU 40 determines whether the image captured by the single-eye stereoscopic imaging device 1 is a stereoscopic image, that is, whether image data corresponding to two images is acquired from the main pixels and the sub-pixels of the phase difference CCD 17 (Step S10). When the stereoscopic image is not obtained (for example, one two-dimensional image is obtained by the addition of the main pixels and the sub-pixels) (NO in Step S10), the one-dimensional SD correction unit 67A does not perform shading correction, but the two-dimensional SD correction unit 67B performs normal shading correction using the two-dimensional correction table, in order to cancel density unevenness (shading) between the screen of the main pixels and the screen of the sub-pixels due to pupil division (Step S16).

When image data corresponding to two images is acquired from the main pixels and the sub-pixels of the phase difference CCD 17 (YES in Step S10), the focal length acquiring unit 67-2 acquires the focal length (Step S11). The table selection control unit 67-3 instructs the table selection unit 67-4 to select a one-dimensional correction table corresponding to the focal length from the one-dimensional correction tables stored in the one-dimensional correction table storage unit 67-5, and the table selection unit 67-4 acquires an appropriate one-dimensional correction table from the one-dimensional correction table storage unit 67-5 in response to the instruction from the table selection control unit 67-3 (Steps S12, S13, S14, ...). For example, when the focal length is A, a one-dimensional SD correction table 1A (for the main pixel) and a one-dimensional SD correction table 2A (for the sub-pixel), which are one-dimensional correction tables in which the focal length is A, are acquired (Step S12). When the focal length is B, a one-dimensional SD correction table 1B (for the main pixel) and a one-dimensional SD correction table 2B (for the sub-pixel), which are one-dimensional correction tables in which the focal length is B, are acquired (Step S13). When the focal length is C, a one-dimensional SD correction table 1C (for the main pixel) and a one-dimensional SD correction table 2C (for the sub-pixel), which are one-dimensional correction tables in which the focal length is C, are acquired (Step S14). In this way, the one-dimensional correction tables used for the shading correction are acquired. The one-dimensional SD correction table 1A (for the main pixel) and the one-dimensional SD correction table 2A (for the sub-pixel) have correction values which are bilaterally symmetric. The one-dimensional SD correction table 1B (for the main pixel) and the one-dimensional SD correction table 2B (for the sub-pixel) have correction values which are bilaterally symmetric. The one-dimensional SD correction table 1C (for the main pixel) and the one-dimensional SD correction table 2C (for the sub-pixel) have correction values which are bilaterally symmetric.

The one-dimensional SD correction unit 67A performs shading correction using the acquired one-dimensional correction tables (Step S15). Hereinafter, Step S15 will be described in detail.

The coordinate calculation unit 67-1 selects an arbitrary pixel from the main pixels and outputs information about the selected pixel. When receiving the output information, the table selection unit 67-4 reads the correction value corresponding to the position of the pixel selected by the coordinate calculation unit 67-1 from the one-dimensional correction tables for the main pixel (the one-dimensional SD correction table 1A, the one-dimensional SD correction table 1B, and the one-dimensional SD correction table 1C) among the one-dimensional correction tables acquired in Steps S12 to S14 (Step S15-1). The SD coefficient calculation unit 67-6 performs, for example, linear interpolation on the correction value acquired by the table selection unit 67-4 to calculate a shading correction coefficient for the arbitrary pixel selected by the coordinate calculation unit 67-1 (Step S15-2). In addition, the coordinate calculation unit 67-1 includes unit for selecting a pixel at an arbitrary position of a predetermined column of a main pixel group as a first pixel and selecting a pixel at a position corresponding to the first pixel in a predetermined column of a sub-pixel group as a second pixel and unit for reading the correction value at a position corresponding to the position of the first pixel as a correction value for the first pixel from the one-dimensional correction table.

The SD correction unit 67-7 multiplies the value of the arbitrary pixel selected by the coordinate calculation unit 67-1 by the shading correction coefficient calculated by the SD coefficient calculation unit 67-6, thereby performing shading correction (Step S15-3). The one-dimensional SD correction unit 67A repeatedly performs the process from Step S15-1 to Step S15-3 on all of the main pixels.

When the shading correction is performed for all of the main pixels, the one-dimensional SD correction unit 67A performs the shading correction for the sub-pixels. That is, the coordinate calculation unit 67-1 selects an arbitrary pixel from the sub-pixels and outputs information about the selected pixel. When receiving the output information, the table selection unit 67-4 reads the correction value corresponding to the position of the pixel selected by the coordinate calculation unit 67-1 from the one-dimensional correction tables for the sub-pixel (the one-dimensional SD correction table 2A, the one-dimensional SD correction table 2B, and the one-dimensional SD correction table 2C) among the one-dimensional correction tables acquired in Steps S12 to S14 (Step S15-4). The SD coefficient calculation unit 67-6 performs, for example, linear interpolation on the correction value acquired by the table selection unit 67-4 to calculate a shading correction coefficient for the arbitrary pixel selected by the coordinate calculation unit 67-1 (Step S15-5).

The SD correction unit 67-7 multiplies the value of the arbitrary pixel selected by the coordinate calculation unit 67-1 by the shading correction coefficient calculated by the SD coefficient calculation unit 67-6, thereby performing shading correction (Step S15-6). The one-dimensional SD correction unit 67A repeatedly performs the process from Step S15-4 to Step S15-6 on all of the main pixels.

In this way, shading correction unique to the single-eye stereoscopic imaging device 1 (Step S15) ends. Then, the two-dimensional SD correction unit 67B performs normal shading correction for the data subjected to the shading correction (Step S15) using the two-dimensional correction table (Step S16).

In this way, the shading correction ends. The image data corresponding to two images which has subjected to the shading correction is input to the VRAM 50 through the A/D converter 61 and the image input controller 62, is converted into a brightness/color difference signal by the 3D image signal processing unit 64, and is then stored in the VRAM 50. The image data for the left eye stored in the VRAM 50 is transmitted to the compression and decompression unit 65, is compressed in a predetermined compression format (for example, a JPEG format), and is then stored in the VRAM 50.

The MP file is generated from the compressed data corresponding to two images which is stored in the VRAM 50. The MP file is recorded on the recording medium 54 through the media controller 52. In this way, a stereoscopic image is captured and recorded.

In this embodiment, an example in which the stereoscopic image is captured has been described. However, the single-eye stereoscopic imaging device 1 may capture both a planar image and a stereoscopic image. When a planar image is captured, imaging may be performed using only the main pixels of the phase difference CCD 17. Since the imaging process is the same as that for capturing the stereoscopic image, the description thereof will not be repeated.

The image which is recorded on the recording medium 54 in this way can be reproduced and displayed on the liquid crystal monitor 28 when the mode of the single-eye stereoscopic imaging device 1 is set to the reproduction mode by the reproduction button.

When the mode is set to the reproduction mode, the CPU 40 outputs a command to instruct the media controller 52 to read the image file which is finally recorded on the recording medium 54.

The compressed image data of the read image file is transmitted to the compression and decompression unit 65, is decompressed into a non-compressed brightness/color difference signal, and is then output to the liquid crystal monitor 28 through the video encoder 66.

The frame advance of the image is performed by an operation of pressing the left and right keys of the arrow key. When the right key of the arrow key is pressed, the next image file is read from the recording medium 54 and the read image file is reproduced and displayed on the liquid crystal monitor 28. When the left key of the arrow key is pressed, the previous image file is read from the recording medium 54 and the read image film is reproduced and displayed on the liquid crystal monitor 28.

According to this embodiment, it is possible to correct the unique shading characteristics of the single-eye stereoscopic imaging device in which shading characteristics vary depending on the pupil division direction (lateral direction), that is, the amount of light received at the right end is less than the amount of light received at the left end in the main pixel group (the first pixel group or the second pixel group) and the amount of light received at the left end is less than the amount of light received at the right end in the sub-pixel group (the first pixel group or the second pixel group) as well as the normal shading correction using a simple method.

In this embodiment, the two-dimensional SD correction unit 67B stores only one two-dimensional correction table.

That is, the two-dimensional SD correction unit 67B does not store a plurality of two-dimensional correction tables corresponding to the focal length. This is because a change in shading depending on the focal length in normal shading characteristics is less than a change in shading depending on the focal length in the unique shading characteristics of the single-eye imaging device. However, since the shading characteristics vary depending on the focal length, a plurality of two-dimensional correction tables corresponding to the focal length may be stored in the two-dimensional SD correction unit 67B and the two-dimensional correction table used may be changed depending on the focal length.

Second Embodiment

In the first embodiment of the present invention, the one-dimensional correction table for the main pixel and the one-dimensional correction table for the sub-pixel are stored. However, the one-dimensional correction table may be shared by the main pixel and the sub-pixel.

In a second embodiment of the present invention, the same one-dimensional correction table is used for the main pixel and the sub-pixel. Next, a single-eye stereoscopic imaging device 2 according to the second embodiment will be described. The imaging device has the same internal structure as the imaging device according to the first embodiment except for an SD correction unit. Therefore, the description of the same components is omitted and only the SD correction unit will be described. In addition, the operation of the imaging device is the same as that of the imaging device according to the first embodiment except for a shading correction method and only the shading correction method will be described.

[Internal Structure of Imaging Device]

Figure 12:
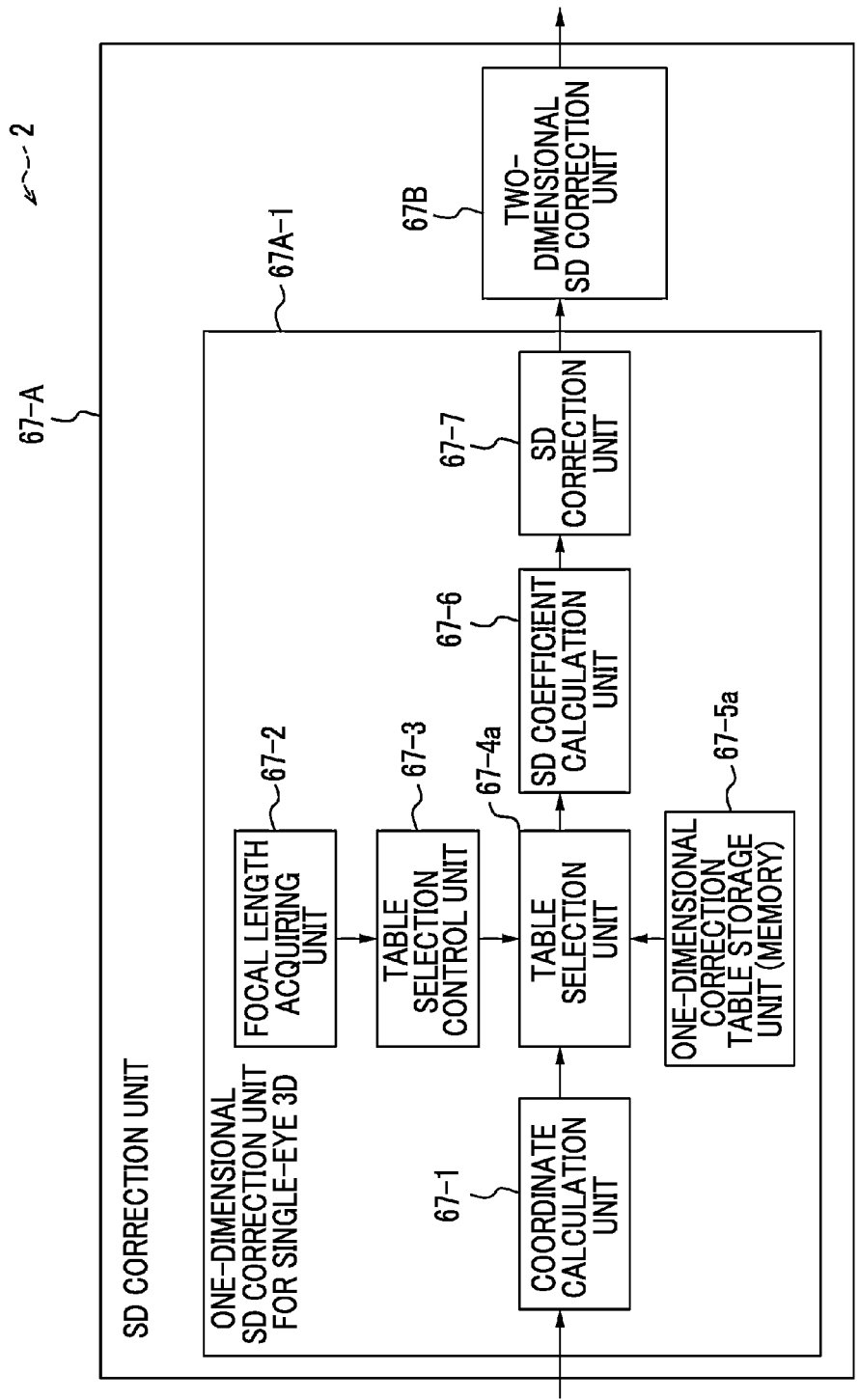
FIG. 12 is a block diagram illustrating an SD correction unit of a single-eye stereoscopic imaging device 2.

FIG. 12 is a diagram illustrating an SD correction unit 67-A according to the second embodiment. The SD correction unit 67-A mainly includes a two-dimensional SD correction unit 67B which performs normal shading correction and a one-dimensional SD correction unit 67A-1 that performs shading correction unique to the single-eye stereoscopic imaging device 2.

The one-dimensional SD correction unit 67A-1 corrects shading characteristics which are reversed in the main pixel and the sub-pixel and mainly includes a coordinate calculation unit 67-1, a focal length acquiring unit 67-2, a table selection control unit 67-3, a table selection unit 67-4a, a one-dimensional correction table storage unit 67-5a, a shading (SD) coefficient calculation unit 67-6, and a shading (SD) correction unit 67-7, as shown in FIG. 12.

The one-dimensional correction table storage unit 67-5a stores a plurality of one-dimensional correction tables corresponding to the focal length. In this embodiment, the same one-dimensional correction table is used for the main pixel and the sub-pixel.

The coordinate calculation unit 67-1 selects an arbitrary pixel from the main pixels and outputs information about the selected pixel to a table selection unit 67-4a. The table selection unit 67-4a reads a correction value at a position corresponding to the position of the pixel selected by the coordinate calculation unit 67-1 from the one-dimensional correction table which is selected according to the focal length.

The coordinate calculation unit 67-1 selects an arbitrary pixel from the sub-pixels and outputs information about the selected pixel to the table selection unit 67-4. The table selection unit 67-4a determines a position corresponding to the position of the pixel selected by the coordinate calculation unit 67-1 from the one-dimensional correction table which is selected according to the focal length, similarly to when the arbitrary pixel is selected from the main pixels, and reads a correction value at a position which is bilaterally symmetric to the determined position from the one-dimensional correction table.

[Description of Operation of Imaging Device]

FIG. 13 is a flowchart illustrating the flow of a process of performing shading correction for image data corresponding to two images which has been output from the main pixels and the sub-pixels of the phase difference CCD 17 and then processed by an analog signal processing unit 60. The following process is mainly controlled by a CPU 40.

First, the CPU 40 determines whether the image captured by the single-eye stereoscopic imaging device 2 is a stereoscopic image (Step S10). When the stereoscopic image is not obtained (NO in Step S10), the two-dimensional SD correction unit 67B performs normal shading correction using the two-dimensional correction table (Step S16).

When image data corresponding to two images is acquired from the main pixels and the sub-pixels of the phase difference CCD 17 (YES in Step S10), the focal length acquiring unit 67-2 acquires the focal length (Step S11). The table selection control unit 67-3 instructs the table selection unit 67-4a to select a one-dimensional correction table corresponding to the focal length from the one-dimensional correction tables stored in the one-dimensional correction table storage unit 67-5, and the table selection unit 67-4a acquires an appropriate one-dimensional correction table from the one-dimensional correction table storage unit 67-5a in response to the instruction from the table selection control unit 67-3 (Steps S21, S22, S23, . . . ). For example, when the focal length is A, a one-dimensional SD correction table 1A, which is a one-dimensional correction table in which the focal length is A, is acquired (Step S21). When the focal length is B, a one-dimensional SD correction table 1B, which is a one-dimensional correction table in which the focal length is B, is acquired (Step S22). When the focal length is C, a one-dimensional SD correction table 1C, which is a one-dimensional correction table in which the focal length is C, is acquired (Step S23). In this way, the one-dimensional correction tables used for the shading correction are acquired.

The one-dimensional SD correction unit 67A-1 performs shading correction using the acquired one-dimensional correction tables (Step S24). Hereinafter, Step S24 will be described in detail.

Figure 14A:
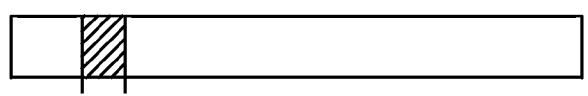
FIGS. 14A to 14C are diagrams illustrating shading correction by the single-eye stereoscopic imaging device 2.
Figure 14B:
Figure 14C:
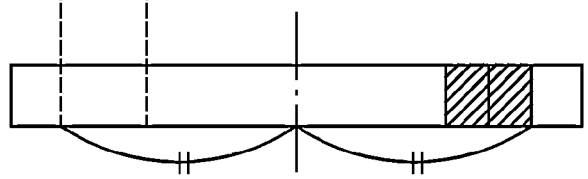

As shown in FIG. 14A, the coordinate calculation unit 67-1 selects arbitrary pixels at the same position from the main pixels (A-group pixel) and the sub-pixels (B-group pixel) (Step S24-1). Information about the arbitrary pixels is output to the table selection unit 67-4a. As shown in FIG. 14B, the table selection unit 67-4a reads a correction value corresponding to the position of the main pixel selected by the coordinate calculation unit 67-1 from the one-dimensional correction table acquired in Steps S21 to S23 (Step S24-2). In addition, as shown in FIG. 14C, the table selection unit 67-4a reads a correction value which is in the one-dimensional correction table acquired in Step S21 to S23 and is bilaterally symmetric to the correction value read in Step S24-2 (Step S24-3).

The SD coefficient calculation unit 67-6 performs, for example, linear interpolation on the correction values which are acquired by the table selection unit 67-4a in Step S24-2 and Step S24-3 to calculate a shading correction coefficient (Step S24-4).

The SD correction unit 67-7 multiplies the value of the arbitrary main pixel selected by the coordinate calculation unit 67-1 by the shading correction coefficient calculated by the SD coefficient calculation unit 67-6 on the basis of the correction value acquired by the table selection unit 67-4a in Step S24-2, thereby performing shading correction (Step S24-5). In addition, the SD correction unit 67-7 multiplies the value of the arbitrary sub-pixel selected by the coordinate calculation unit 67-1 by the shading correction coefficient calculated by the SD coefficient calculation unit 67-6 on the basis of the correction value acquired by the table selection unit 67-4a in Step S24-3, thereby performing shading correction (Step S24-5).

This process is performed for all of the main pixels and the sub-pixels and shading correction (Step S24) unique to the single-eye stereoscopic imaging device 2 ends. Then, the two-dimensional SD correction unit 67B performs normal shading correction for the data subjected to the shading correction (Step S24) using the two-dimensional correction table (Step S16).

According to this embodiment, it is possible to perform shading correction for each of the main pixels and the sub-pixels having bilaterally symmetric shading characteristics using one one-dimensional correction table. Therefore, it is possible to prevent an increase in memory capacity, the amount of calculation, or a circuit size and reduce a circuit size or the amount of memory used.

Third Embodiment

In a third embodiment of the present invention, similarly to the second embodiment, the same one-dimensional correction table is used for main pixels and the sub-pixels. Next, a single-eye stereoscopic imaging device 3 according to the third embodiment will be described. The imaging device has the same internal structure as the imaging device according to the first embodiment except for an SD correction unit. Therefore, the description of the same components is omitted and only the SD correction unit will be described. In addition, the operation of the imaging device is the same as that of the imaging device according to the first embodiment except for a shading correction method and only the shading correction method will be described. In the third embodiment, the same components as those in the first and second embodiments are denoted by the same reference numerals and the description thereof will not be repeated.

[Internal Structure of Imaging Device]

Figure 15:
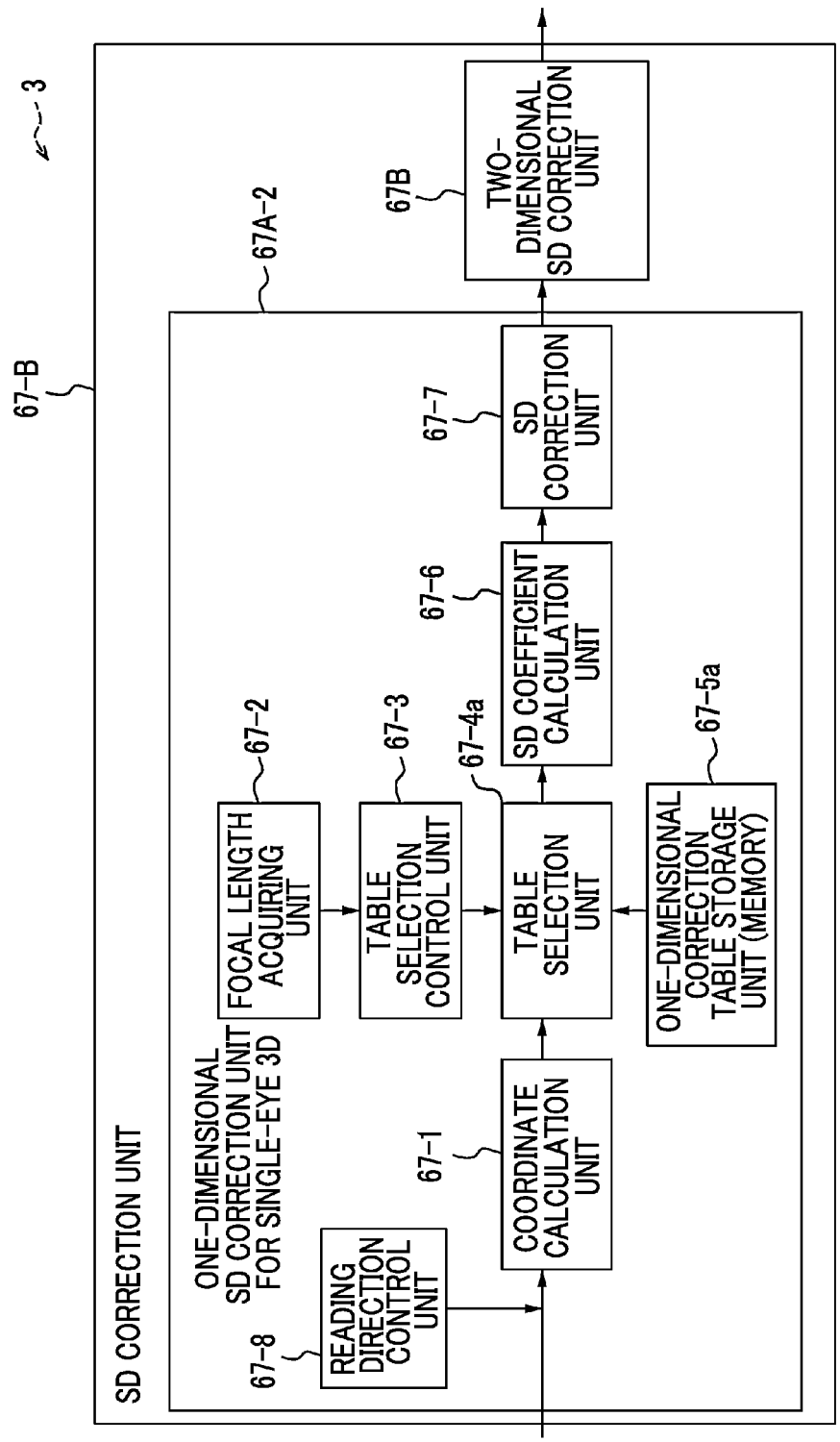
FIG. 15 is a block diagram illustrating an SD correction unit of a single-eye stereoscopic imaging device 3.

FIG. 15 is a diagram illustrating an SD correction unit 67-B according to the third embodiment. The SD correction unit 67-B mainly includes a two-dimensional SD correction unit 67B which performs normal shading correction and a one-dimensional SD correction unit 67A-2 which performs shading correction unique to the single-eye stereoscopic imaging device 3.

The one-dimensional SD correction unit 67A-2 corrects shading characteristics which are reversed in the main pixels and the sub-pixels and mainly includes a coordinate calculation unit 67-1, a focal length acquiring unit 67-2, a table selection control unit 67-3, a table selection unit 67-4a, a one-dimensional correction table storage unit 67-5a, a shading (SD) coefficient calculation unit 67-6, a shading (SD) correction unit 67-7, and a reading direction control unit 67-8, as shown in FIG. 15.

Figure 16A:
FIGS. 16A and 16B are diagrams illustrating the shading correction of the single-eye stereoscopic imaging device 3.
Figure 16B:

The reading direction control unit 67-8 controls a reading direction when the coordinate calculation unit 67-1 selects an arbitrary pixel. The reading direction control unit 67-8 performs control such that the coordinate calculation unit 67-1 reads the main pixels from the left direction and the coordinate calculation unit 67-1 reads the sub-pixels from the right direction. For example, when the coordinate calculation unit 67-1 selects a fifth pixel from the end as an arbitrary pixel, the reading direction control unit 67-8 performs control such that the coordinate calculation unit 67-1 reads the fifth main pixel from the left end as shown in FIG. 16A and the coordinate calculation unit 67-1 reads the fifth sub-pixel from the left end as shown in FIG. 16B.

The coordinate calculation unit 67-1 selects arbitrary pixels from the main pixels and the sub-pixels and outputs information about the selected pixels to a table selection unit 67-4a. The table selection unit 67-4a reads a correction value at a position corresponding to the position of the pixel selected by the coordinate calculation unit 67-1 from the one-dimensional correction table which is selected according to the focal length.

[Description of Operation of Imaging Device]

FIG. 17 is a flowchart illustrating the flow of a process of performing shading correction for image data corresponding to two images which has been output from the main pixels and the sub-pixels of the phase difference CCD 17 and then processed by an analog signal processing unit 60. The following process is mainly controlled by a CPU 40.

First, the CPU 40 determines whether the image captured by the single-eye stereoscopic imaging device 3 is a stereoscopic image (Step S10). When the stereoscopic image is not obtained (NO in Step S10), the two-dimensional SD correction unit 67B performs normal shading correction using the two-dimensional correction table (Step S16).

When image data corresponding to two images is acquired from the main pixels and the sub-pixels of the phase difference CCD 17 (YES in Step S10), the focal length acquiring unit 67-2 acquires the focal length (Step S11). The table selection control unit 67-3 instructs the table selection unit 67-4a to select a one-dimensional correction table corresponding to the focal length from the one-dimensional correction tables stored in the one-dimensional correction table storage unit 67-5a, and the table selection unit 67-4a acquires an appropriate one-dimensional correction table from the one-dimensional correction table storage unit 67-5a in response to the instruction from the table selection control unit 67-3 (Steps S21, S22, 23, . . . ).

The one-dimensional SD correction unit 67A-2 performs shading correction using the acquired one-dimensional correction tables (Step S31). Hereinafter, Step S31 will be described in detail.

The coordinate calculation unit 67-1 selects an arbitrary pixel from the main pixels (A-group pixel) and the table selection unit 67-4a reads a correction value corresponding to the position of the main pixel selected by the coordinate calculation unit 67-1 from the one-dimensional correction table acquired in Steps S21 to S23 (Step S31-1).

The SD coefficient calculation unit 67-6 performs, for example, linear interpolation on the correction value which is acquired by the table selection unit 67-4a in Step S31-1 to calculate a shading correction coefficient (Step S31-2). When the fifth pixel from the left end of the main pixels is selected as an arbitrary pixel in Step S31-1 as shown in FIG. 16A, a shading correction coefficient corresponding to the fifth pixel from the left end of the main pixels is calculated in Step S31-2.

The SD correction unit 67-7 multiplies the value of the arbitrary main pixel selected by the coordinate calculation unit 67-1 by the shading correction coefficient calculated by the SD coefficient calculation unit 67-6, thereby performing shading correction (Step S31-3).

In addition, the SD correction unit 67-7 reads, as an arbitrary pixel, a pixel at a position which is bilaterally symmetric to the position of the arbitrary pixel selected from the main pixels (A-group pixel) from the sub-pixels under the control of the reading direction control unit 67-8. Then, the SD correction unit 67-7 multiplies the value of the arbitrary sub-pixel selected by the coordinate calculation unit 67-1 by the shading correction coefficient calculated by the SD coefficient calculation unit 67-6, thereby performing shading correction (Step S31-3). When the fifth pixel from the left end of the main pixels is selected as an arbitrary pixel in Step S31-1 as shown in FIG. 16A, the fifth pixel from the left end of the sub-pixels is selected as an arbitrary pixel in Step S31-3, as shown in FIG. 16B, and the value of the fifth pixel from the left end of the sub-pixels is multiplied by the shading correction coefficient for the fifth pixel from the left end of the main pixels which is calculated in Step S31-2, thereby performing shading correction.

This process is performed for all of the main pixels and the sub-pixels and shading correction (Step S31) unique to the single-eye stereoscopic imaging device 3 ends. Then, Then, the two-dimensional SD correction unit 67B performs normal shading correction for the data subjected to the shading correction (Step S31) using the two-dimensional correction table (Step S16).

According to this embodiment, it is possible to perform shading correction for each of the main pixels and the sub-pixels having bilaterally symmetric shading characteristics using one one-dimensional correction table. Therefore, it is possible to prevent an increase in memory capacity, the amount of calculation, or a circuit size and reduce a circuit size or the amount of memory used.

Fourth Embodiment

A fourth embodiment of the present invention differs from the first embodiment in that a one-dimensional correction table corresponding to the aperture value of the aperture 16 is selected from a one-dimensional correction table storage unit 67-5b according to the aperture value of the aperture 16.

When the aperture value (opening diameter) of the aperture 16 is different, the incident angle of a beam on each photodiode of the phase difference CCD 17 is different and a shading shape is changed greatly in the lateral direction. Therefore, in the fourth embodiment, an appropriate correction table is selected from the one-dimensional correction tables stored in the one-dimensional correction table storage unit 67-5b according to the aperture value, which makes it possible to respond to shading characteristics which vary depending on the aperture value.

Hereinafter, a single-eye stereoscopic imaging device 4 according to the fourth embodiment will be described. The imaging device has the same internal structure as the imaging device according to the first embodiment except for an SD correction unit. Therefore, the description of the same components is omitted and only the SD correction unit will be described. In addition, the operation of the imaging device is the same as that of the imaging device according to the first embodiment except for a shading correction method and only the shading correction method will be described. In the fourth embodiment, the same components as those in the first embodiment are denoted by the same reference numerals and the description thereof will not be repeated.

[Internal Structure of Imaging Device]

Figure 18:
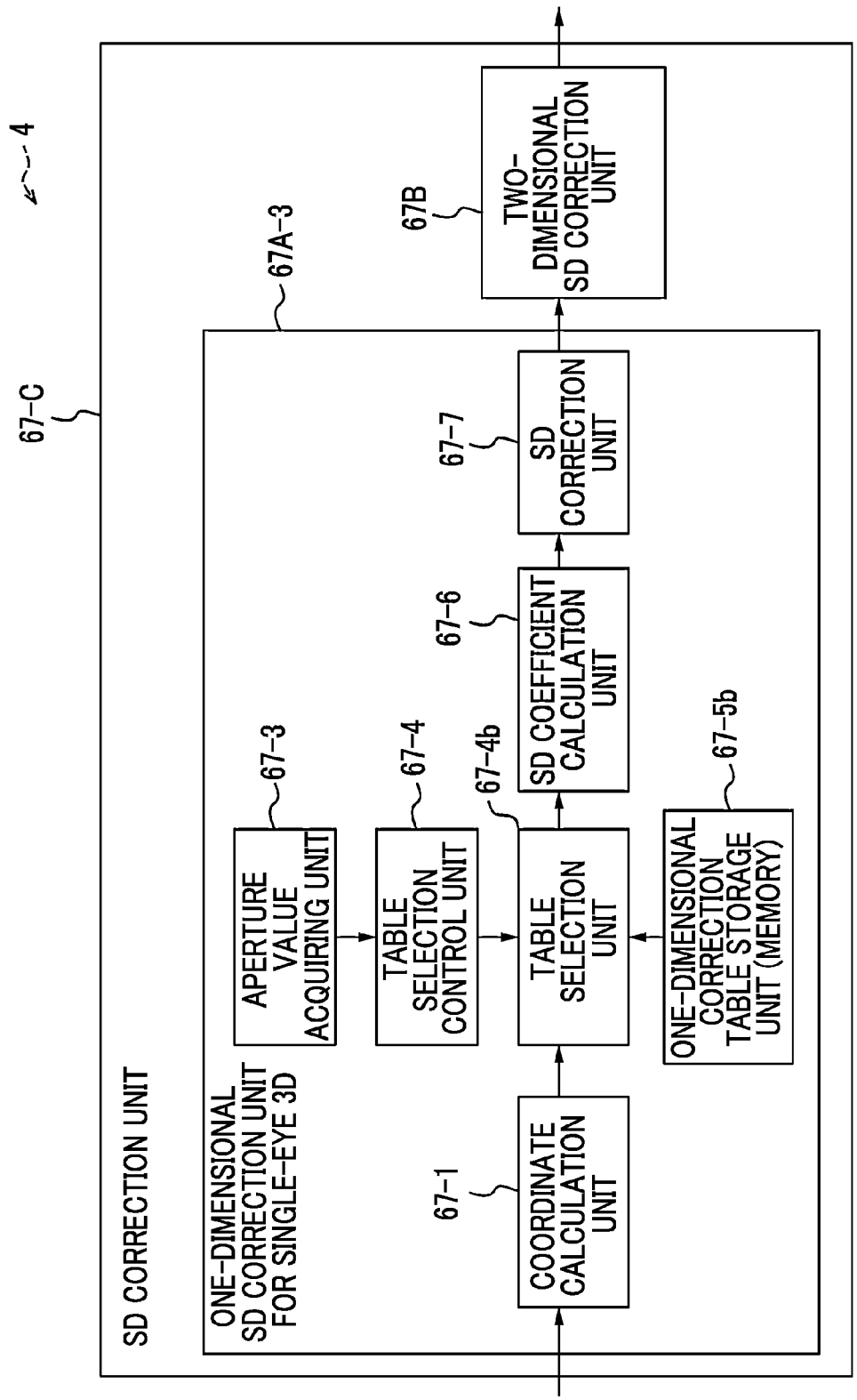
FIG. 18 is a block diagram illustrating an SD correction unit of a single-eye stereoscopic imaging device 4.

FIG. 18 is a diagram illustrating an SD correction unit 67-C according to the fourth embodiment. The SD correction unit 67-C mainly includes a two-dimensional SD correction unit 67B which performs normal shading correction and a one-dimensional SD correction unit 67A-3 which performs shading correction unique to the single-eye stereoscopic imaging device 4.

As shown in FIG. 18, the one-dimensional SD correction unit 67A-3 mainly includes a coordinate calculation unit 67-1, an aperture value acquiring unit 67-3, a table selection control unit 67-4, a table selection unit 67-4b, a one-dimensional correction table storage unit 67-5b, a shading (SD) coefficient calculation unit 67-6, and a shading (SD) correction unit 67-7.

The coordinate calculation unit 67-1 selects an arbitrary pixel from the main pixels and the sub-pixels and outputs information about the selected pixel to the table selection unit 67-4b. The table selection unit 67-4b reads a correction value at a position corresponding to the position of the pixel selected by the coordinate calculation unit 67-1 from the one-dimensional correction table which is selected according to the aperture value.

[Description of Operation of Imaging Device]

FIG. 19 is a flowchart illustrating the flow of a process of performing shading correction for image data corresponding to two images which has been output from the main pixels and the sub-pixels of the phase difference CCD 17 and then processed by an analog signal processing unit 60. The following process is mainly controlled by a CPU 40.

The flowchart shown in FIG. 19 differs from that shown in FIG. 11 in the first embodiment only in the steps (Step S11', S12', S13', S14', . . . ) surrounded by a dotted line. Therefore, only Steps S11', S12', S13', S14', . . . will be described.

In FIG. 19, when image data corresponding to two images is acquired from the main pixels and the sub-pixels of the phase difference CCD 17 (YES in Step S10), the aperture value acquiring unit 67-3 acquires the current aperture value of the aperture 16 and determines the current aperture value from the aperture values $F_1, F_2, F_3, \ldots$ (Step S11') and outputs the determination result to the table selection control unit 67-4.

The table selection control unit 67-4 instructs the table selection unit 67-4b to select a one-dimensional correction table corresponding to the current aperture value of the aperture 16 from the one-dimensional correction tables which are stored in the one-dimensional correction table storage unit 67-5b according to the aperture values $F_1, F_2, F_3, \ldots$, and the table selection unit 67-4b acquires an appropriate one-dimensional correction table from the one-dimensional correction table storage unit 67-5b in response to the instruction from the table selection control unit 67-4 (Step S12', Step S13', Step S14', . . . ).

According to this embodiment, since an appropriate correction table is selected according to the aperture value of the aperture 16, it is possible to respond to shading characteristics which vary depending on the aperture value.

Fifth Embodiment

In a fifth embodiment of the present invention, similarly to the second embodiment, the same one-dimensional correction table is used for the main pixels and the sub-pixels and the one-dimensional correction table used is switched according to the colors (R, G, and B) of the pixels. Hereinafter, a single-eye stereoscopic imaging device 5 according to the fifth embodiment will be described. The imaging device has the same internal structure as the imaging device according to the first embodiment except for an SD correction unit. Therefore, the description of the same components is omitted and only the SD correction unit will be described. In addition, the operation of the imaging device is the same as that of the imaging device according to the first embodiment except for a shading correction method and only the shading correction method will be described. In the fifth embodiment, the same components as those in the first to third embodiments are denoted by the same reference numerals and the description thereof will not be repeated.

[Internal Structure of Imaging Device]

FIG. 20 is a diagram illustrating an SD correction unit 67-D according to the fifth embodiment. The SD correction unit 67-D mainly includes a two-dimensional SD correction unit 67B which performs normal shading correction and a one-dimensional SD correction unit 67A-4 which performs shading correction unique to the single-eye stereoscopic imaging device 5.

The one-dimensional SD correction unit 67A-4 corrects shading characteristics which are reversed in the main pixels and the sub-pixels and mainly includes a coordinate calculation unit 67-1, a focal length acquiring unit 67-2, a table selection control unit 67-3b, a table selection unit 67-4c, a one-dimensional correction table storage unit 67-5c, a shading (SD) coefficient calculation unit 67-6, a shading (SD) correction unit 67-7, and a pixel color (R, and B) acquiring unit 67-9, as shown in FIG. 20.

The one-dimensional correction table storage unit 67-5c stores a plurality of one-dimensional correction tables corresponding to the colors (R, G, and B) of the pixels. For each one-dimensional correction table corresponding to each color, a plurality of one-dimensional correction tables corresponding to the focal length are stored in the one-dimensional correction table storage unit 67-5c. In this embodiment, the same one-dimensional correction table is used for the main pixels and the sub-pixels.

The coordinate calculation unit 67-1 selects an arbitrary pixel from the main pixels and outputs information about the selected pixel to the table selection unit 67-4 and the pixel color (R, G, and B) acquiring unit 67-9. The pixel color (R, G, and B) acquiring unit 67-9 determines the color of the arbitrary pixel selected by the coordinate calculation unit 67-1 and outputs the determined color to the table selection control unit 67-3b. The table selection control unit 67-3b instructs the table selection unit 67-4c to select a one-dimensional correction table corresponding to the color of the pixel and the focal length from the one-dimensional correction tables stored in the one-dimensional correction table storage unit 67-5. The table selection unit 67-4c reads a correction value at a position corresponding to the position of the pixel selected by the coordinate calculation unit 67-1 from the one-dimensional correction table which is selected according to the focal length.

The coordinate calculation unit 67-1 selects an arbitrary pixel from the sub-pixels and outputs information about the selected pixel to the table selection unit 67-4c. The table selection unit 67-4c determines a position corresponding to the position of the pixel selected by the coordinate calculation unit 67-1 from the one-dimensional correction table which is selected according to the color of the pixel and the focal length, similarly to when the arbitrary pixel is selected from the main pixels, and reads a correction value which is bilaterally symmetric to the position determined in the one-dimensional correction table.

[Description of Operation of Imaging Device]

FIG. 21 is a flowchart illustrating the flow of a process of performing shading correction for image data corresponding to two images which has been output from the main pixels and the sub-pixels of the phase difference CCD 17 and then processed by an analog signal processing unit 60. The following process is mainly controlled by a CPU 40.

First, the CPU 40 determines whether the image captured by the single-eye stereoscopic imaging device 5 is a stereoscopic image (Step S10). When the stereoscopic image is not obtained (NO in Step S10), the two-dimensional SD correction unit 67B performs normal shading correction using a two-dimensional correction table (Step S16).

When image data corresponding to two images is acquired from the main pixels and the sub-pixels of the phase difference CCD 17 (YES in Step S10), the focal length acquiring unit 67-2 acquires the focal length (Step S11). The table selection control unit 67-3b instructs the table selection unit 67-4c to select a one-dimensional correction table corresponding to the focal length from the one-dimensional correction tables stored in the one-dimensional correction table storage unit 67-5c. Next, a case in which the focal length is A will be described. The process when the focal length is B, C, . . . is the same as that when the focal length is A and the description thereof will not be repeated.

The coordinate calculation unit 67-1 selects arbitrary pixels at the same position from the main pixels (A-group pixels) and the sub-pixels (B-group pixels) (Step S41). The pixel color (R, G, and B) acquiring unit 67-9 determines the colors of the arbitrary pixels which are selected from the main pixels (A-group pixels) and the sub-pixels (B-group pixels) in Step S41 (Step S42).

The table selection unit 67-4a acquires an appropriate one-dimensional correction table from the one-dimensional correction table storage unit 67-5a according to the colors of the pixels in response to the instruction from the table selection control unit 67-3 (Steps S43, S44, and S45). For example, when the color of the pixel is R, a one-dimensional SD correction table 1R, which is a one-dimensional correction table in which the color of the pixel is R, is acquired from the one-dimensional correction tables in which the focal length is A (Step S43). When the color of the pixel is a one-dimensional SD correction table 1Q which is a one-dimensional correction table in which the color of the pixel is acquired from the one-dimensional correction tables in which the focal length is A (Step S44). When the color of the pixel is B, a one-dimensional SD correction table 1B, which is a one-dimensional correction table in which the color of the pixel is B, is acquired from the one-dimensional correction tables in which the focal length is A (Step S45). In this way, the one-dimensional correction tables used for shading correction are acquired.

The one-dimensional SD correction unit 67A-4 performs shading correction using the acquired one-dimensional correction tables (Step S46). Next, Step S46 will be described in detail.

Information about the arbitrary pixel selected in Step S41 is output to the table selection unit 67-4c. The table selection unit 67-4c reads a correction value corresponding to the position of the main pixel selected by the coordinate calculation unit 67-1 from the one-dimensional correction tables which are acquired in Steps S43 to S45 (Step S46-1).

In addition, the table selection unit 67-4c reads a correction value which is in the one-dimensional correction tables acquired in Steps S43 to S45 and is bilaterally symmetric to the correction value read in Step S46-1 (Step S46-2). A method of reading the correction value at the bilaterally symmetric position is the same as that in Step S24-3.

The SD coefficient calculation unit 67-6 performs, for example, linear interpolation on the correction values which are acquired by the table selection unit 67-4c in Step S46-1 and Step S46-2 to calculate a shading correction coefficient (Step S46-3).

The SD correction unit 67-7 multiplies the value of the arbitrary main pixel selected by the coordinate calculation unit 67-1 by the shading correction coefficient which is calculated by the SD coefficient calculation unit 67-6 on the basis of the correction value acquired by the table selection unit 67-4c in Step S46-1, thereby performing shading correction (Step S46-4). In addition, the SD correction unit 67-7 multiplies the value of the arbitrary sub-pixel selected by the coordinate calculation unit 67-1 by the shading correction coefficient which is calculated by the SD coefficient calculation unit 67-6 on the basis of the correction value acquired by the table selection unit 67-4a in Step S46-2, thereby performing shading correction (Step S46-4).

Steps S41 to S46 are performed for all of the main pixels and the sub-pixels and the shading correction unique to the single-eye stereoscopic imaging device 5 ends. Then, the two-dimensional SD correction unit 67B performs normal shading correction using the two-dimensional correction table (Step S16).

According to this embodiment, it is possible to perform shading correction for each of the main pixels and the sub-pixels having bilaterally symmetric shading characteristics using one one-dimensional correction table. Therefore, it is possible to prevent an increase in memory capacity, the amount of calculation, or a circuit size and reduce a circuit size or the amount of memory used.

Furthermore, according to this embodiment, even when shading characteristics are different in R, G, and B colors, it is possible to perform appropriate shading correction.

Sixth Embodiment

In a sixth embodiment of the present invention, similarly to the fifth embodiment, the one-dimensional correction table used is switched according to the colors (R, G, and B) of the pixels. In addition, in the sixth embodiment, the one-dimensional correction table used is switched between Gr and Gb. Hereinafter, a single-eye stereoscopic imaging device 6 according to the sixth embodiment will be described. The imaging device has the same internal structure as the imaging device according to the first embodiment except for an SD correction unit. Therefore, the description of the same components is omitted and only the SD correction unit will be described. In addition, the operation of the imaging device is the same as that of the imaging device according to the first embodiment except for a shading correction method and only the shading correction method will be described. In the sixth embodiment, the same components as those in the first to fifth embodiments are denoted by the same reference numerals and the description thereof will not be repeated.

[Internal Structure of Imaging Device]

FIG. 22 is a diagram illustrating an SD correction unit 67-E according to the sixth embodiment. The SD correction unit 67-E mainly includes a two-dimensional SD correction unit 67B which performs normal shading correction and a one-dimensional SD correction unit 67A-5 which performs shading correction unique to the single-eye stereoscopic imaging device 6.

The one-dimensional SD correction unit 67A-5 corrects shading characteristics which are reversed in the main pixels and the sub-pixels and mainly includes a coordinate calculation unit 67-1, a focal length acquiring unit 67-2, a table selection control unit 67-3c, a table selection unit 67-4d, a one-dimensional correction table storage unit 67-5d, a shading (SD) coefficient calculation unit 67-6, a shading (SD) correction unit 67-7, and a pixel color (R, Gr, B, and Gb) acquiring unit 67-9a, as shown in FIG. 22.

The one-dimensional correction table storage unit 67-5d stores a plurality of one-dimensional correction tables corresponding to the colors (R, Gr, B, and Gb) of the pixels. Among the colors of the pixels, Gr is a G pixel which is provided in a line of G, R, G, R, . . . pixels and Gb is a G pixel which is provided in a line of B, G, B, G, . . . pixels. For each one-dimensional correction table for each color, a plurality of one-dimensional correction tables corresponding to the focal length are stored. In this embodiment, the same one-dimensional correction table is used for the main pixels and the sub-pixels.

The same G pixels have different shading characteristics according to the color of an adjacent pixel. In this embodiment, the one-dimensional correction tables are different in Gr and Gb, which makes it possible to perform accurate shading correction.

The coordinate calculation unit 67-1 selects an arbitrary pixel from the main pixels and outputs information about the selected pixel to the table selection unit 67-4d and the pixel color (R, Gr, B, and Gb) acquiring unit 67-9a. The pixel color (R, Gr, B, and Gb) acquiring unit 67-9a determines the color of the arbitrary pixel selected by the coordinate calculation unit 67-1 and outputs the determination result to the table selection control unit 67-3c. The table selection control unit 67-3c instructs the table selection unit 67-4d to select a one-dimensional correction table corresponding to the color of the pixel and the focal length from the one-dimensional correction tables stored in the one-dimensional correction table storage unit 67-5d and the table selection unit 67-4d reads a correction value at a position corresponding to the position of the pixel selected by the coordinate calculation unit 67-1 from the one-dimensional correction table which is selected according to the focal length.

The coordinate calculation unit 67-1 selects an arbitrary pixel from the sub-pixels and outputs information about the selected pixel to the table selection unit 67-4d. The table selection unit 67-4d determines a position corresponding to the position of the pixel selected by the coordinate calculation unit 67-1 from the one-dimensional correction table which is selected according to the color of the pixel and the focal length, similarly to when the arbitrary pixel is selected from the main pixels, and reads a correction value which is bilaterally symmetric to the position determined in the one-dimensional correction table.

[Description of Operation of Imaging Device]

Figure 23:
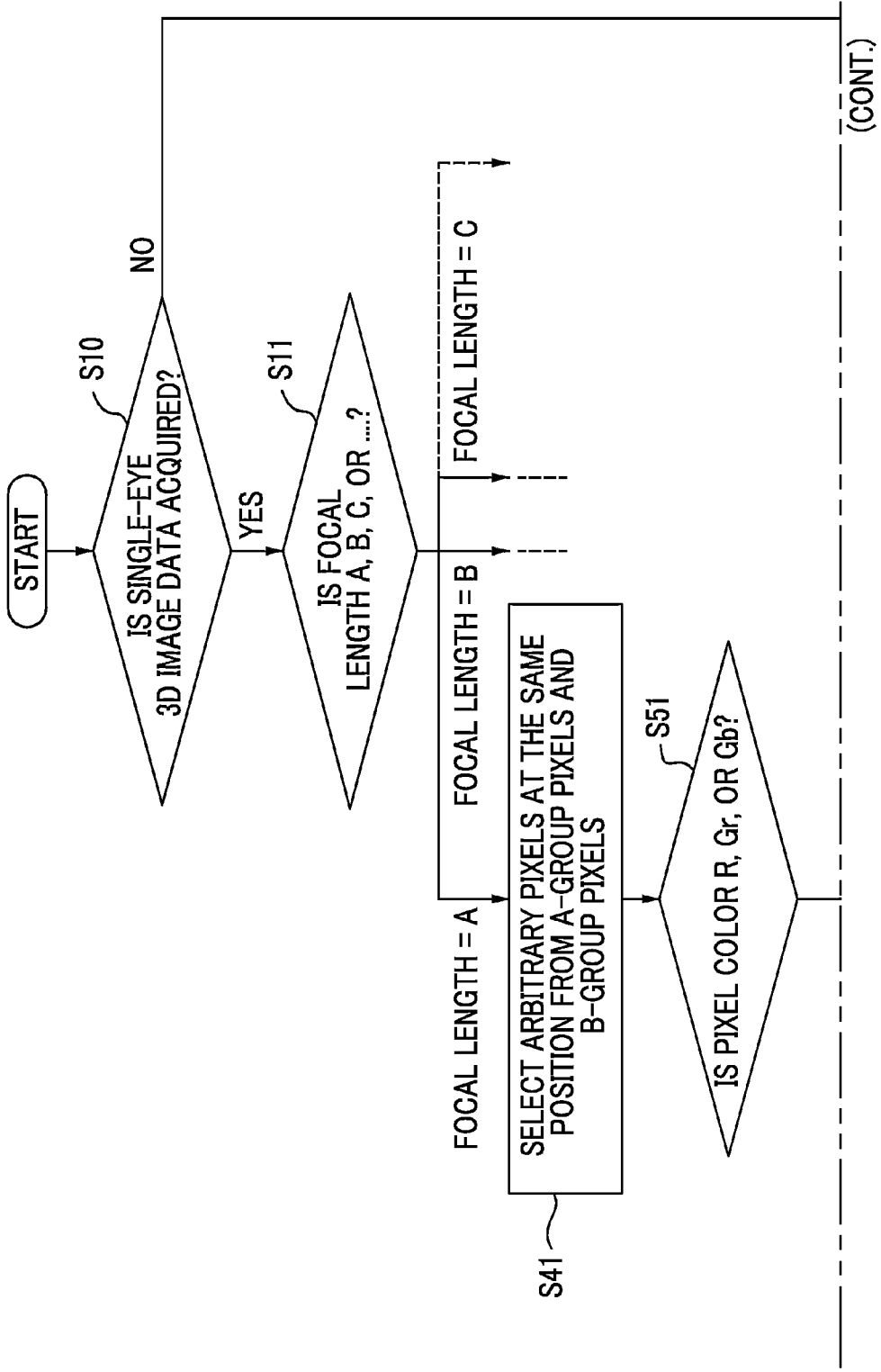
FIG. 23 is a flowchart illustrating a shading correction process of the single-eye stereoscopic imaging device 6.

FIG. 23 is a flowchart illustrating the flow of a process of performing shading correction for image data corresponding to two images which has been output from the main pixels and the sub-pixels of the phase difference CCD 17 and then processed by an analog signal processing unit 60. The following process is mainly controlled by a CPU 40.

First, the CPU 40 determines whether the image captured by the single-eye stereoscopic imaging device 6 is a stereoscopic image (Step S10). When the stereoscopic image is not obtained (NO in Step S10), the two-dimensional SD correction unit 67B performs normal shading correction using a two-dimensional correction table (Step S16).

When image data corresponding to two images is acquired from the main pixels and the sub-pixels of the phase difference CCD 17 (YES in Step S10), the focal length acquiring unit 67-2 acquires the focal length (Step S11). The table selection control unit 67-3c instructs the table selection unit 67-4d to select a one-dimensional correction table corresponding to the focal length from the one-dimensional correction tables stored in the one-dimensional correction table storage unit 67-5d. Next, a case in which the focal length is A will be described. The process when the focal length is B, C, ... is the same as that when the focal length is A and the description thereof will not be repeated.

The coordinate calculation unit 67-1 selects arbitrary pixels at the same position from the main pixels (A-group pixels) and the sub-pixels (B-group pixels) (Step S41). The pixel color (R, Gr, B, and Gb) acquiring unit 67-9a determines the colors of the arbitrary pixels which are selected from the main pixels (A-group pixels) and the sub-pixels (B-group pixels) (Step S51).

The table selection unit 67-4d acquires an appropriate one-dimensional correction table from the one-dimensional correction table storage unit 67-5d according to the colors of the pixels in response to the instruction from the table selection control unit 67-3 (Steps S21, S22, S23, . . . ). For example, when the color of the pixel is R, a one-dimensional SD correction table 1R, which is a one-dimensional correction table in which the color of the pixel is R, is acquired from the one-dimensional correction tables in which the focal length is A (Step S52). When the color of the pixel is Gr, a one-dimensional SD correction table 1Gr, which is a one-dimensional correction table in which the color of the pixel is Gr, is acquired from the one-dimensional correction tables in which the focal length is A (Step S53). When the color of the pixel is B, a one-dimensional SD correction table 1B, which is a one-dimensional correction table in which the color of the pixel is B, is acquired from the one-dimensional correction tables in which the focal length is A (Step S54). When the color of the pixel is Gb, a one-dimensional SD correction table 1Gb, which is a one-dimensional correction table in which the color of the pixel is Gb, is acquired from the one-dimensional correction tables in which the focal length is A (Step S55). In this way, the one-dimensional correction tables used for shading correction are acquired.

The one-dimensional SD correction unit 67A-5 performs shading correction using the acquired one-dimensional correction tables (Step S56). Next, Step S56 will be described in detail.

Information about the arbitrary pixel selected in Step S41 is output to the table selection unit 67-4d. The table selection unit 67-4d reads a correction value corresponding to the position of the main pixel selected by the coordinate calculation unit 67-1 from the one-dimensional correction tables which are acquired in Steps S52 to S55 (Step S56-1).

In addition, the table selection unit 67-4d reads a correction value which is in the one-dimensional correction tables acquired in Steps S52 to S55 and is bilaterally symmetric to the correction value read in Step S56-1 (Step S56-2). A method of reading the correction value at the bilaterally symmetric position is the same as that in Step S24-3.

The SD coefficient calculation unit 67-6 performs, for example, linear interpolation on the correction values which are acquired by the table selection unit 67-4d in Step S56-1 and Step S56-2 to calculate a shading correction coefficient (Step S56-3).

The SD correction unit 67-7 multiplies the value of the arbitrary main pixel selected by the coordinate calculation unit 67-1 by the shading correction coefficient which is calculated by the SD coefficient calculation unit 67-6 on the basis of the correction value acquired by the table selection unit 67-4d in Step S56-1, thereby performing shading correction (Step S56-4). In addition, the SD correction unit 67-7 multiplies the value of the arbitrary sub-pixel selected by the coordinate calculation unit 67-1 by the shading correction coefficient which is calculated by the SD coefficient calculation unit 67-6 on the basis of the correction value acquired by the table selection unit 67-4d in Step S56-2, thereby performing shading correction (Step S56-4).

Steps S41 to S56 are performed for all of the main pixels and the sub-pixels and the shading correction unique to the single-eye stereoscopic imaging device 6 ends. Then, the two-dimensional SD correction unit 67B performs normal shading correction for the data subjected to the shading correction (Step S56) using the two-dimensional correction table (Step S16).

According to this embodiment, it is possible to perform shading correction for each of the main pixels and the sub-pixels having bilaterally symmetric shading characteristics using one one-dimensional correction table. Therefore, it is possible to prevent an increase in memory capacity, the amount of calculation, or a circuit size and reduce a circuit size or the amount of memory used.

Furthermore, according to this embodiment, even when shading characteristics are different in R, G, and B colors, it is possible to perform appropriate shading correction for, particularly, the G pixel.

In addition, according to this embodiment, the individual one-dimensional correction tables are used for R, Gr, B, and Gb colors. However, a one-dimensional correction table for a GR line and a one-dimensional correction table for a GB line may be stored and an appropriate correction table may be used according to whether a shading correction target is the GR line or the GB line.

Seventh Embodiment

In the first embodiment of the present invention, only beams on the left side of the optical axis among the beams which have passed through the exit pupil are incident on the main pixels of the phase difference CCD 17 and only beams on the right side of the optical axis among the beams which have passed through the exit pupil are incident on the sub-pixels, thereby capturing a stereoscopic image. However, a method of capturing the stereoscopic image is not limited thereto.

In a seventh embodiment of the present invention, a stereoscopic image is used by two methods in the horizontal direction and the vertical direction. Next, a single-eye stereoscopic imaging device 7 according to the seventh embodiment will be described. The imaging device has the same structure as the imaging device according to the first embodiment except for an SD correction unit in the structure and internal configuration of the solid-state imaging element. Therefore, the description of the same components is omitted and only the structure of the solid-state imaging element and the SD correction unit will be described. In addition, the operation of the imaging device is the same as that of the imaging device according to the first embodiment except for a shading correction method and only the shading correction method will be described. In the seventh embodiment, the same components as those in the first to sixth embodiments are denoted by the same reference numerals and the description thereof will not be repeated.

[Example of Structure of Imaging Optical System and Imaging Element]

A lens unit 12 mainly includes an imaging lens 14, an aperture 16, and a solid-state imaging element (hereinafter, referred to as a "phase difference CCD") 17' which is a phase difference image sensor.

Figure 24:
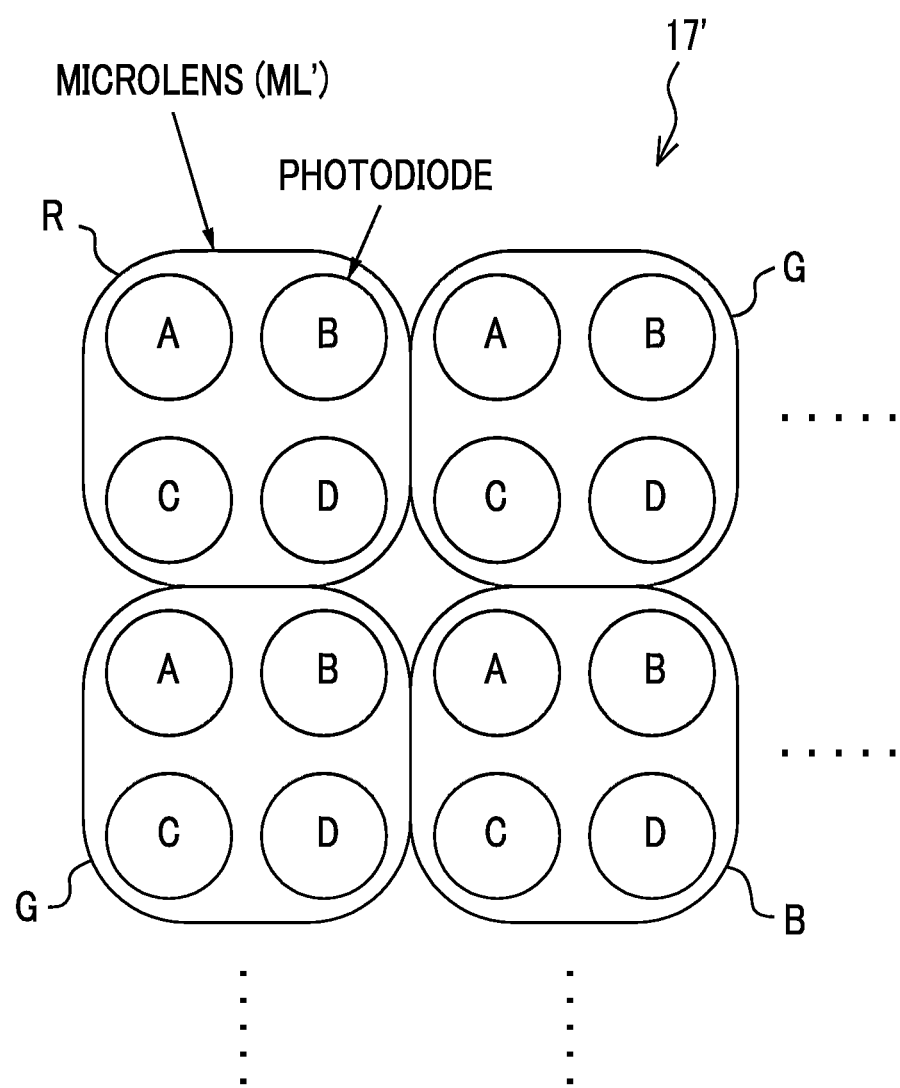
FIG. 24 is a diagram illustrating an example of the structure of a phase difference CCD of a single-eye stereoscopic imaging device 7.

FIG. 24 is a diagram illustrating an example of the structure of the phase difference CCD 17'.

The phase difference CCD 17' includes units each (four pixels and one microlens) of which includes four photodiodes A, B, C, and D which are two-dimensionally arranged and one microlens ML' which covers the four photodiodes and which are two-dimensionally arranged. Information can be independently read from the four photodiodes in each unit.

As shown in FIG. 24, odd-numbered lines (1, 3, 5, . . . ) of the phase difference CCD 17' are lines of G, R, G, R, . . . pixels among the pixels including R (red), G (green), and B (blue) color filters and even-numbered lines (2, 4, 6, . . . ) are lines of B, G, B, G, . . . pixels.

Figure 25:
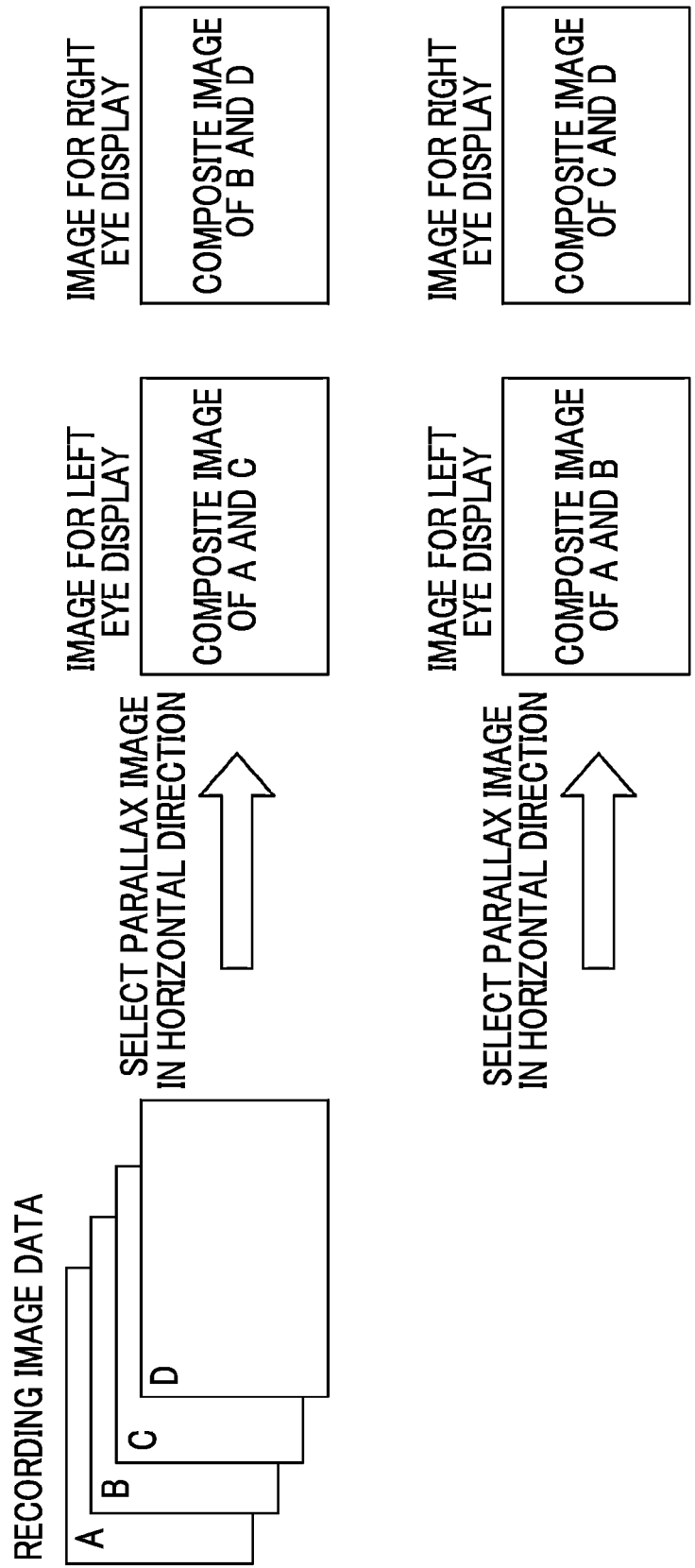
FIG. 25 is a diagram illustrating main pixels and sub-pixels of the phase difference CCD of the single-eye stereoscopic imaging device 7.

FIG. 25 is a diagram illustrating a method of capturing a stereoscopic image using the phase difference CCD 17'.

When the phase difference CCD 17' captures an image in the horizontal direction (normal horizontal imaging), a composite of the photodiodes A and C in each unit is the main pixel which receives only beams on the left side of the optical axis among the beams which have passed through the exit pupil and a composite image of the photodiodes A and C is an image for the left eye. In addition, a composite of the photodiodes B and D in each unit is the sub-pixel which receives only beams on the right side of the optical axis among the beams which have passed through the exit pupil and a composite image of the photodiodes B and D is an image for the right eye.

When the phase difference CCD 17' captures an image in the vertical direction (so-called vertical imaging in which the single-eye stereoscopic imaging device 7 is rotated 90 degrees and captures an image), a composite of the photodiodes A and B in each unit is the main pixel which receives only beams on the left side of the optical axis among the beams which have passed through the exit pupil and a composite image of the photodiodes A and B is an image for the left eye. In addition, a composite of the photodiodes C and D in each unit is the sub-pixel which receives only beams on the right side of the optical axis among the beams which have passed through the exit pupil and a composite image of the photodiodes C and D is an image for the right eye.

[Internal Structure of Imaging Device]

Figure 26:
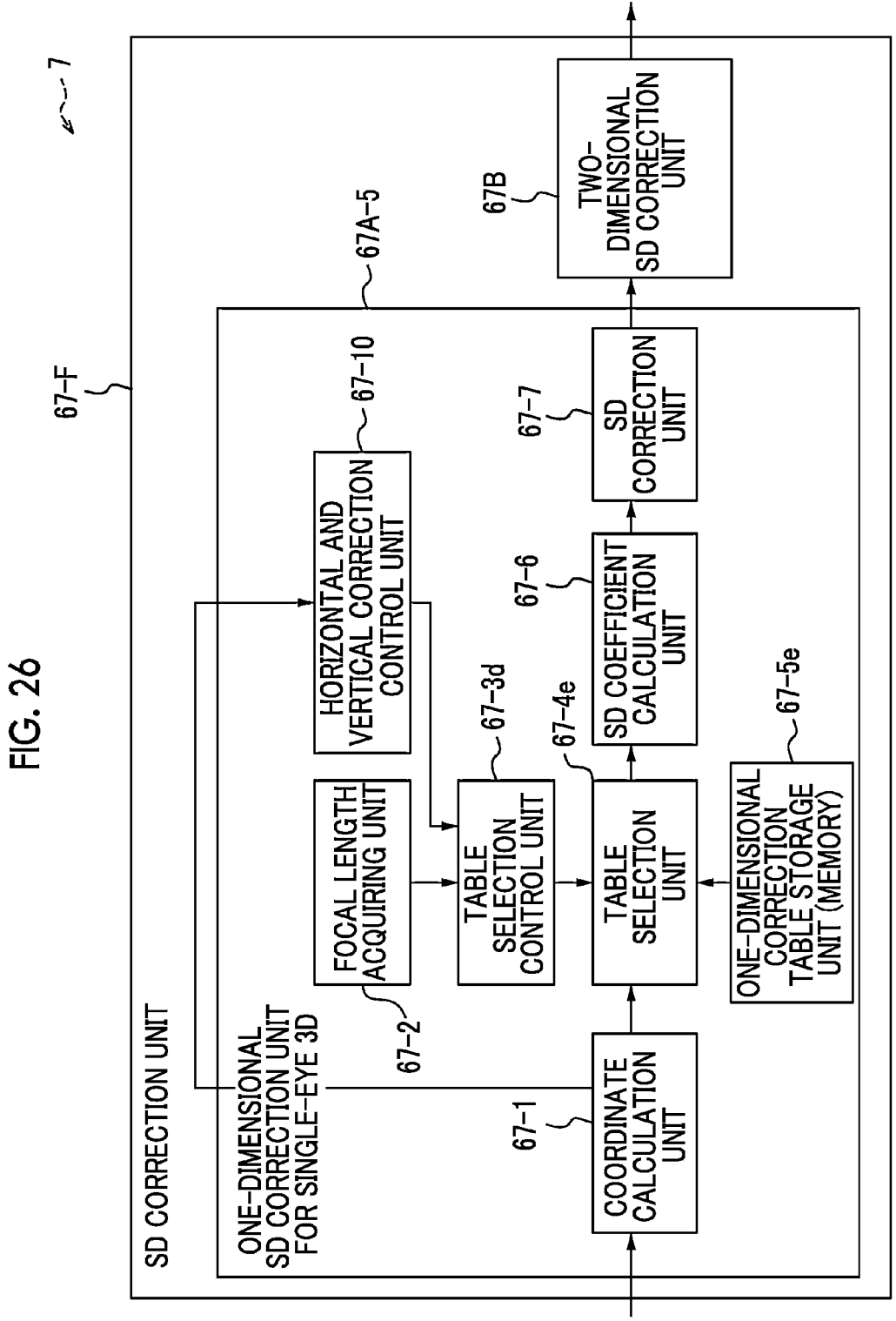
FIG. 26 is a block diagram illustrating an SD correction unit of the single-eye stereoscopic imaging device 7.

FIG. 26 is a diagram illustrating an SD correction unit 67-F according to the seventh embodiment. The SD correction unit 67-F mainly includes a two-dimensional SD correction unit 67B which performs normal shading correction and a one-dimensional SD correction unit 67A-5 which performs shading correction unique to the single-eye stereoscopic imaging device 7.

The one-dimensional SD correction unit 67A-5 corrects shading characteristics which are reversed in the main pixel and the sub-pixel and mainly includes a coordinate calculation unit 67-1, a focal length acquiring unit 67-2, a table selection control unit 67-3d, a table selection unit 67-4e, a one-dimensional correction table storage unit 67-5e, a shading (SD) coefficient calculation unit 67-6, a shading (SD) correction unit 67-7, and a horizontal and vertical correction control unit 67-10, as shown in FIG. 26.

The one-dimensional correction table storage unit 67-5e stores a plurality of one-dimensional correction tables when the phase difference CCD 17' captures an image in the horizontal direction and a plurality of one-dimensional correction tables when the phase difference CCD 17' captures an image in the vertical direction. For the plurality of one-dimensional correction tables when the phase difference CCD 17' captures an image in the horizontal direction and the plurality of one-dimensional correction tables when the phase difference CCD 17' captures an image in the vertical direction, a plurality of one-dimensional correction tables corresponding to the focal length are stored. In this embodiment, the same one-dimensional correction table is used for the main pixel and the sub-pixel.

The horizontal and vertical correction control unit 67-10 is, for example of, a gyro sensor and determines whether the phase difference CCD 17' captures an image in the horizontal direction or the phase difference CCD 17' captures an image in the vertical direction (hereinafter, referred to as an imaging direction). The determination result of the horizontal and vertical correction control unit 67-10 is output to the table selection control unit 67-3d.

The coordinate calculation unit 67-1 selects an arbitrary pixel from the main pixels and outputs information about the selected pixel to the table selection unit 67-4e. The table selection control unit 67-3d instructs the table selection unit 67-4e to select a one-dimensional correction table corresponding to the imaging direction and the focal length from the one-dimensional correction tables stored in the one-dimensional correction table storage unit 67-5e and the table selection unit 67-4e reads a correction value at a position corresponding to the position of the pixel selected by the coordinate calculation unit 67-1 from the selected one-dimensional correction table.

The coordinate calculation unit 67-1 selects an arbitrary pixel from the sub-pixels and outputs information about the selected pixel to the table selection unit 67-4e. The table selection control unit 67-3d instructs the table selection unit 67-4e to select a one-dimensional correction table corresponding to the imaging direction and the focal length from the one-dimensional correction tables stored in the one-dimensional correction table storage unit 67-5e and the table selection unit 67-4e reads a correction value at a position corresponding to the position of the pixel selected by the coordinate calculation unit 67-1 from the selected one-dimensional correction table.

[Description of Operation of Imaging Device]

Figure 27:
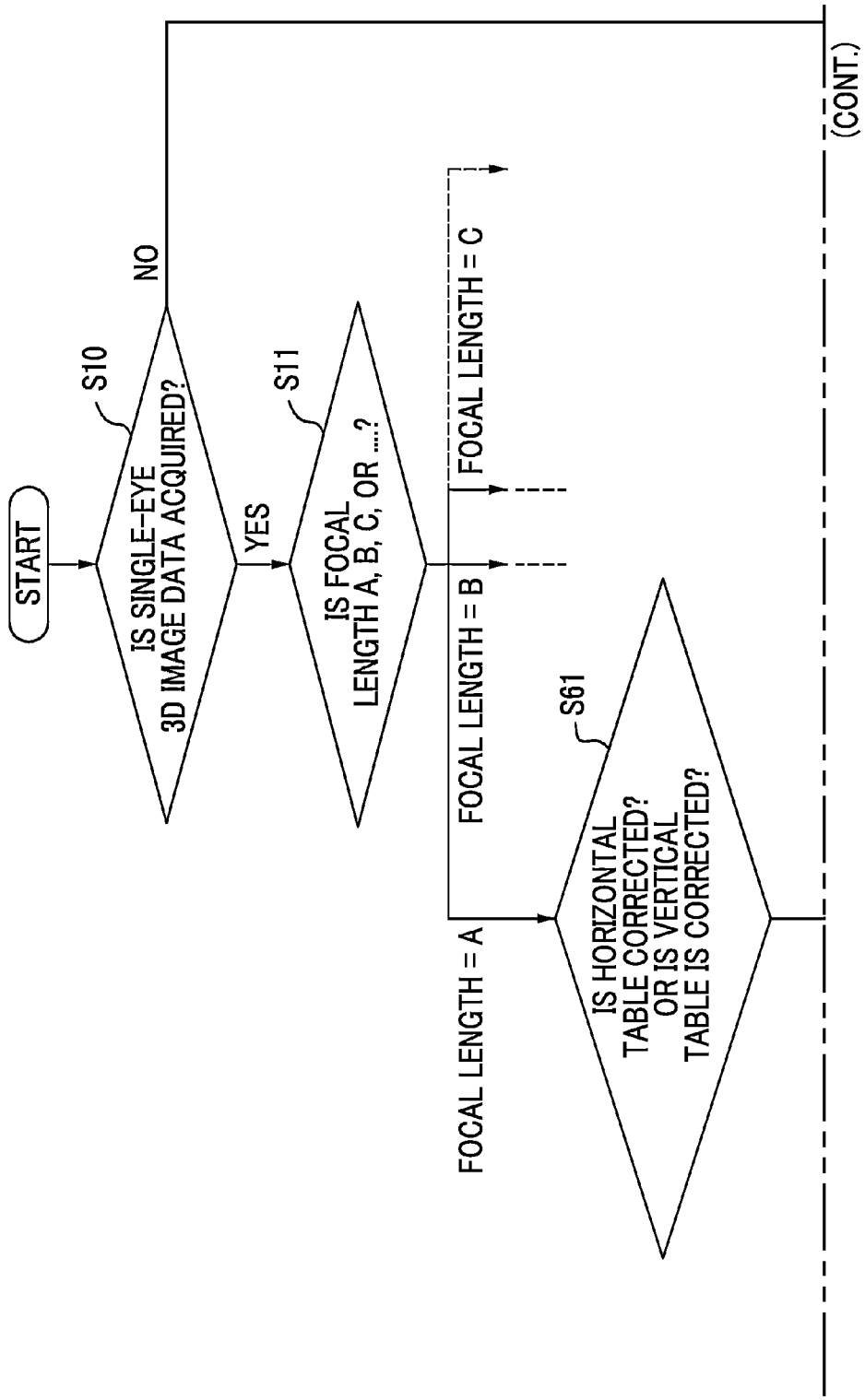
FIG. 27 is a flowchart illustrating a shading correction process of the single-eye stereoscopic imaging device 7.

FIG. 27 is a flowchart illustrating the flow of a process of performing shading correction for image data corresponding to two images which has been output from the main pixels and the sub-pixels of the phase difference CCD 17' and then processed by an analog signal processing unit 60. The following process is mainly controlled by a CPU 40.

First, the CPU 40 determines whether the image captured by the single-eye stereoscopic imaging device 7 is a stereoscopic image (Step S10). When the stereoscopic image is not obtained (NO in Step S10), the two-dimensional SD correction unit 67B performs normal shading correction using a two-dimensional correction table (Step S16).

When image data corresponding to two images is acquired from the main pixels and the sub-pixels of the phase difference CCD 17' (YES in Step S10), the focal length acquiring unit 67-2 acquires the focal length (Step S11). The table selection control unit 67-3d instructs the table selection unit 67-4e to select a one-dimensional correction table corresponding to the focal length from the one-dimensional correction tables stored in the one-dimensional correction table storage unit 67-5e. Next, a case in which the focal length is A will be described. The process when the focal length is B, C, . . . is the same as that when the focal length is A and the description thereof will not be repeated.

The horizontal and vertical correction control unit 67-10 determines the imaging direction and outputs the determination result to the table selection control unit 67-3d (Step S61). The table selection control unit 67-3d instructs the table selection unit 67-4e to select a one-dimensional correction table corresponding to the imaging direction and the focal length from the one-dimensional correction tables stored in the one-dimensional correction table storage unit 67-5e, and the table selection unit 67-4e acquires an appropriate one-dimensional correction table from the one-dimensional correction table storage unit 67-5e in response to the instruction from the table selection control unit 67-3d (Steps S62 and S63). That is, when the focal length is A and the phase difference CCD 17' captures an image in the horizontal direction, a one-dimensional SD correction table X, which is a one-dimensional correction table in which the focal length is A and the imaging direction is the horizontal direction, is acquired (Step S62). When the focal length is A and the phase difference CCD 17' captures an image in the vertical direction, a one-dimensional SD correction table Y, which is a one-dimensional correction table in which the focal length is A and the imaging direction is the vertical direction, is acquired (Step S63). In this way, the one-dimensional correction tables used for shading correction are acquired.

The one-dimensional SD correction unit 67A-5 performs shading correction using the acquired one-dimensional correction tables (Step S64). Next, Step S64 will be described in detail.

The coordinate calculation unit 67-1 selects arbitrary pixels at the same position from the main pixels and the sub-pixels (Step S64-1). Information about the arbitrary pixels is output to the table selection unit 67-4*e* and the table selection unit 67-4*e* reads a correction value corresponding to the position of the main pixel selected by the coordinate calculation unit 67-1 from the one-dimensional correction tables acquired in Steps S62 and S63 (Step S64-2). In addition, the table selection unit 67-4*e* reads a correction value which is in the one-dimensional correction tables acquired in Steps S62 and S63 and is bilaterally symmetric to the correction value read in Step S64-2 (Step S64-3).

The SD coefficient calculation unit 67-6 performs, for example, linear interpolation on the correction values which are acquired by the table selection unit 67-4*e* in Step S64-2 and Step S64-3 to calculate a shading correction coefficient (Step S64-4).

The SD correction unit 67-7 multiplies the value of the arbitrary main pixel selected by the coordinate calculation unit 67-1 by the shading correction coefficient calculated by the SD coefficient calculation unit 67-6 on the basis of the correction value which is acquired by the table selection unit 67-4*e* in Step S64-2, thereby performing shading correction (Step S64-5). In addition, the SD correction unit 67-7 multiplies the value of the arbitrary sub-pixel selected by the coordinate calculation unit 67-1 by the shading correction coefficient calculated by the SD coefficient calculation unit 67-6 on the basis of the correction value which is acquired by the table selection unit 67-4*e* in Step S64-3, thereby performing shading correction (Step S64-5).

This process is performed for all of the main pixels and the sub-pixels and the shading correction (Step S64) unique to the single-eye stereoscopic imaging device 7 ends. Then, the two-dimensional SD correction unit 67B performs normal shading correction for the data subjected to the shading correction (Step S64) using the two-dimensional correction table (Step S16).

According to this embodiment, it is possible to perform shading correction for each of the main pixels and the sub-pixels having bilaterally symmetric shading characteristics using one one-dimensional correction table. Therefore, it is possible to prevent an increase in memory capacity, the amount of calculation, or a circuit size and reduce a circuit size or the amount of memory used.

Furthermore, in this embodiment, it is possible to perform appropriate shading correction when the stereoscopic image has parallax in the vertical direction as well as when the stereoscopic image has parallax in the horizontal direction.

In addition, in this embodiment, when one two-dimensional image is obtained by adding the main pixels and the sub-pixels, or when four pixels among one microlens and four pixels shown in FIG. 24 are added to obtain one two-dimensional image, the density unevenness of each plane due to single-eye 3D (pupil division) is cancelled and one-dimensional shading correction is not performed. However, when a high-resolution 2D image is acquired without adding each plane, it is necessary to individually perform shading correction for the density unevenness of each plane due to pupil division.

[Other Embodiments for Shading Correction for Density Unevenness Caused by Pupil Division]

Next, a case in which the density unevenness of four planes (planes A, B, C, and D) obtained from the phase difference CCD 17' in which one unit includes four pixels and one microlens due to pupil division is corrected for each plane will be described.

Figure 28:
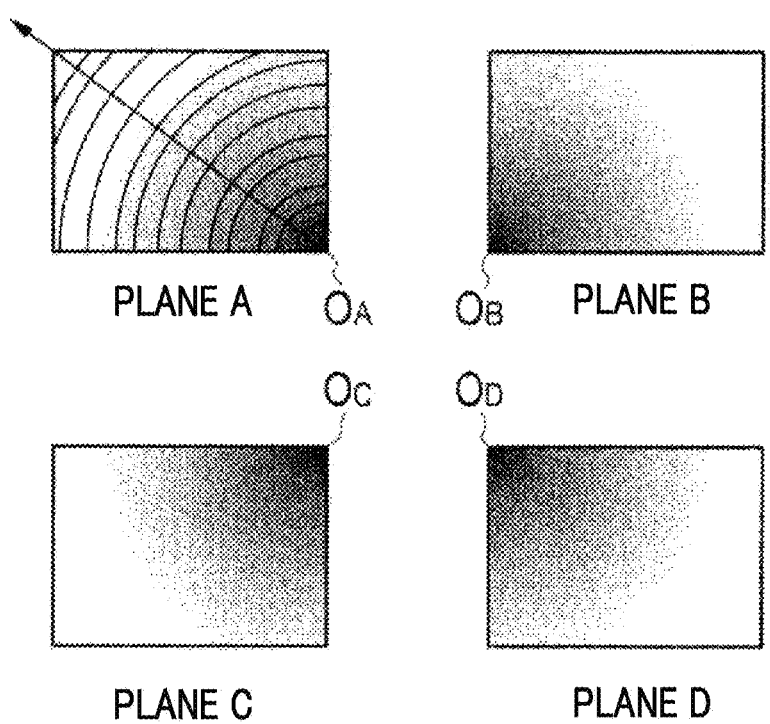
FIG. 28 is a diagram illustrating the shading characteristics of each plane of a CCD including four pixels and one microlens.

FIG. 28 is an image diagram illustrating the density unevenness of four planes (planes A, B, C, and D) obtained from the phase difference CCD 17' in which one unit includes four pixels and one microlens due to pupil division. In FIG. 28, a high-density portion corresponds to a bright portion.

In the case of one screen (plane A) including only a photodiode A of the phase difference CCD 17' (FIG. 24) in which one unit includes four pixels and one microlens, density unevenness due to pupil division has a density gradient in which density is the highest at a position $O_A$ which is the lower right corner of the plane A and is reduced as the distance from the position $O_A$ increases.

Therefore, a one-dimensional correction table (a one-dimensional correction table corresponding to the distance from the position $O_A$ on a diagonal line connecting the position $O_A$ and a diagonal position thereof) in the direction of an arrow indicated on the plane A of FIG. 28 is prepared. When shading correction is performed for the pixels of the plane A to be corrected, a correction value is read from the one-dimensional correction table on the basis of the distance of the pixel on the plane A from the position $O_A$ and is applied, thereby performing shading correction for the density unevenness of the plane A due to pupil division.

Since the distance of each pixel of the plane A from the position $O_A$ can be calculated in advance, each pixel can have information indicating the distance from the position $O_A$.

When the density unevenness of the planes B, C, and D due to pupil division is corrected, the same one one-dimensional correction table as that for the plane A may be used. In this case, the distance of each pixel of the plane B for reading the correction value from the one-dimensional correction table is a distance from a position $O_B$ which is the lower left corner of the plane B. Similarly, the distances of each pixel of the planes C and D are a distance from a position $O_C$ which is the upper right corner of the plane C and a distance from a position $O_D$ which is the upper left corner of the plane D.

That is, the pixels of each of the planes A to D have information about the distances from the reference positions ($O_A$ to $O_D$) in advance and a correction value corresponding to the distance of each pixel is read from the one-dimensional correction table and then applied. In this way, it is possible to correct density unevenness due to pupil division.

Next, a case in which the density unevenness of nine planes (planes A to I) obtained from the phase difference CCD 17 in which one unit includes nine pixels and one microlens due to pupil division is corrected for each plane will be described.

Figure 29:
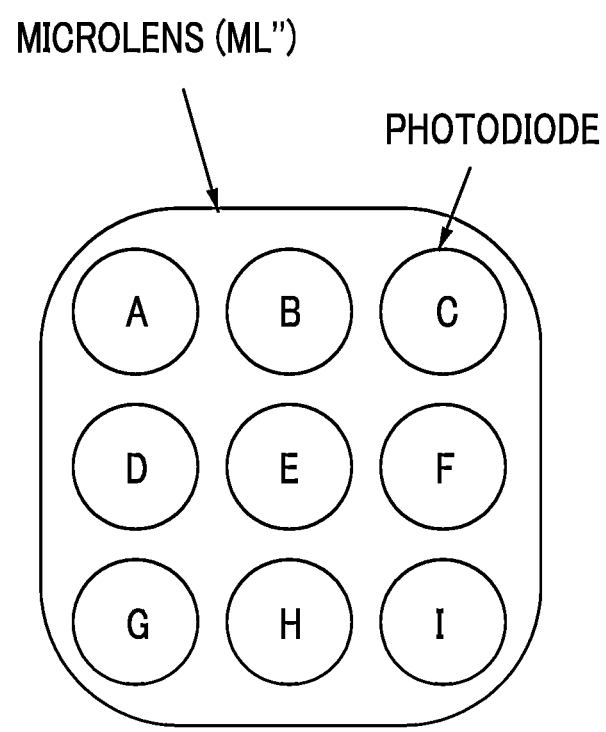
FIG. 29 is a diagram illustrating an example of a structure including nine pixels and one microlens.

FIG. 29 is a diagram illustrating a main portion of the phase difference CCD including nine pixels and one microlens. As shown in FIG. 29, in the phase difference CCD in which one unit includes nine pixels and one microlens, each unit (nine pixels and one microlens) includes nine photodiodes A to I which are two-dimensionally arranged and one microlens ML" which covers the nine photodiodes and the units are two-dimensionally arranged. Similarly to one unit including the four pixels and one microlens shown in FIG. 24, a color filter is provided for each unit including nine pixels and one microlens.

Figure 30:
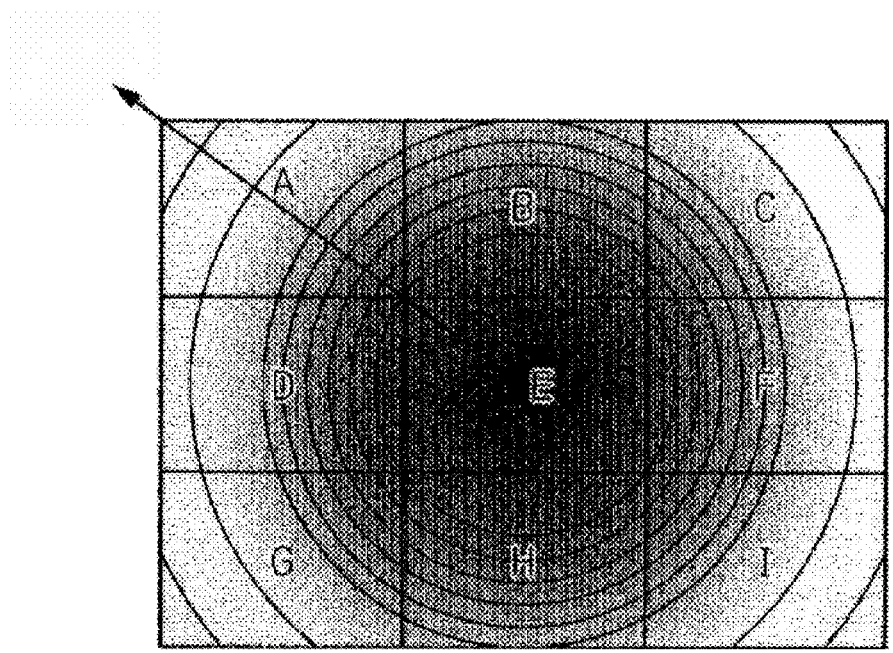
FIG. 30 is a diagram illustrating the shading characteristics of each plane of a CCD including nine pixels and one microlens.
Figure 32:
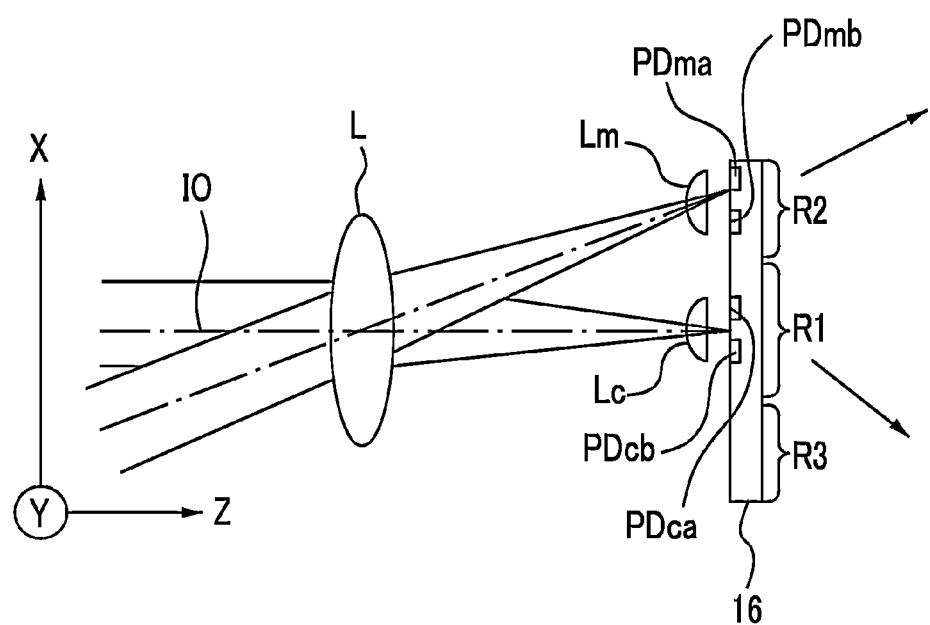
FIG. 32 is a diagram illustrating the unique shading characteristics of the single-eye stereoscopic imaging device.

FIG. 30 is an image diagram illustrating the density unevenness of nine planes (planes A to I) obtained from the phase difference CCD in which one unit includes nine pixels and one microlens due to pupil division. In FIG. 30, a high-density portion corresponds to a bright portion.

As shown in FIG. 30, when the nine planes (planes A to I) are arranged in a matrix, the density unevenness has a density gradient in which density is the highest in the central plane E and is reduced as the distance from the center of the plane E increases.

Therefore, a one-dimensional correction table (a one-dimensional correction table corresponding to the distance from the center of the plane E) in the direction of an arrow shown in FIG. 30 is prepared. When shading correction is performed for the pixels of the plane to be corrected, a corresponding correction value is read from the one-dimensional correction table on the basis of the distance of the pixel on the plane from the center of the plane E and is applied, thereby performing shading correction for the density unevenness of each plane due to pupil division.

Since the distance of the pixel of each plane from the center of the plane E is geometrically determined as shown in FIG. 30, each pixel can have distance information. In addition, the one-dimensional correction table may have correction values such that shading correction is not performed for the pixels of the plane E.

In the above-described embodiments, the correction values stored in the one-dimensional correction table storage unit do not correspond to all pixel positions, but are discrete. The table selection unit reads two correction values and the SD coefficient calculation unit calculates the shading correction coefficient using, for example, linear interpolation. However, the one-dimensional correction table may have correction values corresponding to all pixel positions and the read correction value may be multiplied by the pixel value to perform shading correction.

In the single-eye stereoscopic imaging device, beams are divided by the light shielding members 17A and 17B which are provided on the side of the microlens ML of the phase difference CCD 17. However, the present invention can be applied to a single-eye stereoscopic imaging device using an imaging lens 12' including a relay lens for dividing beams. In addition, one microlens may be provided for two pixels (the main pixel and the sub-pixel) to limit beams incident on each pixel.

In the above-described embodiments, a CCD is used as the imaging element. However, the imaging element is not limited to the CCD. The present invention can be applied to other image sensors, such as a CMOS sensor. In addition, the arrangement of the photodiodes in the CCD is not limited to the above, but the present invention can be applied to CCDs in which the photodiodes are arranged in different arrays.

In the above-described first to seventh embodiments, shading correction caused by single-eye 3D is performed for signals output from the main pixels and the sub-pixels using the one-dimensional correction table and shading correction caused by the optical system is performed for the corrected signals using the two-dimensional correction table. However, since shading correction is the multiplication of the signal by the shading correction coefficient, contrary to the above, shading correction caused by the optical system may be performed for the signals output from the main pixels and the sub-pixels using the two-dimensional correction table and shading correction caused by single-eye 3D may be performed for the corrected signals using the one-dimensional correction table. In addition, the shading correction coefficient in the one-dimensional correction table may be multiplied by the shading correction coefficient in the two-dimensional correction table to generate one shading correction coefficient and the signals output from the main pixels and the sub-pixels may be multiplied by the generated shading correction coefficient to perform shading correction caused by single-eye 3D and the optical system once.

The present invention is not limited to a case in which the above-described embodiments are individually implemented, but a plurality of embodiments may be combined with each other. In the third to seventh embodiments, the same one-dimensional table used for shading correction may be used for the main pixels and the sub-pixels or different one-dimensional tables may be used for the main pixels and the sub-pixels.

What is claimed is:

1. A single-eye stereoscopic imaging device comprising:
a single imaging optical system;
pupil divider for dividing beams passing through the imaging optical system into a plurality of beams;
a single imaging element including a plurality of pixel groups which receive the plurality of beams;
first shading corrector for performing shading correction for all imaging signals output from the single imaging element using a two-dimensional correction table in which correction values for correcting shading in horizontal and vertical directions caused by at least the imaging optical system are arranged; and
second shading corrector for performing shading correction for each imaging signal output from the plurality of pixel groups using a one-dimensional correction table in which correction values for correcting shading in a gradient direction of density unevenness caused by pupil division of the pupil divider ere arranged.

2. The single-eye stereoscopic imaging device according to claim 1,
wherein the second shading corrector performs the shading correction for the plurality of pixel groups using the same one-dimensional correction table.

3. The single-eye stereoscopic imaging device according to claim 2,
wherein the imaging element includes a first pixel group and a second pixel group that receive the plurality of beams, and
the second shading corrector includes:
a part for selecting, as a first pixel, a pixel at an arbitrary position of a predetermined column of the first pixel group and selecting, as a second pixel, a pixel at a position corresponding to the first pixel in a predetermined column of the second pixel group;
a part for reading a correction value at a position corresponding to the position of the first pixel as a correction value for the first pixel from the one-dimensional correction table;
a part for reading a correction value which is bilaterally symmetric to the correction value for the first pixel in the one-dimensional correction table as a correction value for the second pixel; and
a part for correcting the shading of the first pixel on the basis of a value of the first pixel and the correction value for the first pixel and correcting the shading of the second pixel on the basis of a value of the second pixel and the correction value for the second pixel.

4. The single-eye stereoscopic imaging device according to claim 3, further comprising:
  focal length acquiring part,
  wherein the imaging optical system includes a zoom lens,
  the focal length acquiring part a focal length from the position of the zoom lens, and
  the second shading corrector stores a plurality of one-dimensional correction tables according to the focal length and performs the shading correction using the one-dimensional correction table corresponding to the focal length acquired by the focal length acquiring part.

5. The single-eye stereoscopic imaging device according to claim 4,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

6. The single-eye stereoscopic imaging device according to claim 3,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

7. The single-eye stereoscopic imaging device according to claim 2,
  wherein the imaging element includes a first pixel group and a second pixel group that receive the plurality of beams, and
  the second shading corrector includes:
    a part for selecting, as a first pixel, a pixel at an arbitrary position of a predetermined column of the first pixel group and selecting, as a second pixel, a pixel at a position which is bilaterally symmetric to the position of the first pixel in a predetermined column of the second pixel group;
    a part for reading a correction value at a position corresponding to the position of the first pixel from the one-dimensional correction table; and
    a part for correcting the shading of the first pixel on the basis of a value of the first pixel and the correction value at the position corresponding to the position of the first pixel and correcting the shading of the second pixel on the basis of a value of the second pixel and the correction value at the position corresponding to the position of the first pixel.

8. The single-eye stereoscopic imaging device according to claim 7, further comprising:
  focal length acquiring part,
  wherein the imaging optical system includes a zoom lens,
  the focal length acquiring part acquires a focal length from the position of the zoom lens, and
  the second shading corrector stores a plurality of one-dimensional correction tables according to the focal length and performs the shading correction using the one-dimensional correction table corresponding to the focal length acquired by the focal length acquiring part.

9. The single-eye stereoscopic imaging device according to claim 7,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

10. The single-eye stereoscopic imaging device according to claim 2, further comprising:
  focal length acquiring part,
  wherein the imaging optical system includes a zoom lens,
  the focal length acquiring part acquires a focal length from the position of the zoom lens, and
  the second shading corrector stores a plurality of one-dimensional correction tables according to the focal length and performs the shading correction using the one-dimensional correction table corresponding to the focal length acquired by the focal length acquiring part.

11. The single-eye stereoscopic imaging device according to claim 10,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

12. The single-eye stereoscopic imaging device according to claim 2,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

13. The single-eye stereoscopic imaging device according to claim 1, further comprising:
  focal length acquiring part,
  wherein the imaging optical system includes a zoom lens,
  the focal length acquiring part acquires a focal length from the position of the zoom lens, and
  the second shading corrector stores a plurality of one-dimensional correction tables according to the focal length and performs the shading correction using the one-dimensional correction table corresponding to the focal length acquired by the focal length acquiring part.

14. The single-eye stereoscopic imaging device according to claim 13,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

15. The single-eye stereoscopic imaging device according to claim 1,
  wherein the imaging optical system includes an aperture with a variable aperture value, and
  the second shading corrector stores a plurality of one-dimensional correction tables according to the aperture value of the aperture and performs the shading correction using the one-dimensional correction table corresponding to the current aperture value of the aperture.

16. The single-eye stereoscopic imaging device according to claim 1,
  wherein the second shading corrector stores one-dimensional correction tables for R, G, and B colors, performs the shading correction using the one-dimensional correction table for the R color when the color of a pixel selected from the plurality of pixel groups is R, performs the shading correction using the one-dimensional correction table for the G color when the color of the selected pixel is G, and performs the shading correction using the one-dimensional correction table for the B color when the color of the selected pixel is B.

17. The single-eye stereoscopic imaging device according to claim 16,
wherein the second shading corrector stores, as the one-dimensional correction table for the G color, a one-dimensional correction table for a Gr color, which is the color of a G pixel in a horizontal line of R, G, R, G, pixels, and a one-dimensional correction table for a Gb color, which is the color of a G pixel in a horizontal line of G, B, G, B, . . . pixels, performs the shading correction using the one-dimensional correction table for the Gr color when the color of the selected pixel is the color of the G pixel read from the GR line, and performs the shading correction using the one-dimensional correction table for the Gb color when the color of the selected pixel is the color of the G pixel read from the GB line.

18. The single-eye stereoscopic imaging device according to claim 1, further comprising:
direction detector for detecting a direction of the imaging element, wherein the second shading corrector stores a one-dimensional correction table when the imaging element is arranged in the horizontal direction and a one-dimensional correction table when the imaging element is arranged in the vertical direction and performs the shading correction using the one-dimensional correction table based on the direction of the imaging element detected by the direction detector.

19. A shading correction method for a single-eye stereoscopic imaging device, comprising:
acquiring output signals from a plurality of pixel groups that receive a plurality of beams which are obtained from beams passing through a single imaging optical system by pupil division of a pupil divider; and
performing shading correction for the output signals from the plurality of pixel groups,
wherein, in the shading correction for the output signals, the shading correction is performed for the output signals from the plurality of pixel groups using a one-dimensional correction table in which correction values for correcting shading in a gradient direction of density unevenness caused by pupil division of the pupil divider are arranged, and the shading correction is performed for all of the output signals from the plurality of pixel groups using a two-dimensional correction table in which correction values for correcting shading in horizontal and vertical directions caused by at least the imaging optical system are arranged.

20. A non-transitory computer-readable recording medium using a single-eye stereoscopic imaging device that causes an arithmetic device to perform:
acquiring output signals from a plurality of pixel groups that receive a plurality of beams which are obtained from beams passing through a single imaging optical system by pupil division of a pupil divider; and
performing shading correction for the output signals from the plurality of pixel groups,
wherein, in the shading correction for the output signals, the shading correction is performed for the output signals from the plurality of pixel groups using a one-dimensional correction table in which correction values for correcting shading in a gradient direction of density unevenness caused by pupil division of the pupil divider are arranged, and the shading correction is performed for all of the output signals from the plurality of pixel groups using a two-dimensional correction table in which correction values for correcting shading in horizontal and vertical directions caused by at least the imaging optical system are arranged.

* * * * *